(12) United States Patent
Camarillo et al.

(10) Patent No.: US 12,478,444 B2
(45) Date of Patent: Nov. 25, 2025

(54) SYSTEMS AND METHODS FOR LOCALIZATION BASED ON MACHINE LEARNING

(71) Applicant: The Board of Trustees of the Leland Stanford Junior University, Palo Alto, CA (US)

(72) Inventors: David B. Camarillo, Aptos, CA (US); David Eng, Saratoga, CA (US); Jake Sganga, Laguna Beach, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 837 days.

(21) Appl. No.: 16/826,114

(22) Filed: Mar. 20, 2020

(65) Prior Publication Data

US 2020/0297444 A1    Sep. 24, 2020

Related U.S. Application Data

(60) Provisional application No. 62/821,993, filed on Mar. 21, 2019.

(51) Int. Cl.
*A61B 34/00* (2016.01)
*A61B 1/267* (2006.01)
(Continued)

(52) U.S. Cl.
CPC ............ *A61B 34/70* (2016.02); *A61B 1/2676* (2013.01); *A61B 34/10* (2016.02); *A61B 34/20* (2016.02);
(Continued)

(58) Field of Classification Search
CPC .............. A61B 1/00149; A61B 1/2676; A61B 2017/00477; A61B 2017/00809;
(Continued)

(56) References Cited

U.S. PATENT DOCUMENTS 4,745,908 A    5/1988 Wardle
5,273,025 A    12/1993 Sakiyam et al.
(Continued)

FOREIGN PATENT DOCUMENTS

CN    101147676    3/2008
CN    101222882    7/2008
(Continued)

OTHER PUBLICATIONS

Karkus et al., "Particle Filter Networks with Application to Visual Localization", 2018 (Year: 2018).*
(Continued)

*Primary Examiner* — Christopher L Cook
(74) *Attorney, Agent, or Firm* — Paradice & Li LLP

(57) ABSTRACT

Certain aspects relate to systems and techniques for localizing and/or navigating a medical instrument within a luminal network. A medical system can include an elongate body configured to be inserted into the luminal network, as well as an imaging device positioned on a distal portion of the elongate body. The system may include memory and processors configured to receive from the imaging device image data that includes an image captured when the elongate body is within the luminal network. The image can depict one or more branchings of the luminal network. The processor can be configured to access a machine learning model of one or more luminal networks and determine, based on the machine learning model and information regarding the one or more branchings, a location of the distal portion of the elongate body within the luminal network.

13 Claims, 29 Drawing Sheets

(51) Int. Cl.
  *A61B 34/10* (2016.01)
  *A61B 34/20* (2016.01)
  *A61B 34/37* (2016.01)
  *G06N 3/02* (2006.01)
  *G16H 30/00* (2018.01)
  *G16H 50/00* (2018.01)
  *A61B 34/30* (2016.01)

(52) U.S. Cl.
  CPC .............. *A61B 34/37* (2016.02); *G06N 3/02* (2013.01); *G16H 30/00* (2018.01); *G16H 50/00* (2018.01); *A61B 2034/102* (2016.02); *A61B 2034/301* (2016.02)

(58) Field of Classification Search
  CPC ........ A61B 2034/102; A61B 2034/105; A61B 2034/2051; A61B 2034/2059; A61B 2034/2061; A61B 2034/2065; A61B 2034/301; A61B 2090/306; A61B 2090/309; A61B 2090/3614; A61B 2090/367; A61B 2090/376; A61B 34/10; A61B 34/20; A61B 34/37; A61B 34/70; A61G 13/04; A61G 13/06; A61G 13/101; A61G 13/1235; G06N 20/00; G06N 3/02; G06N 3/045; G06N 3/08; G16H 20/40; G16H 30/00; G16H 30/40; G16H 50/00; G16H 50/20
  See application file for complete search history.

(56) References Cited

U.S. PATENT DOCUMENTS

| | | |
|---|---|---|
| 5,526,812 A | 6/1996 | Dumoulin et al. |
| 5,550,953 A | 8/1996 | Seraji |
| 5,831,614 A | 11/1998 | Tognazzini et al. |
| 5,935,075 A | 8/1999 | Casscells |
| 6,038,467 A | 3/2000 | De Bliek et al. |
| 6,047,080 A | 4/2000 | Chen |
| 6,059,718 A | 5/2000 | Taniguchi et al. |
| 6,063,095 A | 5/2000 | Wang et al. |
| 6,167,292 A | 12/2000 | Badano |
| 6,203,493 B1 | 3/2001 | Ben-Haim |
| 6,246,784 B1 | 6/2001 | Summers |
| 6,246,898 B1 | 6/2001 | Vesely |
| 6,332,089 B1 | 12/2001 | Acker |
| 6,425,865 B1 | 7/2002 | Salcudean et al. |
| 6,466,198 B1 | 10/2002 | Feinstein |
| 6,490,467 B1 | 12/2002 | Bucholz |
| 6,553,251 B1 | 4/2003 | Lahdesmaki |
| 6,665,554 B1 | 12/2003 | Charles |
| 6,690,963 B2 | 2/2004 | Ben-Haim |
| 6,690,964 B2 | 2/2004 | Beiger et al. |
| 6,755,797 B1 | 6/2004 | Stouffer |
| 6,812,842 B2 | 11/2004 | Dimmer |
| 6,899,672 B2 | 5/2005 | Chin |
| 6,926,709 B2 | 8/2005 | Beiger et al. |
| 7,180,976 B2 | 2/2007 | Wink |
| 7,206,627 B2 | 4/2007 | Abovitz |
| 7,233,820 B2 | 6/2007 | Gilboa |
| 7,386,339 B2 | 6/2008 | Strommer et al. |
| 7,697,972 B2 | 4/2010 | Verard |
| 7,756,563 B2 | 7/2010 | Higgins |
| 7,850,642 B2 | 12/2010 | Moll et al. |
| 7,901,348 B2 | 3/2011 | Soper |
| 8,155,403 B2 | 4/2012 | Tschirren |
| 8,190,238 B2 | 5/2012 | Moll et al. |
| 8,290,571 B2 | 10/2012 | Younge et al. |
| 8,298,135 B2 | 10/2012 | Ito et al. |
| 8,317,746 B2 | 11/2012 | Sewell et al. |
| 8,394,054 B2 | 3/2013 | Wallace et al. |
| 8,460,236 B2 | 6/2013 | Roelle et al. |
| 8,821,376 B2 | 9/2014 | Tolkowsky |
| 8,858,424 B2 | 10/2014 | Hasegawa |
| 8,929,631 B2 | 1/2015 | Pfister et al. |
| 9,014,851 B2 | 4/2015 | Wong et al. |
| 9,084,623 B2 | 7/2015 | Gomez et al. |
| 9,125,639 B2 | 9/2015 | Mathis |
| 9,138,129 B2 | 9/2015 | Diolaiti |
| 9,183,354 B2 | 11/2015 | Baker et al. |
| 9,186,046 B2 | 11/2015 | Ramamurthy et al. |
| 9,272,416 B2 | 3/2016 | Hourtash et al. |
| 9,289,578 B2 | 3/2016 | Walker et al. |
| 9,459,087 B2 | 10/2016 | Dunbar |
| 9,504,604 B2 | 11/2016 | Alvarez |
| 9,561,083 B2 | 2/2017 | Yu et al. |
| 9,603,668 B2 | 3/2017 | Weingarten et al. |
| 9,622,827 B2 | 4/2017 | Yu et al. |
| 9,629,682 B2 | 4/2017 | Wallace et al. |
| 9,636,184 B2 | 5/2017 | Lee et al. |
| 9,710,921 B2 | 7/2017 | Wong et al. |
| 9,713,509 B2 | 7/2017 | Schuh et al. |
| 9,717,563 B2 | 8/2017 | Tognaccini |
| 9,727,963 B2 | 8/2017 | Mintz et al. |
| 9,737,371 B2 | 8/2017 | Romo et al. |
| 9,737,373 B2 | 8/2017 | Schuh |
| 9,744,335 B2 | 8/2017 | Jiang |
| 9,763,741 B2 | 9/2017 | Alvarez et al. |
| 9,788,910 B2 | 10/2017 | Schuh |
| 9,844,412 B2 | 12/2017 | Bogusky et al. |
| 9,867,635 B2 | 1/2018 | Alvarez et al. |
| 9,918,681 B2 | 3/2018 | Wallace et al. |
| 9,931,025 B1 | 4/2018 | Graetzel et al. |
| 9,949,749 B2 | 4/2018 | Noonan et al. |
| 9,955,986 B2 | 5/2018 | Shah |
| 9,962,228 B2 | 5/2018 | Schuh et al. |
| 9,980,785 B2 | 5/2018 | Schuh |
| 9,993,313 B2 | 6/2018 | Schuh et al. |
| 10,016,900 B1 | 7/2018 | Meyer et al. |
| 10,022,192 B1 | 7/2018 | Ummalaneni |
| 10,046,140 B2 | 8/2018 | Kokish et al. |
| 10,080,576 B2 | 9/2018 | Romo et al. |
| 10,123,755 B2 | 11/2018 | Walker et al. |
| 10,130,345 B2 | 11/2018 | Wong et al. |
| 10,136,950 B2 | 11/2018 | Schoenefeld |
| 10,136,959 B2 | 11/2018 | Mintz et al. |
| 10,143,360 B2 | 12/2018 | Roelle et al. |
| 10,143,526 B2 | 12/2018 | Walker et al. |
| 10,145,747 B1 | 12/2018 | Lin et al. |
| 10,149,720 B2 | 12/2018 | Romo |
| 10,159,532 B1 | 12/2018 | Ummalaneni et al. |
| 10,159,533 B2 | 12/2018 | Moll et al. |
| 10,169,875 B2 | 1/2019 | Mintz et al. |
| 10,219,874 B2 | 3/2019 | Yu et al. |
| 10,231,793 B2 | 3/2019 | Romo |
| 10,231,867 B2 | 3/2019 | Alvarez et al. |
| 10,244,926 B2 | 4/2019 | Noonan et al. |
| 10,278,778 B2 | 5/2019 | State |
| 10,285,574 B2 | 5/2019 | Landey et al. |
| 10,299,870 B2 | 5/2019 | Connolly et al. |
| 10,314,463 B2 | 6/2019 | Agrawal et al. |
| 10,383,765 B2 | 8/2019 | Alvarez et al. |
| 10,398,518 B2 | 9/2019 | Yu et al. |
| 10,405,939 B2 | 9/2019 | Romo et al. |
| 10,405,940 B2 | 9/2019 | Romo |
| 10,426,559 B2 | 10/2019 | Graetzel et al. |
| 10,426,661 B2 | 10/2019 | Kintz |
| 10,431,328 B1 * | 10/2019 | Wang .................... G06N 3/045 |
| 10,434,660 B2 | 10/2019 | Meyer |
| 10,464,209 B2 | 11/2019 | Ho et al. |
| 10,470,830 B2 | 11/2019 | Hill |
| 10,482,599 B2 | 11/2019 | Mintz et al. |
| 10,492,741 B2 | 12/2019 | Walker et al. |
| 10,493,241 B2 | 12/2019 | Jiang |
| 10,500,001 B2 | 12/2019 | Yu et al. |
| 10,517,692 B2 | 12/2019 | Eyre et al. |
| 10,524,866 B2 | 1/2020 | Srinivasan |
| 10,531,864 B2 | 1/2020 | Wong et al. |
| 10,539,478 B2 | 1/2020 | Lin |
| 10,543,048 B2 | 1/2020 | Noonan et al. |
| 10,555,778 B2 | 2/2020 | Ummalaneni et al. |
| 10,631,949 B2 | 4/2020 | Schuh et al. |
| 10,639,108 B2 | 5/2020 | Romo et al. |

(56) References Cited

U.S. PATENT DOCUMENTS

| | | |
|---|---|---|
| 10,639,109 B2 | 5/2020 | Bovay et al. |
| 10,639,114 B2 | 5/2020 | Schuh |
| 10,667,871 B2 | 6/2020 | Romo et al. |
| 10,667,875 B2 | 6/2020 | DeFonzo |
| 10,682,189 B2 | 6/2020 | Schuh et al. |
| 10,702,348 B2 | 7/2020 | Moll et al. |
| 10,716,461 B2 | 7/2020 | Jenkins |
| 10,743,751 B2 | 8/2020 | Landey et al. |
| 10,744,035 B2 | 8/2020 | Alvarez et al. |
| 10,751,140 B2 | 8/2020 | Wallace et al. |
| 10,765,303 B2 | 9/2020 | Graetzel et al. |
| 10,765,487 B2 | 9/2020 | Ho |
| 10,779,898 B2 | 9/2020 | Hill |
| 10,786,329 B2 | 9/2020 | Schuh et al. |
| 10,786,432 B2 | 9/2020 | Jornitz et al. |
| 10,792,464 B2 | 10/2020 | Romo et al. |
| 10,792,466 B2 | 10/2020 | Landey et al. |
| 10,813,539 B2 | 10/2020 | Graetzel et al. |
| 10,814,101 B2 | 10/2020 | Jiang |
| 10,820,947 B2 | 11/2020 | Julian |
| 10,820,954 B2 | 11/2020 | Marsot et al. |
| 10,827,913 B2 | 11/2020 | Ummalaneni et al. |
| 10,828,118 B2 | 11/2020 | Schuh et al. |
| 10,835,153 B2 | 11/2020 | Rafii-Tari et al. |
| 10,850,013 B2 | 12/2020 | Hsu |
| 10,881,280 B2 | 1/2021 | Baez |
| 11,172,895 B2 | 11/2021 | Dickhans et al. |
| 2001/0021843 A1 | 9/2001 | Bosselmann et al. |
| 2001/0039421 A1 | 11/2001 | Heilbrun |
| 2002/0065455 A1 | 5/2002 | Ben-Haim et al. |
| 2002/0077533 A1 | 6/2002 | Bieger et al. |
| 2002/0120188 A1 | 8/2002 | Brock et al. |
| 2003/0105603 A1 | 6/2003 | Hardesty |
| 2003/0125622 A1 | 7/2003 | Schweikard |
| 2003/0181809 A1 | 9/2003 | Hall et al. |
| 2003/0195664 A1 | 10/2003 | Nowlin et al. |
| 2004/0047044 A1 | 3/2004 | Dalton |
| 2004/0072066 A1 | 4/2004 | Cho et al. |
| 2004/0097806 A1 | 5/2004 | Hunter et al. |
| 2004/0186349 A1 | 9/2004 | Ewers |
| 2004/0249267 A1 | 12/2004 | Gilboa |
| 2004/0263535 A1 | 12/2004 | Birkenbach et al. |
| 2005/0027397 A1 | 2/2005 | Niemeyer |
| 2005/0060006 A1 | 3/2005 | Pflueger |
| 2005/0085714 A1 | 4/2005 | Foley et al. |
| 2005/0107679 A1 | 5/2005 | Geiger |
| 2005/0143649 A1 | 6/2005 | Minai et al. |
| 2005/0143655 A1 | 6/2005 | Satoh |
| 2005/0182295 A1 | 8/2005 | Soper et al. |
| 2005/0182319 A1 | 8/2005 | Glossop |
| 2005/0193451 A1 | 9/2005 | Quistgaard et al. |
| 2005/0197557 A1 | 9/2005 | Strommer et al. |
| 2005/0256398 A1 | 11/2005 | Hastings |
| 2005/0272975 A1 | 12/2005 | McWeeney et al. |
| 2006/0004286 A1 | 1/2006 | Chang |
| 2006/0015096 A1 | 1/2006 | Hauck et al. |
| 2006/0025668 A1 | 2/2006 | Peterson |
| 2006/0058643 A1 | 3/2006 | Florent |
| 2006/0084860 A1 | 4/2006 | Geiger |
| 2006/0095066 A1 | 5/2006 | Chang |
| 2006/0098851 A1 | 5/2006 | Shoham |
| 2006/0149134 A1 | 7/2006 | Soper et al. |
| 2006/0173290 A1 | 8/2006 | Lavallee et al. |
| 2006/0184016 A1 | 8/2006 | Glossop |
| 2006/0209019 A1 | 9/2006 | Hu |
| 2006/0258935 A1 | 11/2006 | Pile-Spellman et al. |
| 2006/0258938 A1 | 11/2006 | Hoffman et al. |
| 2007/0032826 A1 | 2/2007 | Schwartz |
| 2007/0055128 A1 | 3/2007 | Glossop |
| 2007/0055144 A1 | 3/2007 | Neustadter |
| 2007/0073136 A1 | 3/2007 | Metzger |
| 2007/0083193 A1 | 4/2007 | Werneth |
| 2007/0123748 A1 | 5/2007 | Meglan |
| 2007/0135886 A1 | 6/2007 | Maschke |
| 2007/0156019 A1 | 7/2007 | Larkin et al. |
| 2007/0161857 A1 | 7/2007 | Durant et al. |
| 2007/0167743 A1 | 7/2007 | Honda |
| 2007/0167801 A1 | 7/2007 | Webler et al. |
| 2007/0208252 A1 | 9/2007 | Makower |
| 2007/0253599 A1 | 11/2007 | White et al. |
| 2007/0269001 A1 | 11/2007 | Maschke |
| 2007/0293721 A1 | 12/2007 | Gilboa |
| 2007/0299353 A1 | 12/2007 | Harlev et al. |
| 2008/0071140 A1 | 3/2008 | Gattani |
| 2008/0079421 A1 | 4/2008 | Jensen |
| 2008/0103389 A1 | 5/2008 | Begelman et al. |
| 2008/0118118 A1 | 5/2008 | Berger |
| 2008/0118135 A1 | 5/2008 | Averbach |
| 2008/0123921 A1 | 5/2008 | Gielen et al. |
| 2008/0147089 A1 | 6/2008 | Loh |
| 2008/0183064 A1 | 7/2008 | Chandonnet |
| 2008/0183068 A1 | 7/2008 | Carls et al. |
| 2008/0183073 A1 | 7/2008 | Higgins et al. |
| 2008/0183188 A1 | 7/2008 | Carls et al. |
| 2008/0201016 A1 | 8/2008 | Finlay |
| 2008/0207997 A1 | 8/2008 | Higgins et al. |
| 2008/0212082 A1 | 9/2008 | Froggatt et al. |
| 2008/0218770 A1 | 9/2008 | Moll et al. |
| 2008/0221425 A1 | 9/2008 | Olson et al. |
| 2008/0243142 A1 | 10/2008 | Gildenberg |
| 2008/0262297 A1 | 10/2008 | Gilboa |
| 2008/0275349 A1 | 11/2008 | Halperin |
| 2008/0287963 A1 | 11/2008 | Rogers et al. |
| 2008/0300478 A1 | 12/2008 | Zuhars et al. |
| 2008/0306490 A1 | 12/2008 | Lakin et al. |
| 2008/0312501 A1 | 12/2008 | Hasegawa et al. |
| 2009/0030307 A1 | 1/2009 | Govari |
| 2009/0054729 A1 | 2/2009 | Mori |
| 2009/0076476 A1 | 3/2009 | Barbagli et al. |
| 2009/0149867 A1 | 6/2009 | Glozman |
| 2009/0209817 A1 | 8/2009 | Averbuch |
| 2009/0227861 A1 | 9/2009 | Ganatra |
| 2009/0228020 A1 | 9/2009 | Wallace et al. |
| 2009/0248036 A1 | 10/2009 | Hoffman et al. |
| 2009/0259230 A1 | 10/2009 | Khadem |
| 2009/0262109 A1 | 10/2009 | Markowitz et al. |
| 2009/0292166 A1 | 11/2009 | Ito |
| 2009/0295797 A1 | 12/2009 | Sakaguchi |
| 2010/0008555 A1 | 1/2010 | Trumer |
| 2010/0030061 A1 | 2/2010 | Canfield |
| 2010/0039506 A1 | 2/2010 | Sarvestani et al. |
| 2010/0041949 A1 | 2/2010 | Tolkowsky |
| 2010/0054536 A1 | 3/2010 | Huang |
| 2010/0113852 A1 | 5/2010 | Sydora |
| 2010/0121139 A1 | 5/2010 | OuYang |
| 2010/0160733 A1 | 6/2010 | Gilboa |
| 2010/0161022 A1 | 6/2010 | Tolkowsky |
| 2010/0161129 A1 | 6/2010 | Costa et al. |
| 2010/0225209 A1 | 9/2010 | Goldberg |
| 2010/0240989 A1 | 9/2010 | Stoianovici |
| 2010/0290530 A1 | 11/2010 | Huang et al. |
| 2010/0292565 A1 | 11/2010 | Meyer |
| 2010/0298641 A1 | 11/2010 | Tanaka |
| 2010/0328455 A1 | 12/2010 | Nam et al. |
| 2011/0054303 A1 | 3/2011 | Barrick |
| 2011/0092808 A1 | 4/2011 | Shachar |
| 2011/0184238 A1 | 7/2011 | Higgins |
| 2011/0234780 A1 | 9/2011 | Ito |
| 2011/0238082 A1 | 9/2011 | Wenderow |
| 2011/0245665 A1 | 10/2011 | Nentwick |
| 2011/0248987 A1 | 10/2011 | Mitchell |
| 2011/0249016 A1 | 10/2011 | Zhang |
| 2011/0257480 A1 | 10/2011 | Takahashi |
| 2011/0270084 A1 | 11/2011 | Choi et al. |
| 2011/0276179 A1 | 11/2011 | Banks et al. |
| 2011/0319910 A1 | 12/2011 | Roelle et al. |
| 2012/0046521 A1 | 2/2012 | Hunter et al. |
| 2012/0056986 A1 | 3/2012 | Popovic |
| 2012/0059248 A1 | 3/2012 | Holsing |
| 2012/0062714 A1 | 3/2012 | Liu |
| 2012/0065481 A1 | 3/2012 | Hunter |
| 2012/0069167 A1 | 3/2012 | Liu et al. |
| 2012/0071782 A1 | 3/2012 | Patil et al. |
| 2012/0082351 A1 | 4/2012 | Higgins |

(56) References Cited

U.S. PATENT DOCUMENTS

| | | |
|---|---|---|
| 2012/0120305 A1 | 5/2012 | Takahashi |
| 2012/0165656 A1 | 6/2012 | Montag |
| 2012/0172712 A1 | 7/2012 | Bar-Tal |
| 2012/0191079 A1 | 7/2012 | Moll et al. |
| 2012/0209069 A1 | 8/2012 | Popovic |
| 2012/0215094 A1 | 8/2012 | Rahimian et al. |
| 2012/0219185 A1 | 8/2012 | Hu |
| 2012/0289777 A1 | 11/2012 | Chopra |
| 2012/0289783 A1 | 11/2012 | Duindam et al. |
| 2012/0302869 A1 | 11/2012 | Koyrakh |
| 2013/0060146 A1 | 3/2013 | Yang et al. |
| 2013/0144116 A1 | 6/2013 | Cooper et al. |
| 2013/0165945 A9 | 6/2013 | Roelle |
| 2013/0204124 A1 | 8/2013 | Duindam |
| 2013/0225942 A1 | 8/2013 | Holsing |
| 2013/0243153 A1 | 9/2013 | Sra |
| 2013/0246334 A1 | 9/2013 | Ahuja |
| 2013/0259315 A1 | 10/2013 | Angot et al. |
| 2013/0303892 A1 | 11/2013 | Zhao |
| 2013/0345718 A1 | 12/2013 | Crawford |
| 2014/0058406 A1 | 2/2014 | Tsekos |
| 2014/0072192 A1 | 3/2014 | Reiner |
| 2014/0107390 A1 | 4/2014 | Brown |
| 2014/0114180 A1 | 4/2014 | Jain |
| 2014/0142591 A1 | 5/2014 | Alvarez et al. |
| 2014/0148808 A1 | 5/2014 | Inkpen et al. |
| 2014/0180063 A1 | 6/2014 | Zhao |
| 2014/0235943 A1 | 8/2014 | Paris |
| 2014/0243849 A1 | 8/2014 | Saglam et al. |
| 2014/0257746 A1 | 9/2014 | Dunbar et al. |
| 2014/0264081 A1 | 9/2014 | Walker et al. |
| 2014/0275988 A1 | 9/2014 | Walker et al. |
| 2014/0276033 A1 | 9/2014 | Brannan |
| 2014/0276937 A1 | 9/2014 | Wong et al. |
| 2014/0296655 A1 | 10/2014 | Akhbardeh et al. |
| 2014/0296655 A1 | 10/2014 | Izmirli |
| 2014/0309527 A1 | 10/2014 | Namati et al. |
| 2014/0343416 A1* | 11/2014 | Panescu ............ A61B 17/3478 |
| | | 600/431 |
| 2014/0350391 A1 | 11/2014 | Prisco et al. |
| 2014/0357984 A1 | 12/2014 | Wallace et al. |
| 2014/0364739 A1 | 12/2014 | Liu |
| 2015/0051482 A1 | 2/2015 | Liu et al. |
| 2015/0054929 A1 | 2/2015 | Ito et al. |
| 2015/0057498 A1 | 2/2015 | Akimoto |
| 2015/0073266 A1 | 3/2015 | Brannan |
| 2015/0141808 A1 | 5/2015 | Elhawary |
| 2015/0141858 A1 | 5/2015 | Razavi |
| 2015/0142013 A1 | 5/2015 | Tanner et al. |
| 2015/0223725 A1 | 8/2015 | Engel |
| 2015/0223897 A1 | 8/2015 | Kostrzewski et al. |
| 2015/0223902 A1 | 8/2015 | Walker et al. |
| 2015/0255782 A1 | 9/2015 | Kim et al. |
| 2015/0265087 A1 | 9/2015 | Park |
| 2015/0265368 A1 | 9/2015 | Chopra |
| 2015/0275986 A1 | 10/2015 | Cooper |
| 2015/0287192 A1 | 10/2015 | Sasaki |
| 2015/0297133 A1 | 10/2015 | Jouanique-Dubuis et al. |
| 2015/0305650 A1 | 10/2015 | Hunter |
| 2015/0313503 A1 | 11/2015 | Seibel et al. |
| 2016/0000302 A1 | 1/2016 | Brown |
| 2016/0000414 A1 | 1/2016 | Brown |
| 2016/0000520 A1 | 1/2016 | Lachmanovich |
| 2016/0008033 A1 | 1/2016 | Hawkins et al. |
| 2016/0111192 A1 | 4/2016 | Suzara |
| 2016/0128781 A1 | 5/2016 | Blohm et al. |
| 2016/0128992 A1 | 5/2016 | Hudson |
| 2016/0171766 A1* | 6/2016 | Grbic ............... A61B 17/00 |
| | | 345/423 |
| 2016/0183841 A1 | 6/2016 | Duindam et al. |
| 2016/0199134 A1 | 7/2016 | Brown et al. |
| 2016/0206389 A1 | 7/2016 | Miller |
| 2016/0213432 A1 | 7/2016 | Flexman |
| 2016/0228032 A1 | 8/2016 | Walker et al. |
| 2016/0270865 A1 | 9/2016 | Landey et al. |
| 2016/0287279 A1 | 10/2016 | Bovay et al. |
| 2016/0287346 A1 | 10/2016 | Hyodo et al. |
| 2016/0314710 A1 | 10/2016 | Jarc |
| 2016/0331469 A1 | 11/2016 | Hall et al. |
| 2016/0360947 A1 | 12/2016 | Iida |
| 2016/0372743 A1 | 12/2016 | Cho et al. |
| 2017/0007337 A1 | 1/2017 | Dan |
| 2017/0014034 A1* | 1/2017 | Koo ............... A61B 5/0215 |
| 2017/0023423 A1 | 1/2017 | Jackson |
| 2017/0055851 A1 | 3/2017 | Al-Ali |
| 2017/0079725 A1 | 3/2017 | Hoffman |
| 2017/0079726 A1 | 3/2017 | Hoffman |
| 2017/0189118 A1 | 7/2017 | Chopra |
| 2017/0202627 A1 | 7/2017 | Sramek et al. |
| 2017/0209073 A1 | 7/2017 | Sramek et al. |
| 2017/0215808 A1 | 8/2017 | Shimol et al. |
| 2017/0215969 A1 | 8/2017 | Zhai et al. |
| 2017/0238807 A9 | 8/2017 | Veritkov et al. |
| 2017/0258366 A1 | 9/2017 | Tupin |
| 2017/0290631 A1 | 10/2017 | Lee et al. |
| 2017/0296032 A1 | 10/2017 | Li |
| 2017/0296202 A1 | 10/2017 | Brown |
| 2017/0303941 A1 | 10/2017 | Eisner |
| 2017/0325896 A1 | 11/2017 | Donhowe |
| 2017/0340241 A1 | 11/2017 | Yamada |
| 2017/0348067 A1 | 12/2017 | Krimsky |
| 2017/0360508 A1 | 12/2017 | Germain et al. |
| 2018/0025666 A1 | 1/2018 | Ho et al. |
| 2018/0055576 A1 | 3/2018 | Koyrakh |
| 2018/0055582 A1 | 3/2018 | Krimsky |
| 2018/0098690 A1 | 4/2018 | Iwaki |
| 2018/0217734 A1 | 8/2018 | Koenig et al. |
| 2018/0221038 A1 | 8/2018 | Noonan et al. |
| 2018/0221039 A1 | 8/2018 | Shah |
| 2018/0240237 A1 | 8/2018 | Donhowe et al. |
| 2018/0263714 A1 | 9/2018 | Kostrzewski |
| 2018/0279852 A1 | 10/2018 | Rafii-Tari et al. |
| 2018/0286108 A1 | 10/2018 | Hirakawa |
| 2018/0289431 A1 | 10/2018 | Draper et al. |
| 2018/0308232 A1 | 10/2018 | Gliner |
| 2018/0308247 A1 | 10/2018 | Gupta |
| 2018/0325499 A1 | 11/2018 | Landey et al. |
| 2018/0360435 A1 | 12/2018 | Romo |
| 2018/0368920 A1 | 12/2018 | Ummalaneni |
| 2019/0000559 A1 | 1/2019 | Berman et al. |
| 2019/0000560 A1 | 1/2019 | Berman et al. |
| 2019/0000576 A1 | 1/2019 | Mintz et al. |
| 2019/0046814 A1 | 2/2019 | Senden et al. |
| 2019/0066314 A1 | 2/2019 | Abhari |
| 2019/0086349 A1 | 3/2019 | Nelson |
| 2019/0110839 A1 | 4/2019 | Rafii-Tari et al. |
| 2019/0125164 A1 | 5/2019 | Roelle et al. |
| 2019/0142519 A1 | 5/2019 | Siemionow et al. |
| 2019/0151148 A1 | 5/2019 | Alvarez et al. |
| 2019/0167366 A1 | 6/2019 | Ummalaneni |
| 2019/0175009 A1 | 6/2019 | Mintz |
| 2019/0183585 A1 | 6/2019 | Rafii-Tari et al. |
| 2019/0183587 A1 | 6/2019 | Rafii-Tari et al. |
| 2019/0216548 A1 | 7/2019 | Ummalaneni |
| 2019/0216576 A1 | 7/2019 | Eyre |
| 2019/0223974 A1 | 7/2019 | Romo |
| 2019/0262086 A1 | 8/2019 | Connolly et al. |
| 2019/0269468 A1 | 9/2019 | Hsu et al. |
| 2019/0274764 A1 | 9/2019 | Romo |
| 2019/0287673 A1 | 9/2019 | Michihata |
| 2019/0290109 A1 | 9/2019 | Agrawal et al. |
| 2019/0298460 A1 | 10/2019 | Al-Jadda |
| 2019/0298465 A1 | 10/2019 | Chin |
| 2019/0336238 A1 | 11/2019 | Yu |
| 2019/0365199 A1* | 12/2019 | Zhao ............... A61B 1/2676 |
| 2019/0365201 A1 | 12/2019 | Noonan et al. |
| 2019/0365209 A1 | 12/2019 | Ye et al. |
| 2019/0365479 A1 | 12/2019 | Rafii-Tari |
| 2019/0365486 A1 | 12/2019 | Srinivasan et al. |
| 2019/0375383 A1 | 12/2019 | Alvarez |
| 2019/0380787 A1 | 12/2019 | Ye |
| 2019/0380797 A1 | 12/2019 | Yu |
| 2020/0000533 A1 | 1/2020 | Schuh |
| 2020/0038123 A1 | 2/2020 | Graetzel |

(56) References Cited

U.S. PATENT DOCUMENTS

| | | |
|---|---|---|
| 2020/0039086 A1 | 2/2020 | Meyer |
| 2020/0046434 A1 | 2/2020 | Graetzel |
| 2020/0078103 A1 | 3/2020 | Duindam |
| 2020/0085516 A1 | 3/2020 | DeFonzo |
| 2020/0093549 A1 | 3/2020 | Chin |
| 2020/0093554 A1 | 3/2020 | Schuh |
| 2020/0100855 A1 | 4/2020 | Leparmentier |
| 2020/0107894 A1 | 4/2020 | Wallace |
| 2020/0121502 A1 | 4/2020 | Kintz |
| 2020/0146769 A1 | 5/2020 | Eyre |
| 2020/0155084 A1 | 5/2020 | Walker |
| 2020/0170630 A1 | 6/2020 | Wong |
| 2020/0170720 A1 | 6/2020 | Ummalaneni |
| 2020/0171660 A1 | 6/2020 | Ho |
| 2020/0188043 A1 | 6/2020 | Yu |
| 2020/0197112 A1 | 6/2020 | Chin |
| 2020/0206472 A1 | 7/2020 | Ma |
| 2020/0217733 A1 | 7/2020 | Lin |
| 2020/0222134 A1 | 7/2020 | Schuh |
| 2020/0237458 A1 | 7/2020 | DeFonzo |
| 2020/0261172 A1 | 8/2020 | Romo |
| 2020/0268459 A1 | 8/2020 | Noonan et al. |
| 2020/0268460 A1 | 8/2020 | Tse |
| 2020/0281787 A1 | 9/2020 | Ruiz |
| 2020/0297437 A1 | 9/2020 | Schuh |
| 2020/0305983 A1 | 10/2020 | Yampolsky |
| 2020/0305989 A1 | 10/2020 | Schuh |
| 2020/0305992 A1 | 10/2020 | Schuh |
| 2020/0315717 A1 | 10/2020 | Bovay |
| 2020/0315723 A1 | 10/2020 | Hassan |
| 2020/0323596 A1 | 10/2020 | Moll |
| 2020/0330167 A1 | 10/2020 | Romo |
| 2020/0345216 A1 | 11/2020 | Jenkins |
| 2020/0352420 A1 | 11/2020 | Graetzel |
| 2020/0360183 A1 | 11/2020 | Alvarez |
| 2020/0367726 A1 | 11/2020 | Landey et al. |
| 2020/0367981 A1 | 11/2020 | Ho et al. |
| 2020/0375678 A1 | 12/2020 | Wallace |
| 2020/0405317 A1 | 12/2020 | Wallace |
| 2020/0405411 A1 | 12/2020 | Draper et al. |
| 2020/0405419 A1 | 12/2020 | Mao |
| 2020/0405420 A1 | 12/2020 | Purohit |
| 2020/0405423 A1 | 12/2020 | Schuh |
| 2020/0405424 A1 | 12/2020 | Schuh |
| 2020/0405434 A1 | 12/2020 | Schuh |
| 2020/0406002 A1 | 12/2020 | Romo |

FOREIGN PATENT DOCUMENTS

| | | |
|---|---|---|
| CN | 102316817 | 1/2012 |
| CN | 102458295 | 5/2012 |
| CN | 102946801 | 2/2013 |
| CN | 102973317 | 3/2013 |
| CN | 103705307 | 4/2014 |
| CN | 103735313 | 4/2014 |
| CN | 103813748 | 5/2014 |
| CN | 104758066 | 7/2015 |
| CN | 105559850 | 5/2016 |
| CN | 105559886 | 5/2016 |
| CN | 105611881 | 5/2016 |
| CN | 106455908 | 2/2017 |
| CN | 106821498 | 6/2017 |
| CN | 104931059 | 9/2018 |
| EP | 3 025 630 | 6/2016 |
| KR | 10-2014-0009359 | 1/2014 |
| KR | 10-1713676 B1 | 3/2017 |
| RU | 2569699 C2 | 11/2015 |
| WO | WO 05/087128 | 9/2005 |
| WO | WO 06/051523 | 5/2006 |
| WO | 2006124388 A1 | 11/2006 |
| WO | WO 09/097461 | 6/2007 |
| WO | 2010048160 A2 | 4/2010 |
| WO | 2010133733 A1 | 11/2010 |
| WO | 2011125007 A1 | 10/2011 |
| WO | 2011136867 A1 | 11/2011 |
| WO | 2012109760 A1 | 8/2012 |
| WO | 2013039564 A2 | 3/2013 |
| WO | 2015034906 A1 | 3/2015 |
| WO | WO 15/089013 | 6/2015 |
| WO | 2015119573 A1 | 8/2015 |
| WO | WO 16/077419 | 5/2016 |
| WO | WO 16/203727 | 12/2016 |
| WO | WO 17/030916 | 2/2017 |
| WO | WO 17/036774 | 3/2017 |
| WO | WO 17/048194 | 3/2017 |
| WO | WO 17/066108 | 4/2017 |
| WO | WO 17/146890 | 8/2017 |
| WO | WO 17/167754 | 10/2017 |

OTHER PUBLICATIONS

Al-Ahmad et al., dated 2005, Early experience with a computerized robotically controlled catheter system, Journal of Interventional Cardiac Electrophysiology, 12:199-202.
Bell et al., 2014, Six DOF motion estimation for teleoperated flexible endoscopes using optical flow: a comparative study, IEEE International Conference on Robotics and Automation.
Ciuti et al., 2012, Intra-operative monocular 30 reconstruction for image-guided navigation in active locomotion capsule endoscopy. Biomedical Robotics And Biomechatronics (Biorob), 4th IEEE Ras & Embs International Conference On IEEE.
Fallavollita et al., 2010, Acquiring multiview C-arm images to assist cardiac ablation procedures, EURASIP Journal on Image and Video Processing, vol. 2010, Article ID 871408, pp. 1-10.
Gutierrez et al., Mar. 2008, A practical global distortion correction method for an image intensifier based x-ray fluoroscopy system, Med. Phys, 35(3):997-1007.
Haigron et al., 2004, Depth-map-based scene analysis for active navigation in virtual angioscopy, IEEE Transactions on Medical Imaging, 23(11):1380-1390.
Hansen Medical, Inc. 2005, System Overview, product brochure, 2 pp., dated as available at http://hansenmedical.com/system.aspx on Jul. 14, 2006 (accessed Jun. 25, 2019 using the internet archive way back machine).
Hansen Medical, Inc. Bibliography, product brochure, 1 p., dated as available at http://hansenmedical.com/bibliography.aspx on Jul. 14, 2006 (accessed Jun. 25, 2019 using the internet archive way back machine).
Hansen Medical, Inc. dated 2007, Introducing the Sensei Robotic Catheter System, product brochure, 10 pp.
Hansen Medical, Inc. dated 2009, Sensei X Robotic Catheter System, product brochure, 5 pp.
Hansen Medical, Inc. Technology Advantages, product brochure, 1 p., dated as available at http://hansenmedical.com/advantages.aspx on Jul. 13, 2006 (accessed Jun. 25, 2019 using the internet archive way back machine).
Kiraly et al, 2002, Three-dimensional Human Airway Segmentation Methods for Clinical Virtual Bronchoscopy, Acad Radiol, 9:1153-1168.
Kiraly et al., Sep. 2004, Three-dimensional path planning for virtual bronchoscopy, IEEE Transactions on Medical Imaging, 23(9):1365-1379.
Konen et al., 1998, The VN-project: endoscopic image processing for neurosurgery, Computer Aided Surgery, 3:1-6.
Kumar et al., 2014, Stereoscopic visualization of laparoscope image using depth information from 3D model, Computer methods and programs in biomedicine 113(3):862-868.
Livatino et al., 2015, Stereoscopic visualization and 3-D technologies in medical endoscopic teleoperation, IEEE.
Luo et al., 2010, Modified hybrid bronchoscope tracking based on sequential monte carlo sampler: Dynamic phantom validation, Asian Conference on Computer Vision. Springer, Berlin, Heidelberg.
Marrouche et al., dated May 6, 2005, AB32-1, Preliminary human experience using a novel robotic catheter remote control, Heart Rhythm, 2(5):S63.
Mayo Clinic, Robotic Surgery, https://www.mayoclinic.org/tests-procedures/robotic-surgery/about/pac-20394974?p=1, downloaded from the internet on Jul. 12, 2018, 2 pp.

(56) References Cited

OTHER PUBLICATIONS

Mourgues et al., 2002, Flexible calibration of actuated stereoscopic endoscope for overlay in robot assisted surgery, International Conference on Medical Image Computing and Computer-Assisted Intervention. Springer, Berlin, Heidelberg.
Nadeem et al., 2016, Depth Reconstruction and Computer-Aided Polyp Detection in Optical Colonoscopy Video Frames, arXiv preprint arXiv:1609.01329.
Oh et al., dated May 2005, P5-75, Novel robotic catheter remote control system: safety and accuracy in delivering RF Lesions in all 4 cardiac chambers, Heart Rhythm, 2(5):S277-S278.
Point Cloud, Sep. 10, 2010, Wikipedia, 2 pp.
Racadio et al., Dec. 2007, Live 3D guidance in the interventional radiology suite, AJR, 189:W357-W364.
Reddy et al., May 2005, P1-53. Porcine pulmonary vein ablation using a novel robotic catheter control system and real-time integration of CT imaging with electroanatomical mapping, Hearth Rhythm, 2(5):S121.
Ren et al., 2011, Multisensor data fusion in an integrated tracking systEm for endoscopic surgery, IEEE Transactions on Information Technology in Biomedicine, 16(1):106-111.
Sato et al., 2016, Techniques of stapler-based navigational thoracoscopic segmentectomy using virtual assisted lung mapping (VAL-MAP), Journal of Thoracic Disease, 8(Suppl 9):S716.
Shen et al., 2015, Robust camera localisation with depth reconstruction for bronchoscopic navigation. International Journal of Computer Assisted Radiology and Surgery, 10(6):801-813.
Shi et al., Sep. 14-18, 2014, Simultaneous catheter and environment modeling for trans-catheter aortic valve implantation, IEEE/RSJ International Conference on Intelligent Robots and Systems, pp. 2024-2029.
Slepian, dated 2010, Robotic Catheter Intervention: the Hansen Medical Sensei Robot Catheter System, PowerPoint presentation, 28 pp.
Solheim et al., May 14, 2009, Navigated resection of giant intracranial meningiomas based on intraoperative 3D ultrasound, Acta Neurochir, 151:1143-1151.
Solomon et al., Dec. 2000, Three-dimensional CT-Guided Bronchoscopy With a Real-Time Electromagnetic Position Sensor A Comparison of Two Image Registration Methods, Chest, 118(6):1783-1787.
Song et al., 2012, Autonomous and stable tracking of endoscope instrument tools with monocular camera, Advanced Intelligent Mechatronics (AIM), 2012 IEEE-ASME International Conference on. IEEE.
Vemuri et al., Dec. 2015, Inter-operative biopsy site relocations in endoluminal surgery, IEEE Transactions on Biomedical Engineering, Institute of Electrical and Electronics Engineers, <10.1109/TBME.2015.2503981>. <hal-01230752>.
Verdaasdonk et al., Jan. 23, 2012, Effect of microsecond pulse length and tip shape on explosive bubble formation of 2.78 μm Er,Cr;YSGG and 2.94 μm Er:YAG laser, Proceedings of SPIE, vol. 8221, 12.
Wilson et al., 2008, a buyer's guide to electromagnetic tracking systems for clinical applications, Proc. of SPCI, 6918:69182B-1 p. 6918B-11.
Yip et al., 2012, Tissue tracking and registration for image-guided surgery, IEEE transactions on medical imaging 31(11):2169-2182.
Zhou et al., 2010, Synthesis of stereoscopic views from monocular endoscopic videos, Computer Vision and Pattern Recognition Workshops (CVPRW), 2010 IEEE Computer Society Conference on IEEE.
Dela Cruz CS, Tanoue LT, Matthay RA. Lung cancer: epidemiology, etiology, and prevention. Clin Chest Med. Dec. 2011; 32(4): pp. 605-644.
D.E. Ost et al. "Diagnostic Yield and Complications of Bronchoscopy for Peripheral Lung Lesions. Results of the AQuIRE Registry." American journal of respiratory and critical care medicine 193, (2016): pp. 68-77.

DiBardino DM, Yarmus LB, Semaan RW. Transthoracic needle biopsy of the lung. J Thorac Dis. Dec. 2015; 7(Suppl 4): pp. S304-S16.
Wu, Yihong & Tang, Fulin & Li, Heping. Image-based camera localization: an overview. Visual Computing for Industry, Biomedicine, and Art. 1:8 (2018) pp. 1-13.
Rafii-Tari, Hedyeh, Christopher J. Payne, and Guang-Zhong Yang. "Current and emerging robot-assisted endovascular catheterization technologies: a review." Annals of biomedical engineering 42 (2014): 697-715.
J. Rosell, A. Pérez, P. Cabras and A. Rosell, "Motion planning for the Virtual Bronchoscopy," 2012 IEEE International Conference on Robotics and Automation, Saint Paul, MN, USA, 2012, pp. 2932-2937.
Reynisson, Pall J., et al. "Navigated Bronchoscopy." Journal of Bronchology & Interventional Pulmonology 21.3 (2014): 242-264.
Andolfi, Marco, et al. "The role of bronchoscopy in the diagnosis of early lung cancer: a review." Journal of thoracic disease 8.11 (2016): 3329-3337.
Zhang, Weisan, et al. "Meta-analysis of the diagnostic yield and safety of electromagnetic navigation bronchoscopy for lung nodules." Journal of thoracic disease 7.5 (2015): 799-809.
Rai, Lav, James P. Helferty, and William E. Higgins. "Combined video tracking and image-video registration for continuous bronchoscopic guidance." International Journal of Computer Assisted Radiology and Surgery 3 (2008): 315-329.
Mori, K. et al. (2001). A Method for Tracking the Camera Motion of Real Endoscope by Epipolar Geometry Analysis and Virtual Endoscopy System. In: Niessen, W.J., Viergever, M.A. (eds) Medical Image Computing and Computer-Assisted Intervention—MICCAI 2001, pp. 1-8.
Patrick D. Byrnes, William E. Higgins, "Construction of a multimodal CT-video chest model," Proc. SPIE 9036, Medical Imaging 2014: Image-Guided Procedures, Robotic Interventions, and Modeling, 903607, pp. 5341-5351, (Mar. 12, 2014).
Visentini-Scarzanella, Marco, et al. "Deep monocular 3D reconstruction for assisted navigation in bronchoscopy." International journal of computer assisted radiology and surgery 12 (2017): 1089-1099.
Shen, M., Giannarou, S., Shah, P. L., & Yang, G. Z. (2017). Branch: Bifurcation recognition for airway navigation based on structural characteristics. In Medical Image Computing and Computer-Assisted Intervention—MICCAI 2017: 20th International Conference, Quebec City, QC, Canada, Sep. 11-13, 2017, Proceedings, Part II 20 (pp. 182-189). Springer International Publishing.
Sánchez, C., Esteban-Lansaque, A., Borrás, A., Diez-Ferrer, M., Rosell, A., & Gil, D. (2017). Towards a Videobronchoscopy Localization System from Airway Centre Tracking. In VISIGRAPP (4: VISAPP) (pp. 352-359).
Hofstad, E. F., Sorger, H., Leira, H. O., Amundsen, T., & Langø, T. (2014). Automatic registration of CT images to patient during the initial phase of bronchoscopy: a clinical pilot study. Medical physics, 41(4), pp. 041903-1-041903-11.
Luo, X., & Mori, K. (2014). A discriminative structural similarity measure and its application to video-volume registration for endoscope three-dimensional motion tracking. IEEE transactions on medical imaging, 33(6), 1248-1261.
Merritt, S. A., Khare, R., Bascom, R., & Higgins, W. E. (2013). Interactive CT-video registration for the continuous guidance of bronchoscopy. IEEE transactions on Medical Imaging, 32(8), 1376-1396.
Zhou, X., Zhu, M., Leonardos, S., Derpanis, K. G., & Daniilidis, K. (2016). Sparseness meets deepness: 3d human pose estimation from monocular video. In Proceedings of the IEEE conference on computer vision and pattern recognition (pp. 4966-4975).
Andrychowicz, O. M., Baker, B., Chociej, M., Jozefowicz, R., McGrew, B., Pachocki, J., . . . & Zaremba, W. Learning dexterous in-hand manipulation. arXiv:1808.00177v1 [cs.LG], Aug. 1, 2018, pp. 1-27.
Geiger, A., Lenz, P., & Urtasun, R. (Jun. 2012). Are we ready for autonomous driving? the kitti vision benchmark suite. In 2012 IEEE conference on computer vision and pattern recognition (pp. 3354-3361). IEEE.

(56) References Cited

OTHER PUBLICATIONS

Sganga, J., Eng, D., Graetzel, C., & Camarillo, D. (May 2019). Offsetnet: Deep learning for localization in the lung using rendered images. In 2019 international conference on robotics and automation (ICRA) (pp. 5046-5052). IEEE.

J. Tobin, R. Fong, A. Ray, J. Schneider, W. Zaremba and P. Abbeel, "Domain randomization for transferring deep neural networks from simulation to the real world," 2017 IEEE/RSJ International Conference on Intelligent Robots and Systems (IROS), Vancouver, BC, Canada, 2017, pp. 23-30.

Zhu, J. Y., Park, T., Isola, P., & Efros, A. A. (2017). Unpaired image-to-image translation using cycle-consistent adversarial networks. In Proceedings of the IEEE international conference on computer vision (pp. 2223-2232).

Craig, J.J., Book Reviews, Introduction to robotics: Mechanics and control. IEEE Journal on Robotics and Automation, 3(2), pp. 166 (1987).

He, K., Zhang, X., Ren,S., Sun, J. Deep Residual Learning for Image Recognition. arXiv:1512.03385v1 [cs.CV], Dec. 10, 2015, pp. 1-12.

Abadi, M., Agarwal, A., Barham, P., Brevdo, E., Chen, Z., Citro, C., . . . & Zheng, X. (2016). Tensorflow: Large-scale machine learning on heterogeneous distributed systems. arXiv preprint arXiv:1603.04467, pp. 265-283.

Fletcher, R., & Powell, M. J. (1963). A rapidly convergent descent method for minimization. The computer journal, 6(2), 163-168.

Mansoor, A., Bagci, U., Foster, B., Xu, Z., Papadakis, G. Z., Folio, L. R., . . . & Mollura, D. J. (2015). Segmentation and image analysis of abnormal lungs at CT: current approaches, challenges, and future trends. Radiographics, 35(4), 1056-1076.

Higgins, W. E., Helferty, J. P., Lu, K., Merritt, S. A., Rai, L., & Yu, K. C. (2008). 3D CT-video fusion for image-guided bronchoscopy. Computerized Medical Imaging and Graphics, 32(3), 159-173.

Johnson, J., Alahi, A., Fei-Fei, L., Perceptual Losses for Real-Time Style Transfer and Super Resolution. arXiv:1603.08155v1 [cs.CV], Mar. 27, 2016, pp. 1-18.

Metzger, R. J., Klein, O. D., Martin, G. R., & Krasnow, M. A. (2008). The branching programme of mouse lung development. Nature, 453(7196), 745-750.

* cited by examiner

SYSTEMS AND METHODS FOR LOCALIZATION BASED ON MACHINE LEARNING

CROSS-REFERENCE TO RELATED APPLICATION(S)

This application claims the benefit of U.S. Provisional Application No. 62/821,993, filed Mar. 21, 2019, which is hereby incorporated by reference in its entirety.

TECHNICAL FIELD

The systems and methods disclosed herein relate to medical robotics, and more particularly to deep learning methods-assisted, image-based localization of an anatomical region in a body.

BACKGROUND

Medical procedures such as endoscopy (e.g., bronchoscopy) may involve accessing and visualizing the inside of a patient's lumen (e.g., airways) for diagnostic and/or therapeutic purposes. During a procedure, a flexible tubular tool such as, for example, an endoscope, may be inserted into the patient's body and an instrument can be passed through the endoscope to a tissue site identified for diagnosis and/or treatment.

Bronchoscopy is a medical procedure that allows a physician to examine the inside conditions of a patient's lung airways, such as bronchi and bronchioles. During the medical procedure, a thin, flexible tubular tool, known as a bronchoscope, may be inserted into the patient's mouth and passed down the patient's throat into his/her lung airways towards a tissue site identified for subsequent diagnosis and treatment. The bronchoscope can have an interior lumen (a "working channel") providing a pathway to the tissue site, and catheters and various medical tools can be inserted through the working channel to the tissue site.

SUMMARY

An endoscopy localization and/or navigation system can use a fusion of different sensing modalities (e.g., scope imaging data, electromagnetic (EM) position data, robotic position data, etc.) modeled, for example, through adaptively-adjusted probabilities. A probabilistic navigation approach or other navigation approach may depend on an initial estimate of "where" the tip of the endoscope is—for example, an estimate of which airway, how deep into this airway, and how much roll in this airway—in order to begin tracking the tip of the endoscope. Some endoscopy techniques can involve a three-dimensional (3D) model of a patient's anatomy, and can guide navigation using one or more sensing modalities, such as an EM field, position sensors, and/or image sensors. At the outset of a procedure, the precise alignment (e.g., registration) between the virtual space of the 3D model, the physical space of the patient's anatomy represented by the 3D model, and the one or more sensing modalities (e.g., image sensors, EM field, etc.) may be unknown. As such, prior to generating a registration or in situations where the accuracy of an existing registration is in question, endoscope positions within the patient's anatomy cannot be mapped with precision to corresponding locations within the 3D model.

A navigation system may require the physician to undergo a series of initialization steps in order to generate this initial estimate. This can involve, for example, instructing the physician to position a bronchoscope at a number of specific positions and orientations relative to landmark(s) within the bronchial tree (e.g., by touching the main carina, the left carina, and the right carina). Another option requires the physician to perform an initial airway survey, for example, starting in the mid-trachea and entering each lobe while attempting to maintain a centered position of the bronchoscope tip within each airway.

Such initialization steps can provide an initial estimate of the endoscope position; however, such an approach may have several potential drawbacks including adding additional time requirements to the beginning of the procedure. Another potential drawback relates to the fact that, after the initialization has been completed and tracking is occurring, an adverse event (e.g., patient coughing, dynamic airway collapse) can create uncertainty about the actual position of the endoscope. This can necessitate determination of a new "initial" position, and accordingly the navigation system may require the physician to navigate back to the trachea to re-perform the initialization steps. Such backtracking adds additional time requirements that can be particularly burdensome if the adverse event occurs after the endoscope has been navigated through the smaller peripheral airways toward a target site.

The aforementioned issues, among others, are addressed by the luminal network navigation systems and techniques described herein. The disclosed techniques can generate a 3D model of a virtual luminal network representing the patient's anatomical luminal network and can determine a number of locations within the virtual luminal network at which to position a virtual camera. The disclosed techniques can determine an estimated position of the medical instrument within the luminal network using a machine learning model in conjunction with an imaging device. During the medical procedure, the distal end of an endoscope can be provided with an imaging device, and the disclosed navigation techniques can generate an expected or approximate location of the distal end of the endoscope based on identified branchings within the image data received from the imaging devices. The disclosed techniques can derive features from the images, correlate the features of the images with the 3D model, and then use the associated virtual camera location as the initial position of the distal end of the instrument. Beneficially, such techniques allow a probabilistic navigation system (or other navigation systems) to obtain an initial estimate of scope position without requiring the manual initialization steps described above. In addition, the disclosed techniques can be used throughout a procedure to refine registration and, in some embodiments, can provide an additional "initial estimate" after an adverse event without requiring navigation back through the luminal network to a landmark anatomical feature.

Accordingly, in some embodiments a system for localization within a luminal network can include an instrument, at least one computer-readable memory, and one or more processors. The instrument can include an elongate body that is configured to be inserted into the luminal network. The instrument can also include an imaging device that is positioned on a distal portion of the elongate body. The at least one computer-readable memory can have stored thereon executable instructions. The one or more processors can be in communication with the at least one computer-readable memory and can be configured to execute the instructions to cause the system to perform various functions. The one or more processors can cause the system to receive, from the imaging device, image data comprising an image captured when the elongate body is within the luminal network. The image can depict one or more branchings of the luminal network. The one or more processors can cause the system to access a machine learning model of one or more luminal networks. The one or more processors can cause the system to determine, based on the machine learning model and information regarding the one or more branchings, a location of the distal portion of the elongate body within the luminal network.

In some embodiments, a computer-implemented method of training a neural network to facilitate localization within a luminal network can include accessing a three-dimensional (3D) representation of the luminal network. The method can include accessing one or more images of an interior of the luminal network. The images can depict branchings of the luminal network from a perspective of an imaging device within the luminal network. The method can further include determining, based on the images of the interior of the luminal network and the 3D representation of the luminal network, a mapping between each image and a corresponding location within the 3D representation. The method can include setting, based on the mapping, weighting values of the neural network to identify, within image data presented to the neural network, a corresponding branching of the luminal network and a location of the corresponding branching within the luminal network.

In some embodiments, a non-transitory computer readable storage medium can have stored thereon instructions that, when executed, cause at least one computing device to obtain input data that includes a plurality of images illustrating areas within an anatomical region of a body. The instructions can, when executed, cause the system to process the input data using a neural network. The neural network can be configured through training to receive the input data and to process the input data to output localization parameters for the areas within the anatomical region.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

1. Overview

Aspects of the present disclosure may be integrated into a robotically-enabled medical system capable of performing a variety of medical procedures, including both minimally invasive, such as laparoscopy, and non-invasive, such as endoscopy, procedures. Among endoscopic procedures, the system may be capable of performing bronchoscopy, ureteroscopy, gastroscopy, etc.

In addition to performing the breadth of procedures, the system may provide additional benefits, such as enhanced imaging and guidance to assist the physician. Additionally, the system may provide the physician with the ability to perform the procedure from an ergonomic position without the need for awkward arm motions and positions. Still further, the system may provide the physician with the ability to perform the procedure with improved ease of use such that one or more of the instruments of the system can be controlled by a single user.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

A. Robotic System—Cart

Figure 1:
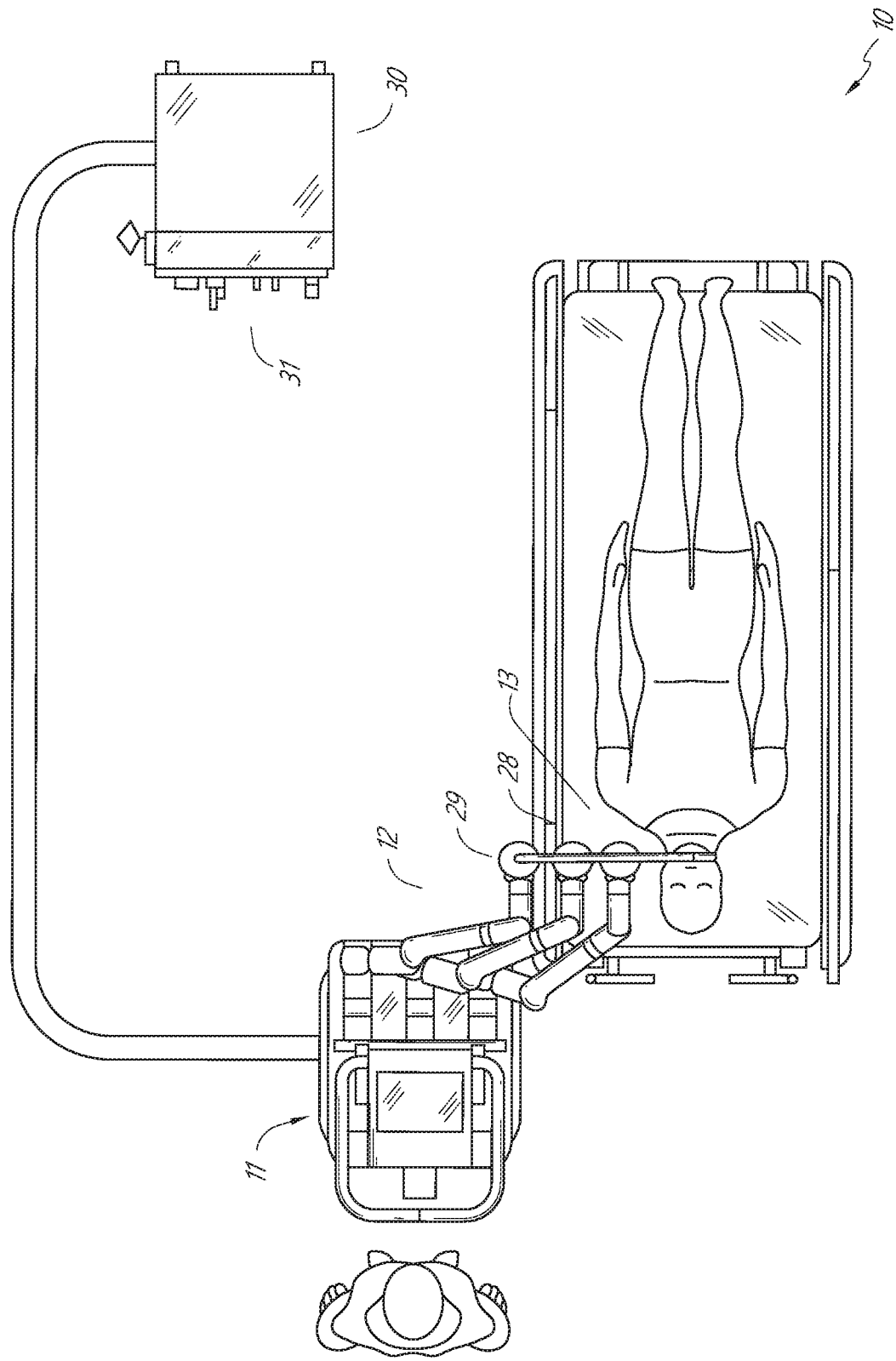
FIG. 1 illustrates an embodiment of a cart-based robotic system arranged for diagnostic and/or therapeutic bronchoscopy.
Figure 2:
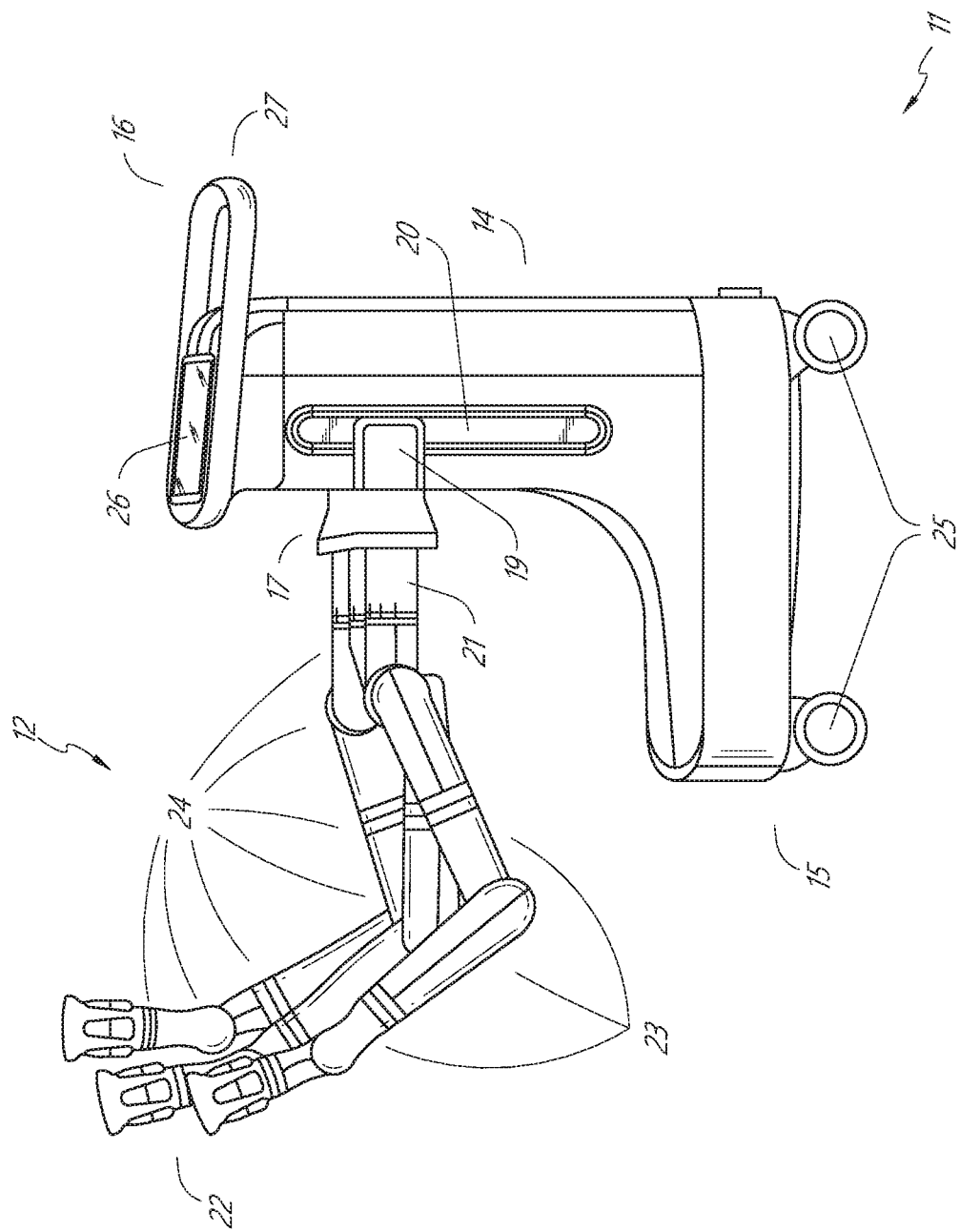
FIG. 2 depicts further aspects of the robotic system of FIG. 1.

The robotically-enabled medical system may be configured in a variety of ways depending on the particular procedure. FIG. 1 illustrates an embodiment of a cart-based robotically-enabled system 10 arranged for a diagnostic and/or therapeutic bronchoscopy. During a bronchoscopy, the system 10 may comprise a cart 11 having one or more robotic arms 12 to deliver a medical instrument, such as a steerable endoscope 13, which may be a procedure-specific bronchoscope for bronchoscopy, to a natural orifice access point (i.e., the mouth of the patient positioned on a table in the present example) to deliver diagnostic and/or therapeutic tools. As shown, the cart 11 may be positioned proximate to the patient's upper torso in order to provide access to the access point. Similarly, the robotic arms 12 may be actuated to position the bronchoscope relative to the access point. The arrangement in FIG. 1 may also be utilized when performing a gastro-intestinal (GI) procedure with a gastroscope, a specialized endoscope for GI procedures. FIG. 2 depicts an example embodiment of the cart in greater detail.

With continued reference to FIG. 1, once the cart 11 is properly positioned, the robotic arms 12 may insert the steerable endoscope 13 into the patient robotically, manually, or a combination thereof. As shown, the steerable endoscope 13 may comprise at least two telescoping parts, such as an inner leader portion and an outer sheath portion, each portion coupled to a separate instrument driver from the set of instrument drivers 28, each instrument driver coupled to the distal end of an individual robotic arm. This linear arrangement of the instrument drivers 28, which facilitates coaxially aligning the leader portion with the sheath portion, creates a "virtual rail" 29 that may be repositioned in space by manipulating the one or more robotic arms 12 into different angles and/or positions. The virtual rails described herein are depicted in the Figures using dashed lines, and accordingly the dashed lines do not depict any physical structure of the system. Translation of the instrument drivers 28 along the virtual rail 29 telescopes the inner leader portion relative to the outer sheath portion or advances or retracts the endoscope 13 from the patient. The angle of the virtual rail 29 may be adjusted, translated, and pivoted based on clinical application or physician preference. For example, in bronchoscopy, the angle and position of the virtual rail 29 as shown represents a compromise between providing physician access to the endoscope 13 while minimizing friction that results from bending the endoscope 13 into the patient's mouth.

The endoscope 13 may be directed down the patient's trachea and lungs after insertion using precise commands from the robotic system until reaching the target destination or operative site. In order to enhance navigation through the patient's lung network and/or reach the desired target, the endoscope 13 may be manipulated to telescopically extend the inner leader portion from the outer sheath portion to obtain enhanced articulation and greater bend radius. The use of separate instrument drivers 28 also allows the leader portion and sheath portion to be driven independently of each other.

For example, the endoscope 13 may be directed to deliver a biopsy needle to a target, such as, for example, a lesion or nodule within the lungs of a patient. The needle may be deployed down a working channel that runs the length of the endoscope to obtain a tissue sample to be analyzed by a pathologist. Depending on the pathology results, additional tools may be deployed down the working channel of the endoscope for additional biopsies. After identifying a nodule to be malignant, the endoscope 13 may endoscopically deliver tools to resect the potentially cancerous tissue. In some instances, diagnostic and therapeutic treatments can be delivered in separate procedures. In those circumstances, the endoscope 13 may also be used to deliver a fiducial to "mark" the location of the target nodule as well. In other instances, diagnostic and therapeutic treatments may be delivered during the same procedure.

The system 10 may also include a movable tower 30, which may be connected via support cables to the cart 11 to provide support for controls, electronics, fluidics, optics, sensors, and/or power to the cart 11. Placing such functionality in the tower 30 allows for a smaller form factor cart 11 that may be more easily adjusted and/or re-positioned by an operating physician and his/her staff. Additionally, the division of functionality between the cart/table and the support tower 30 reduces operating room clutter and facilitates improving clinical workflow. While the cart 11 may be positioned close to the patient, the tower 30 may be stowed in a remote location to stay out of the way during a procedure.

In support of the robotic systems described above, the tower 30 may include component(s) of a computer-based control system that stores computer program instructions, for example, within a non-transitory computer-readable storage medium such as a persistent magnetic storage drive, solid state drive, etc. The execution of those instructions, whether the execution occurs in the tower 30 or the cart 11, may control the entire system or sub-system(s) thereof. For example, when executed by a processor of the computer system, the instructions may cause the components of the robotics system to actuate the relevant carriages and arm mounts, actuate the robotics arms, and control the medical instruments. For example, in response to receiving the control signal, the motors in the joints of the robotics arms may position the arms into a certain posture.

The tower 30 may also include a pump, flow meter, valve control, and/or fluid access in order to provide controlled irrigation and aspiration capabilities to the system that may be deployed through the endoscope 13. These components may also be controlled using the computer system of the tower 30. In some embodiments, irrigation and aspiration capabilities may be delivered directly to the endoscope 13 through separate cable(s).

The tower 30 may include a voltage and surge protector designed to provide filtered and protected electrical power to the cart 11, thereby avoiding placement of a power transformer and other auxiliary power components in the cart 11, resulting in a smaller, more moveable cart 11.

The tower 30 may also include support equipment for the sensors deployed throughout the robotic system 10. For example, the tower 30 may include optoelectronics equipment for detecting, receiving, and processing data received from the optical sensors or cameras throughout the robotic system 10. In combination with the control system, such optoelectronics equipment may be used to generate real-time images for display in any number of consoles deployed throughout the system, including in the tower 30. Similarly, the tower 30 may also include an electronic subsystem for receiving and processing signals received from deployed electromagnetic (EM) sensors. The tower 30 may also be used to house and position an EM field generator for detection by EM sensors in or on the medical instrument.

The tower 30 may also include a console 31 in addition to other consoles available in the rest of the system, e.g., console mounted on top of the cart. The console 31 may include a user interface and a display screen, such as a touchscreen, for the physician operator. Consoles in the system 10 are generally designed to provide both robotic controls as well as preoperative and real-time information of the procedure, such as navigational and localization information of the endoscope 13. When the console 31 is not the only console available to the physician, it may be used by a second operator, such as a nurse, to monitor the health or vitals of the patient and the operation of the system 10, as well as to provide procedure-specific data, such as navigational and localization information. In other embodiments, the console 30 is housed in a body that is separate from the tower 30.

The tower 30 may be coupled to the cart 11 and endoscope 13 through one or more cables or connections (not shown). In some embodiments, the support functionality from the tower 30 may be provided through a single cable to the cart 11, simplifying and de-cluttering the operating room. In other embodiments, specific functionality may be coupled in separate cabling and connections. For example, while power may be provided through a single power cable to the cart 11, the support for controls, optics, fluidics, and/or navigation may be provided through a separate cable.

FIG. 2 provides a detailed illustration of an embodiment of the cart 11 from the cart-based robotically-enabled system shown in FIG. 1. The cart 11 generally includes an elongated support structure 14 (often referred to as a "column"), a cart base 15, and a console 16 at the top of the column 14. The column 14 may include one or more carriages, such as a carriage 17 (alternatively "arm support") for supporting the deployment of one or more robotic arms 12 (three shown in FIG. 2). The carriage 17 may include individually configurable arm mounts that rotate along a perpendicular axis to adjust the base of the robotic arms 12 for better positioning relative to the patient. The carriage 17 also includes a carriage interface 19 that allows the carriage 17 to vertically translate along the column 14.

The carriage interface 19 is connected to the column 14 through slots, such as slot 20, that are positioned on opposite sides of the column 14 to guide the vertical translation of the carriage 17. The slot 20 contains a vertical translation interface to position and hold the carriage 17 at various vertical heights relative to the cart base 15. Vertical translation of the carriage 17 allows the cart 11 to adjust the reach of the robotic arms 12 to meet a variety of table heights, patient sizes, and physician preferences. Similarly, the individually configurable arm mounts on the carriage 17 allow the robotic arm base 21 of the robotic arms 12 to be angled in a variety of configurations.

In some embodiments, the slot 20 may be supplemented with slot covers that are flush and parallel to the slot surface to prevent dirt and fluid ingress into the internal chambers of the column 14 and the vertical translation interface as the carriage 17 vertically translates. The slot covers may be deployed through pairs of spring spools positioned near the vertical top and bottom of the slot 20. The covers are coiled within the spools until deployed to extend and retract from their coiled state as the carriage 17 vertically translates up and down. The spring-loading of the spools provides force to retract the cover into a spool when the carriage 17 translates towards the spool, while also maintaining a tight seal when the carriage 17 translates away from the spool. The covers may be connected to the carriage 17 using, for example, brackets in the carriage interface 19 to ensure proper extension and retraction of the cover as the carriage 17 translates.

The column 14 may internally comprise mechanisms, such as gears and motors, that are designed to use a vertically aligned lead screw to translate the carriage 17 in a mechanized fashion in response to control signals generated in response to user inputs, e.g., inputs from the console 16.

The robotic arms 12 may generally comprise robotic arm bases 21 and end effectors 22, separated by a series of linkages 23 that are connected by a series of joints 24, each joint comprising an independent actuator, each actuator comprising an independently controllable motor. Each independently controllable joint represents an independent degree of freedom available to the robotic arm 12. Each of the robotic arms 12 may have seven joints, and thus provide seven degrees of freedom. A multitude of joints result in a multitude of degrees of freedom, allowing for "redundant" degrees of freedom. Having redundant degrees of freedom allows the robotic arms 12 to position their respective end effectors 22 at a specific position, orientation, and trajectory in space using different linkage positions and joint angles. This allows for the system to position and direct a medical instrument from a desired point in space while allowing the physician to move the arm joints into a clinically advantageous position away from the patient to create greater access, while avoiding arm collisions.

The cart base 15 balances the weight of the column 14, carriage 17, and robotic arms 12 over the floor. Accordingly, the cart base 15 houses heavier components, such as electronics, motors, power supply, as well as components that either enable movement and/or immobilize the cart 11. For example, the cart base 15 includes rollable wheel-shaped casters 25 that allow for the cart 11 to easily move around the room prior to a procedure. After reaching the appropriate position, the casters 25 may be immobilized using wheel locks to hold the cart 11 in place during the procedure.

Positioned at the vertical end of the column 14, the console 16 allows for both a user interface for receiving user input and a display screen (or a dual-purpose device such as, for example, a touchscreen 26) to provide the physician user with both preoperative and intraoperative data. Potential preoperative data on the touchscreen 26 may include preoperative plans, navigation and mapping data derived from preoperative computerized tomography (CT) scans, and/or notes from preoperative patient interviews. Intraoperative data on display may include optical information provided from the tool, sensor and coordinate information from sensors, as well as vital patient statistics, such as respiration, heart rate, and/or pulse. The console 16 may be positioned and tilted to allow a physician to access the console 16 from the side of the column 14 opposite the carriage 17. From this position, the physician may view the console 16, robotic arms 12, and patient while operating the console 16 from behind the cart 11. As shown, the console 16 also includes a handle 27 to assist with maneuvering and stabilizing the cart 11.

Figure 3:
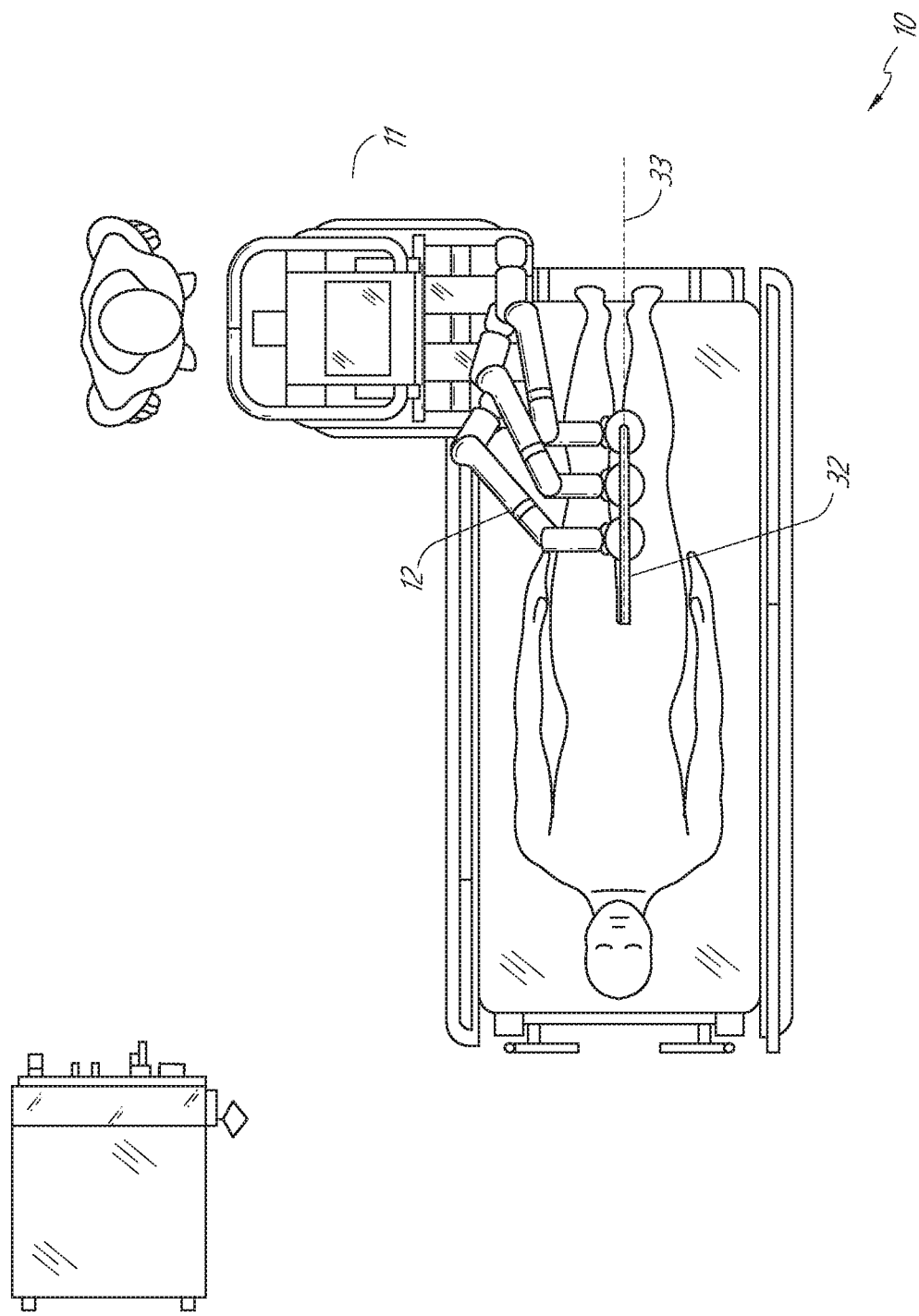
FIG. 3 illustrates an embodiment of the robotic system of FIG. 1 arranged for ureteroscopy.

FIG. 3 illustrates an embodiment of a robotically-enabled system 10 arranged for ureteroscopy. In a ureteroscopic procedure, the cart 11 may be positioned to deliver a ureteroscope 32, a procedure-specific endoscope designed to traverse a patient's urethra and ureter, to the lower abdominal area of the patient. In a ureteroscopy, it may be desirable for the ureteroscope 32 to be directly aligned with the patient's urethra to reduce friction and forces on the sensitive anatomy in the area. As shown, the cart 11 may be aligned at the foot of the table to allow the robotic arms 12 to position the ureteroscope 32 for direct linear access to the patient's urethra. From the foot of the table, the robotic arms 12 may insert the ureteroscope 32 along the virtual rail 33 directly into the patient's lower abdomen through the urethra.

After insertion into the urethra, using similar control techniques as in bronchoscopy, the ureteroscope 32 may be navigated into the bladder, ureters, and/or kidneys for diagnostic and/or therapeutic applications. For example, the ureteroscope 32 may be directed into the ureter and kidneys to break up kidney stone build up using a laser or ultrasonic lithotripsy device deployed down the working channel of the ureteroscope 32. After lithotripsy is complete, the resulting stone fragments may be removed using baskets deployed down the ureteroscope 32.

Figure 4:
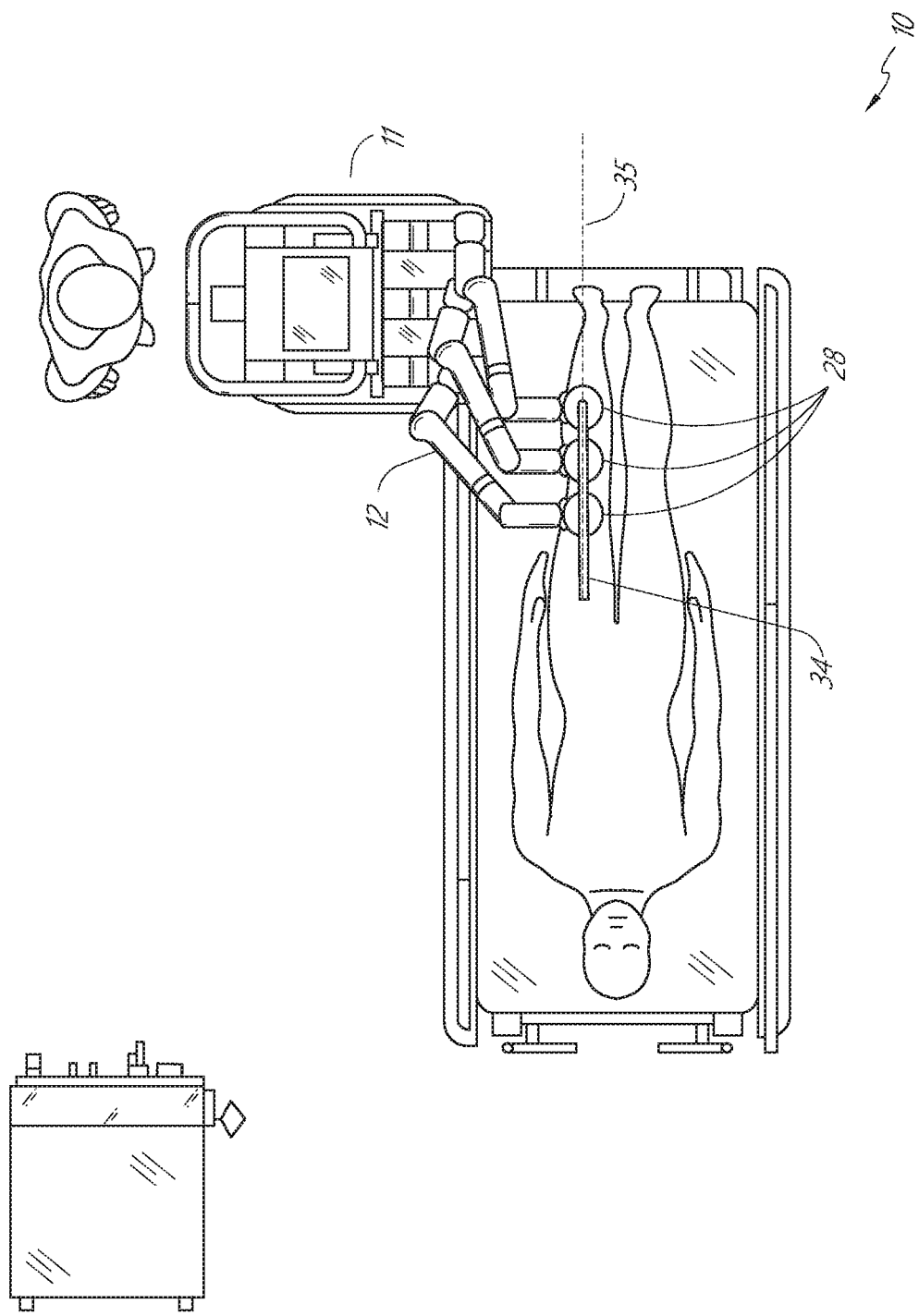
FIG. 4 illustrates an embodiment of the robotic system of FIG. 1 arranged for a vascular procedure.

FIG. 4 illustrates an embodiment of a robotically-enabled system 10 similarly arranged for a vascular procedure. In a vascular procedure, the system 10 may be configured such that the cart 11 may deliver a medical instrument 34, such as a steerable catheter, to an access point in the femoral artery in the patient's leg. The femoral artery presents both a larger diameter for navigation as well as a relatively less circuitous and tortuous path to the patient's heart, which simplifies navigation. As in a ureteroscopic procedure, the cart 11 may be positioned towards the patient's legs and lower abdomen to allow the robotic arms 12 to provide a virtual rail 35 with direct linear access to the femoral artery access point in the patient's thigh/hip region. After insertion into the artery, the medical instrument 34 may be directed and inserted by translating the instrument drivers 28. Alternatively, the cart may be positioned around the patient's upper abdomen in order to reach alternative vascular access points, such as, for example, the carotid and brachial arteries near the shoulder and wrist.

B. Robotic System—Table

Figure 5:
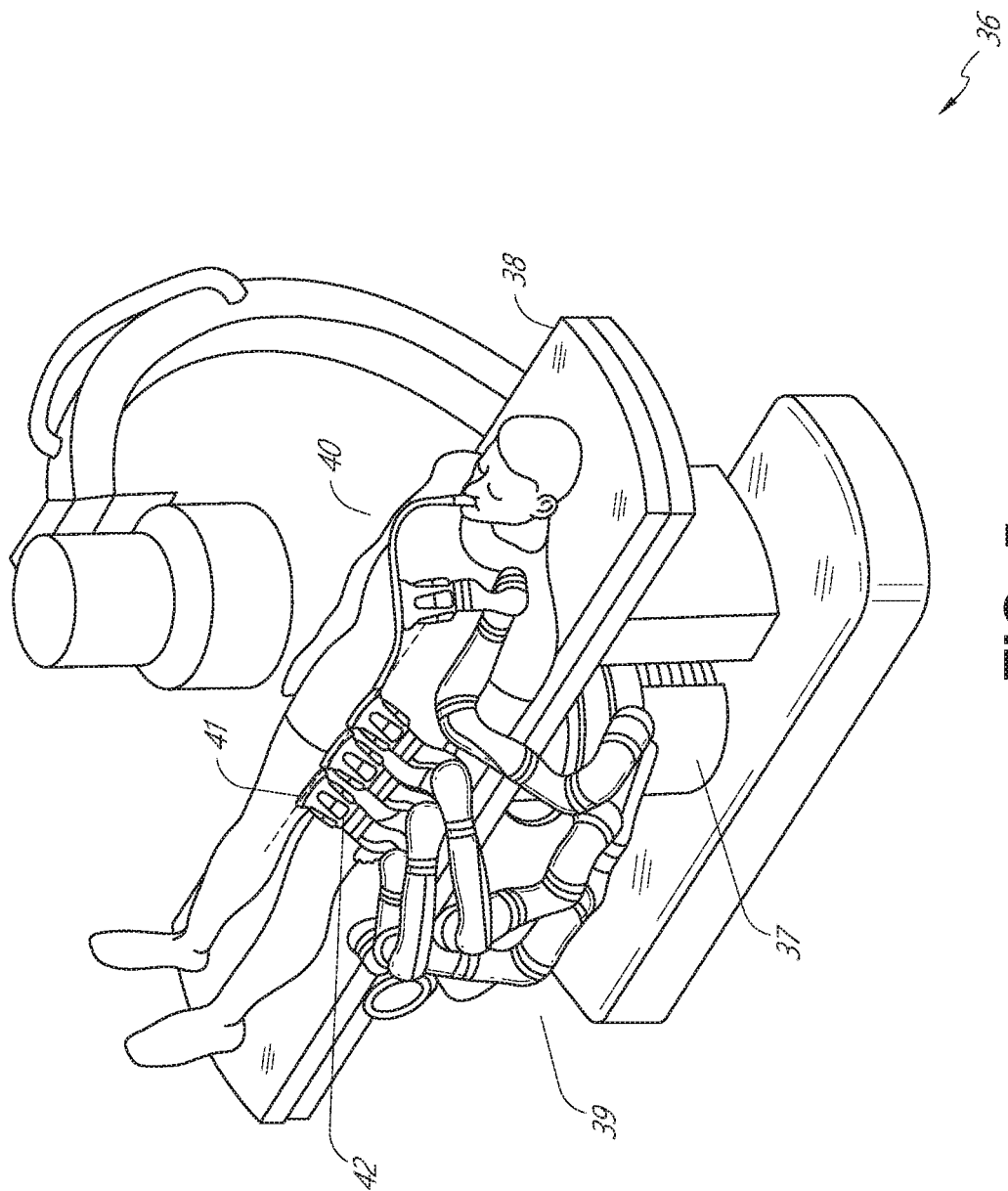
FIG. 5 illustrates an embodiment of a table-based robotic system arranged for a bronchoscopic procedure.

Embodiments of the robotically-enabled medical system may also incorporate the patient's table. Incorporation of the table reduces the amount of capital equipment within the operating room by removing the cart, which allows greater access to the patient. FIG. 5 illustrates an embodiment of such a robotically-enabled system arranged for a bronchoscopic procedure. System 36 includes a support structure or column 37 for supporting platform 38 (shown as a "table" or "bed") over the floor. Much like in the cart-based systems, the end effectors of the robotic arms 39 of the system 36 comprise instrument drivers 42 that are designed to manipulate an elongated medical instrument, such as a bronchoscope 40 in FIG. 5, through or along a virtual rail 41 formed from the linear alignment of the instrument drivers 42. In practice, a C-arm for providing fluoroscopic imaging may be positioned over the patient's upper abdominal area by placing the emitter and detector around the table 38.

Figure 6:
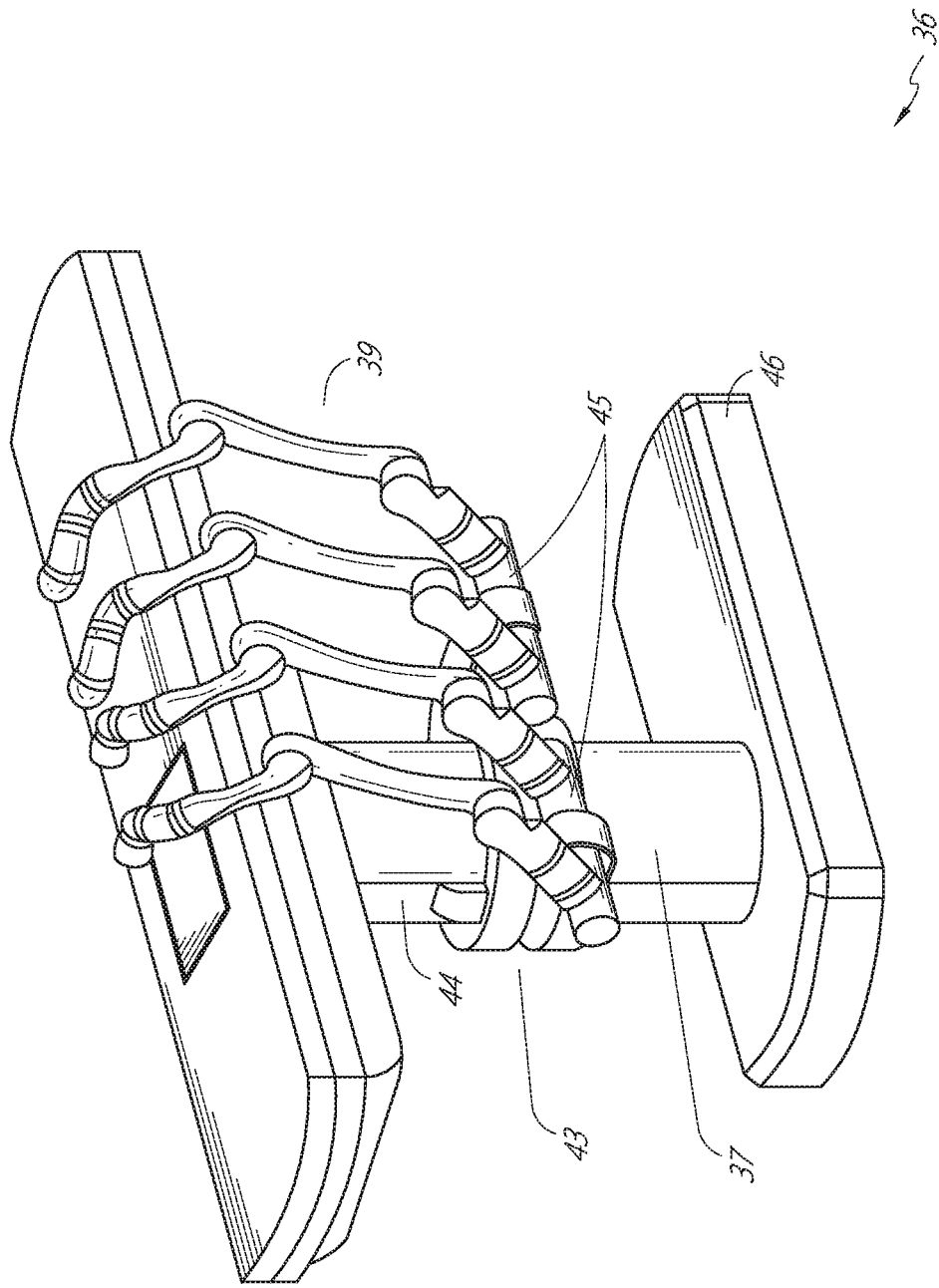
FIG. 6 provides an alternative view of the robotic system of FIG. 5.

FIG. 6 provides an alternative view of the system 36 without the patient and medical instrument for discussion purposes. As shown, the column 37 may include one or more carriages 43 shown as ring-shaped in the system 36, from which the one or more robotic arms 39 may be based. The carriages 43 may translate along a vertical column interface 44 that runs the length of the column 37 to provide different vantage points from which the robotic arms 39 may be positioned to reach the patient. The carriage(s) 43 may rotate around the column 37 using a mechanical motor positioned within the column 37 to allow the robotic arms 39 to have access to multiples sides of the table 38, such as, for example, both sides of the patient. In embodiments with multiple carriages, the carriages may be individually positioned on the column and may translate and/or rotate independently of the other carriages. While the carriages 43 need not surround the column 37 or even be circular, the ring-shape as shown facilitates rotation of the carriages 43 around the column 37 while maintaining structural balance. Rotation and translation of the carriages 43 allows the system 36 to align the medical instruments, such as endoscopes and laparoscopes, into different access points on the patient. In other embodiments (not shown), the system 36 can include a patient table or bed with adjustable arm supports in the form of bars or rails extending alongside it. One or more robotic arms 39 (e.g., via a shoulder with an elbow joint) can be attached to the adjustable arm supports, which can be vertically adjusted. By providing vertical adjustment, the robotic arms 39 are advantageously capable of being stowed compactly beneath the patient table or bed, and subsequently raised during a procedure.

Figure 9:
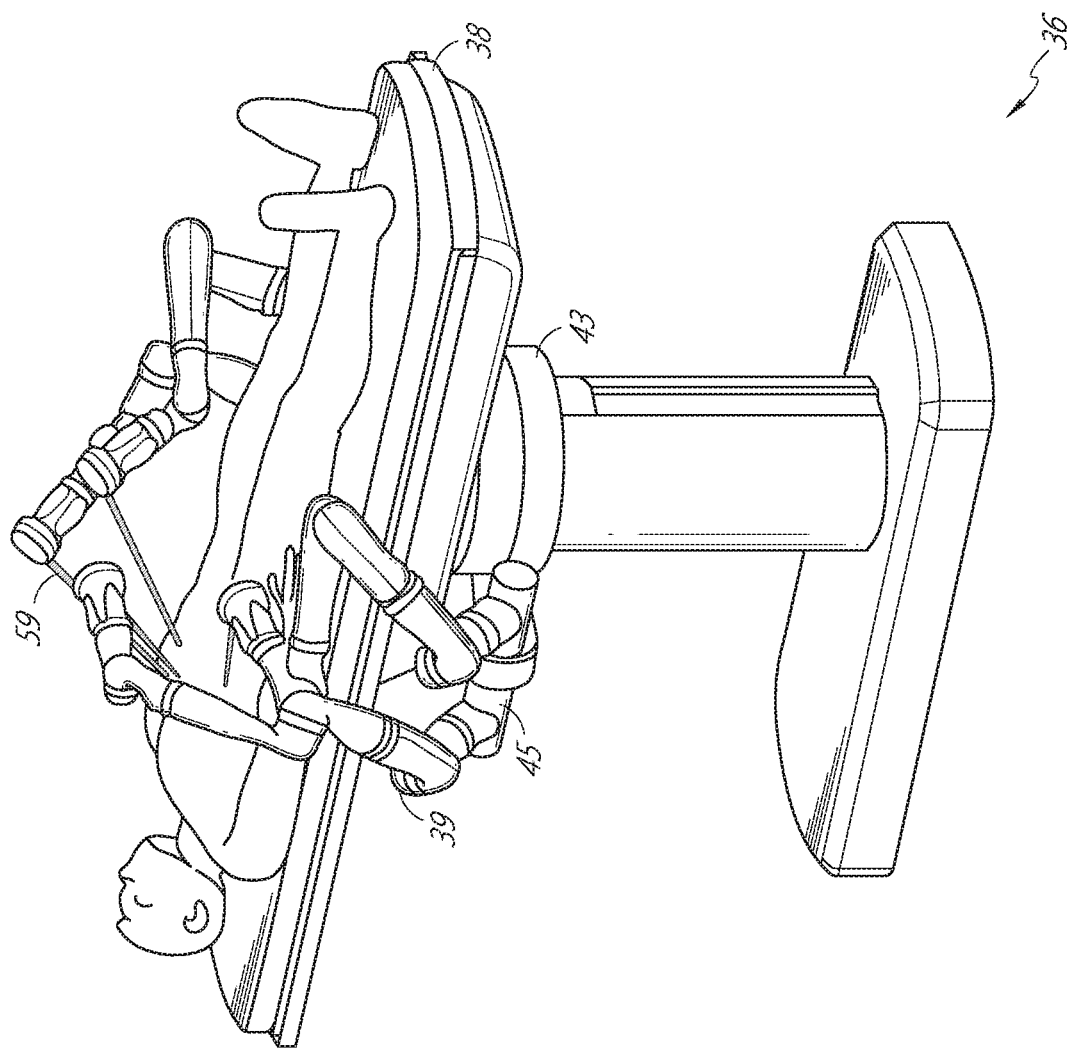
FIG. 9 illustrates an embodiment of a table-based robotic system configured for a laparoscopic procedure.

The robotic arms 39 may be mounted on the carriages 43 through a set of arm mounts 45 comprising a series of joints that may individually rotate and/or telescopically extend to provide additional configurability to the robotic arms 39. Additionally, the arm mounts 45 may be positioned on the carriages 43 such that, when the carriages 43 are appropriately rotated, the arm mounts 45 may be positioned on either the same side of the table 38 (as shown in FIG. 6), on opposite sides of the table 38 (as shown in FIG. 9), or on adjacent sides of the table 38 (not shown).

The column 37 structurally provides support for the table 38, and a path for vertical translation of the carriages 43. Internally, the column 37 may be equipped with lead screws for guiding vertical translation of the carriages, and motors to mechanize the translation of the carriages 43 based the lead screws. The column 37 may also convey power and control signals to the carriages 43 and the robotic arms 39 mounted thereon.

The table base 46 serves a similar function as the cart base 15 in the cart 11 shown in FIG. 2, housing heavier components to balance the table/bed 38, the column 37, the carriages 43, and the robotic arms 39. The table base 46 may also incorporate rigid casters to provide stability during procedures. Deployed from the bottom of the table base 46, the casters may extend in opposite directions on both sides of the base 46 and retract when the system 36 needs to be moved.

With continued reference to FIG. 6, the system 36 may also include a tower (not shown) that divides the functionality of the system 36 between the table and the tower to reduce the form factor and bulk of the table. As in earlier disclosed embodiments, the tower may provide a variety of support functionalities to the table, such as processing, computing, and control capabilities, power, fluidics, and/or optical and sensor processing. The tower may also be movable to be positioned away from the patient to improve physician access and de-clutter the operating room. Additionally, placing components in the tower allows for more storage space in the table base 46 for potential stowage of the robotic arms 39. The tower may also include a master controller or console that provides both a user interface for user input, such as keyboard and/or pendant, as well as a display screen (or touchscreen) for preoperative and intra-operative information, such as real-time imaging, navigation, and tracking information. In some embodiments, the tower may also contain holders for gas tanks to be used for insufflation.

Figure 7:
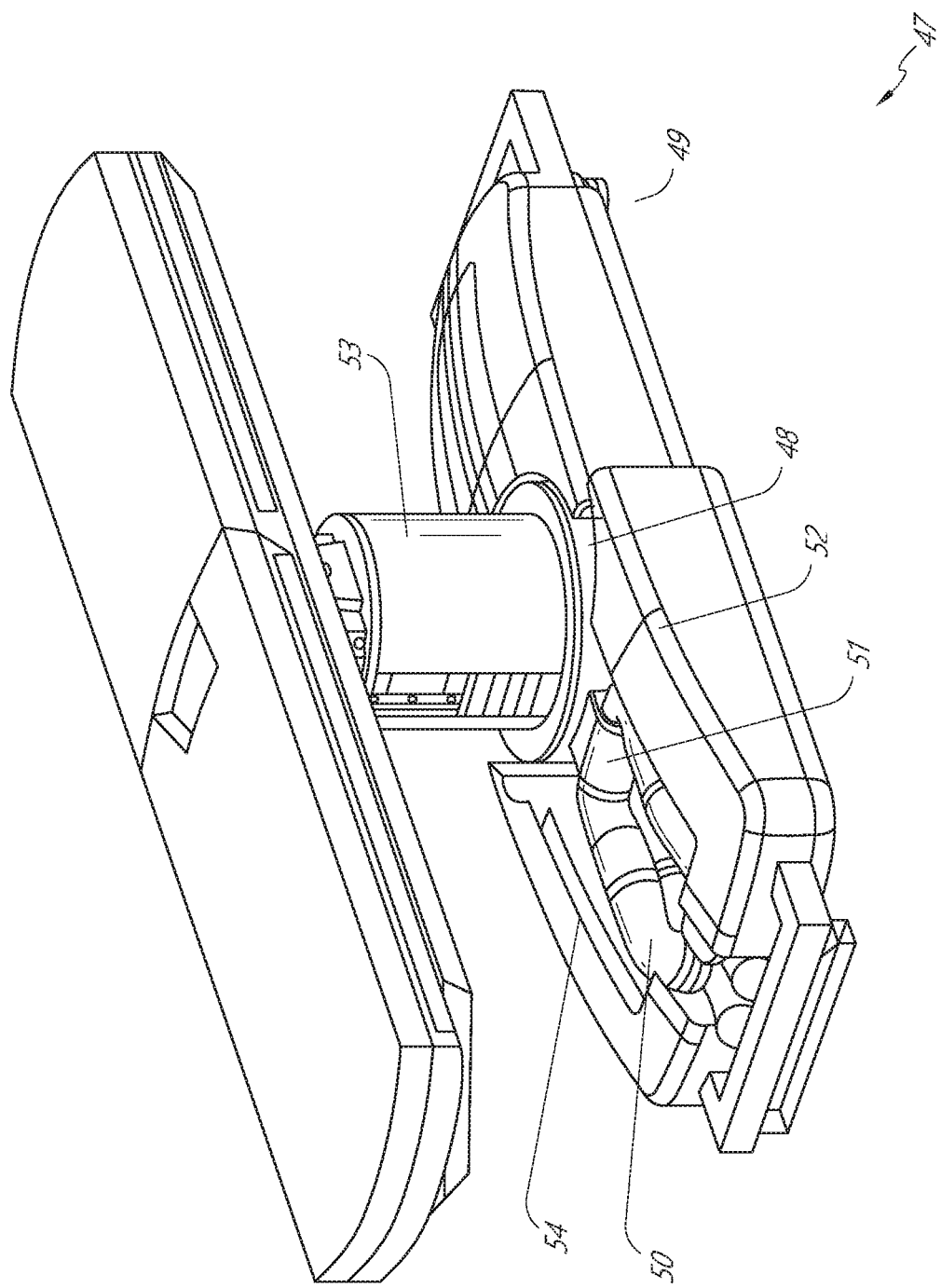
FIG. 7 illustrates an example system configured to stow robotic arm(s).

In some embodiments, a table base may stow and store the robotic arms when not in use. FIG. 7 illustrates a system 47 that stows robotic arms in an embodiment of the table-based system. In the system 47, carriages 48 may be vertically translated into base 49 to stow robotic arms 50, arm mounts 51, and the carriages 48 within the base 49. Base covers 52 may be translated and retracted open to deploy the carriages 48, arm mounts 51, and robotic arms 50 around column 53, and closed to stow to protect them when not in use. The base covers 52 may be sealed with a membrane 54 along the edges of its opening to prevent dirt and fluid ingress when closed.

Figure 8:
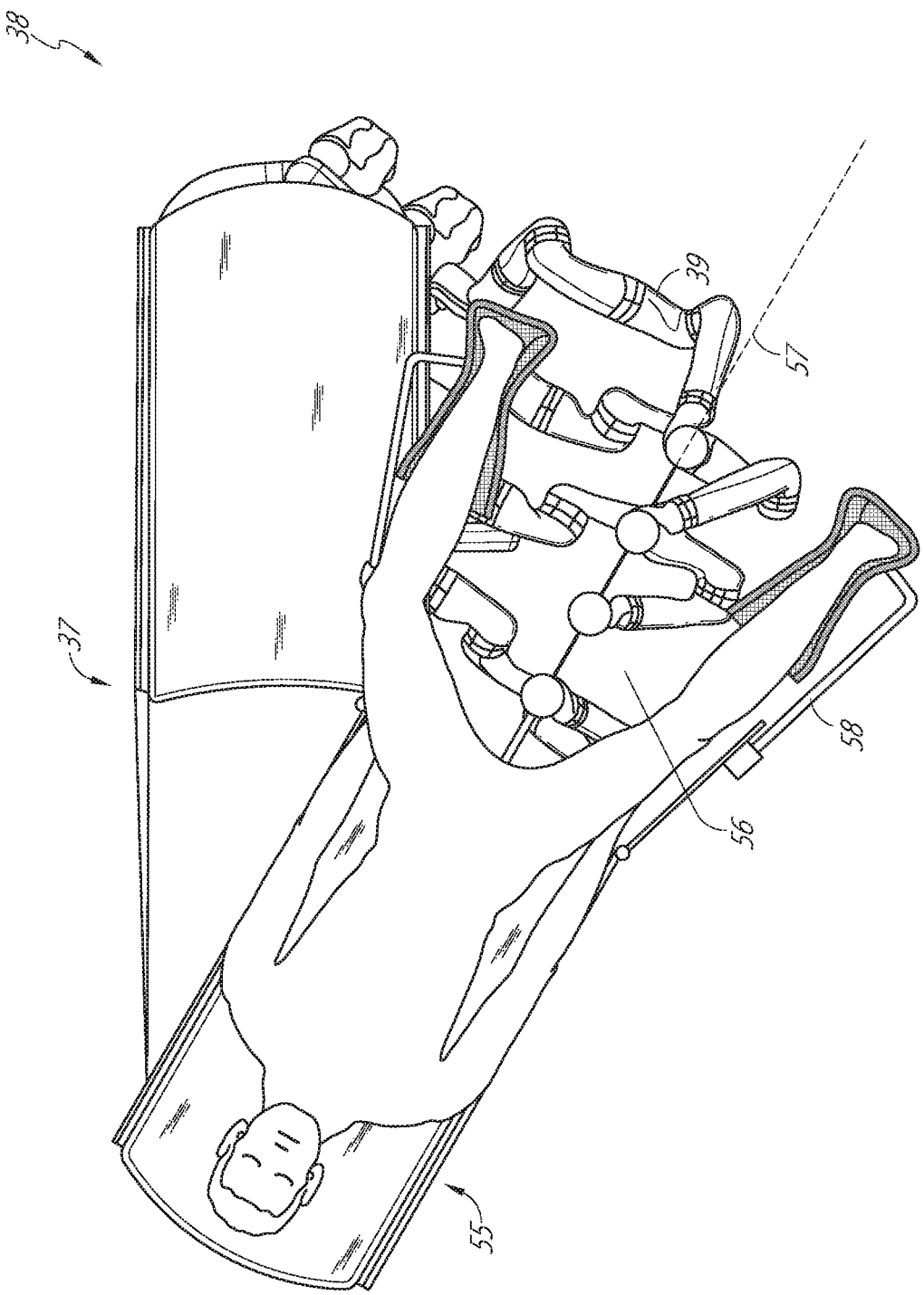
FIG. 8 illustrates an embodiment of a table-based robotic system configured for a ureteroscopic procedure.

FIG. 8 illustrates an embodiment of a robotically-enabled table-based system configured for a ureteroscopic procedure. In a ureteroscopy, the table 38 may include a swivel portion 55 for positioning a patient off-angle from the column 37 and table base 46. The swivel portion 55 may rotate or pivot around a pivot point (e.g., located below the patient's head) in order to position the bottom portion of the swivel portion 55 away from the column 37. For example, the pivoting of the swivel portion 55 allows a C-arm (not shown) to be positioned over the patient's lower abdomen without competing for space with the column (not shown) below table 38. By rotating the carriage 35 (not shown) around the column 37, the robotic arms 39 may directly insert a ureteroscope 56 along a virtual rail 57 into the patient's groin area to reach the urethra. In a ureteroscopy, stirrups 58 may also be fixed to the swivel portion 55 of the table 38 to support the position of the patient's legs during the procedure and allow clear access to the patient's groin area.

In a laparoscopic procedure, through small incision(s) in the patient's abdominal wall, minimally invasive instruments may be inserted into the patient's anatomy. In some embodiments, the minimally invasive instruments comprise an elongated rigid member, such as a shaft, which is used to access anatomy within the patient. After inflation of the patient's abdominal cavity, the instruments may be directed to perform surgical or medical tasks, such as grasping, cutting, ablating, suturing, etc. In some embodiments, the instruments can comprise a scope, such as a laparoscope. FIG. 9 illustrates an embodiment of a robotically-enabled table-based system configured for a laparoscopic procedure. As shown in FIG. 9, the carriages 43 of the system 36 may be rotated and vertically adjusted to position pairs of the robotic arms 39 on opposite sides of the table 38, such that instrument 59 may be positioned using the arm mounts 45 to be passed through minimal incisions on both sides of the patient to reach his/her abdominal cavity.

Figure 10:
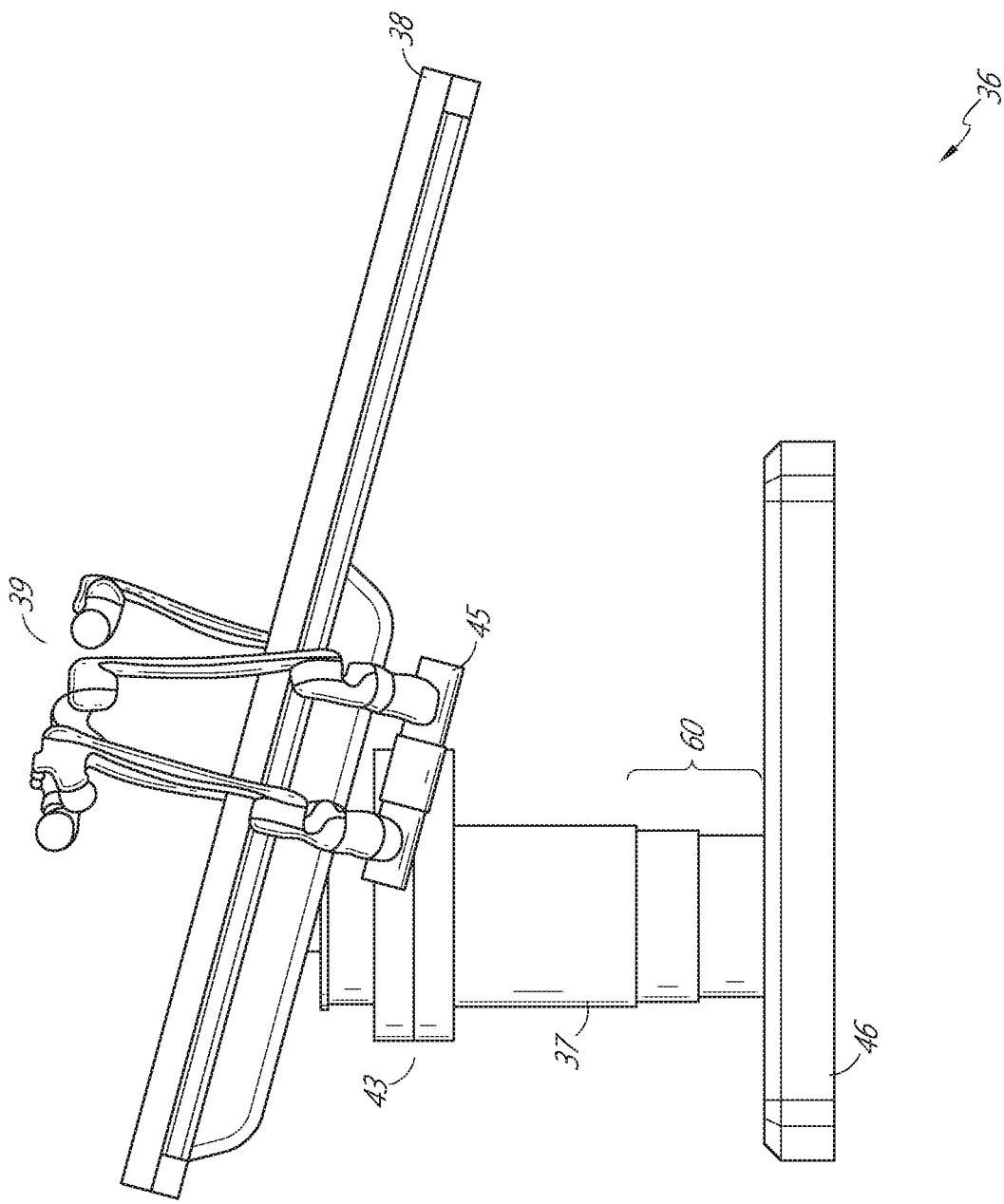
FIG. 10 illustrates an embodiment of the table-based robotic system of FIGS. 5-9 with pitch or tilt adjustment.

To accommodate laparoscopic procedures, the robotically-enabled table system may also tilt the platform to a desired angle. FIG. 10 illustrates an embodiment of the robotically-enabled medical system with pitch or tilt adjustment. As shown in FIG. 10, the system 36 may accommodate tilt of the table 38 to position one portion of the table at a greater distance from the floor than the other. Additionally, the arm mounts 45 may rotate to match the tilt such that the robotic arms 39 maintain the same planar relationship with the table 38. To accommodate steeper angles, the column 37 may also include telescoping portions 60 that allow vertical extension of the column 37 to keep the table 38 from touching the floor or colliding with the table base 46.

Figure 11:
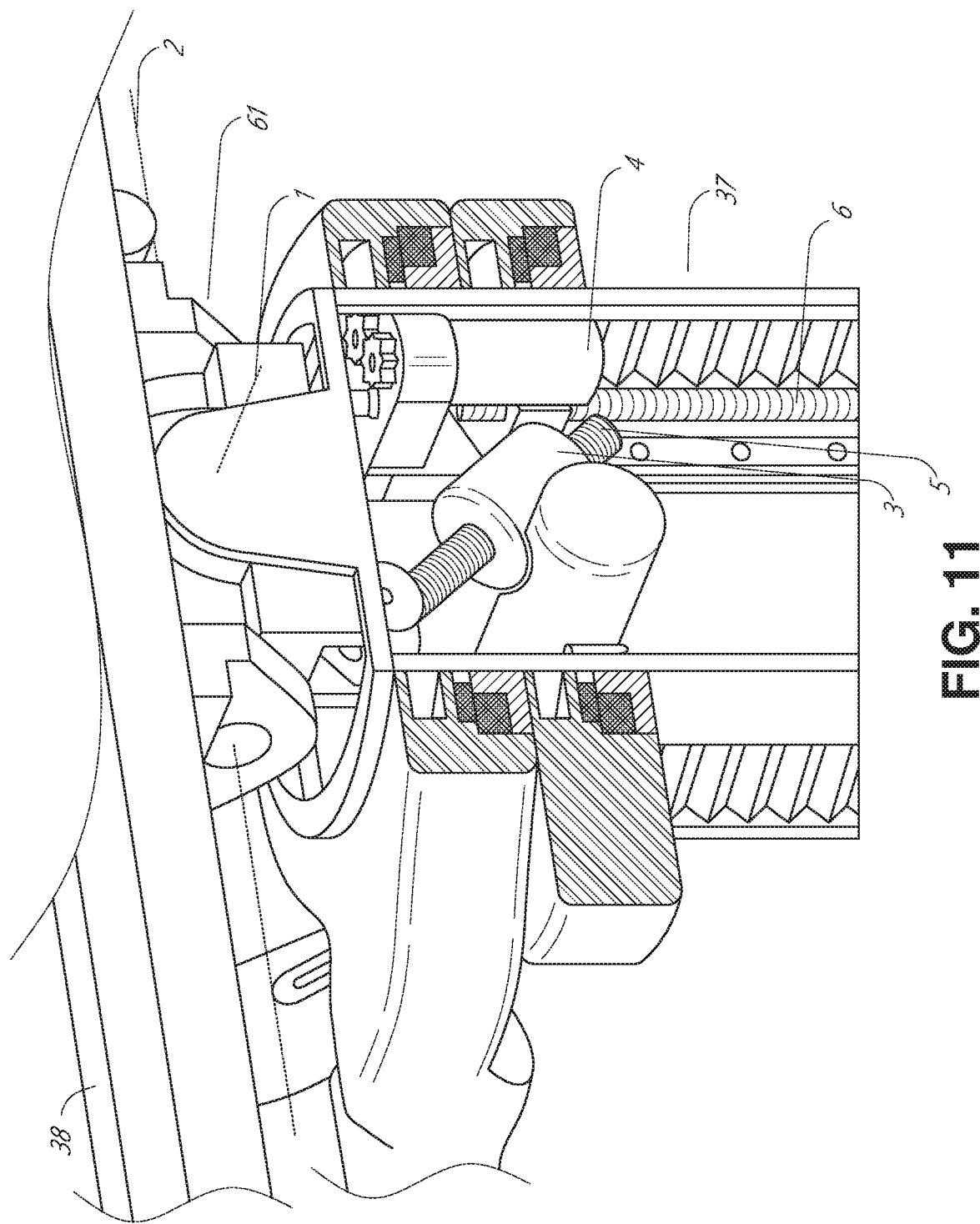
FIG. 11 provides a detailed illustration of the interface between the table and the column of the table-based robotic system of FIGS. 5-10.

FIG. 11 provides a detailed illustration of the interface between the table 38 and the column 37. Pitch rotation mechanism 61 may be configured to alter the pitch angle of the table 38 relative to the column 37 in multiple degrees of freedom. The pitch rotation mechanism 61 may be enabled by the positioning of orthogonal axes 1, 2 at the column-table interface, each axis actuated by a separate motor 3, 4 responsive to an electrical pitch angle command. Rotation along one screw 5 would enable tilt adjustments in one axis 1, while rotation along the other screw 6 would enable tilt adjustments along the other axis 2. In some embodiments, a ball joint can be used to alter the pitch angle of the table 38 relative to the column 37 in multiple degrees of freedom.

For example, pitch adjustments are particularly useful when trying to position the table in a Trendelenburg position, i.e., position the patient's lower abdomen at a higher position from the floor than the patient's upper abdomen, for lower abdominal surgery. The Trendelenburg position causes the patient's internal organs to slide towards his/her upper abdomen through the force of gravity, clearing out the abdominal cavity for minimally invasive tools to enter and perform lower abdominal surgical or medical procedures, such as laparoscopic prostatectomy.

Figure 12:
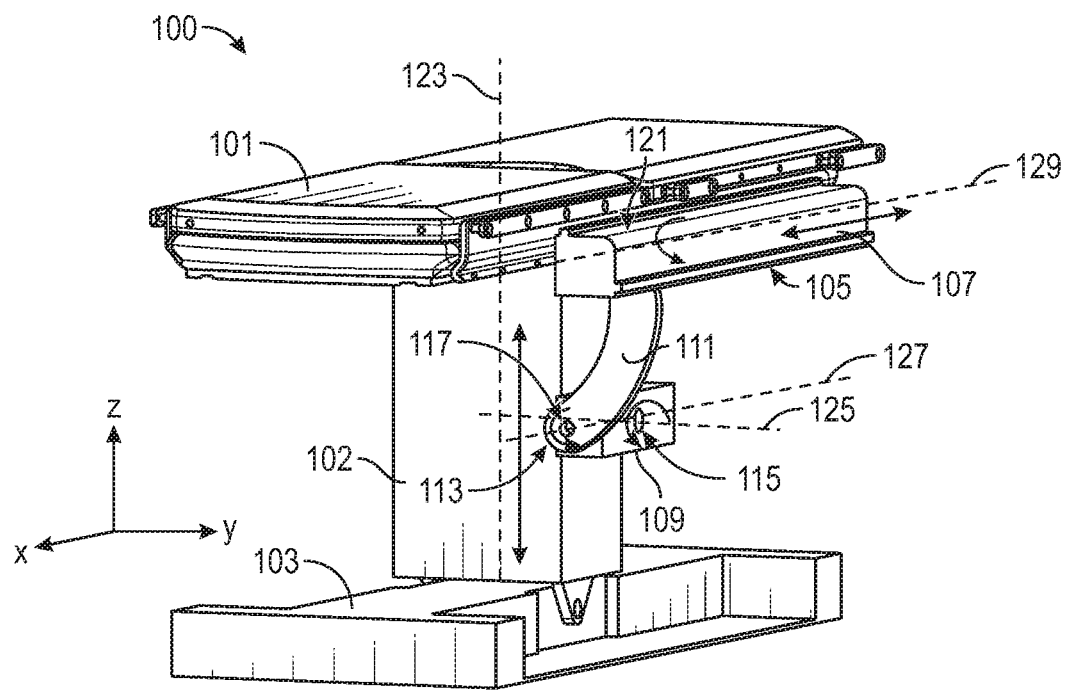
FIG. 12 illustrates an alternative embodiment of a table-based robotic system.
Figure 13:
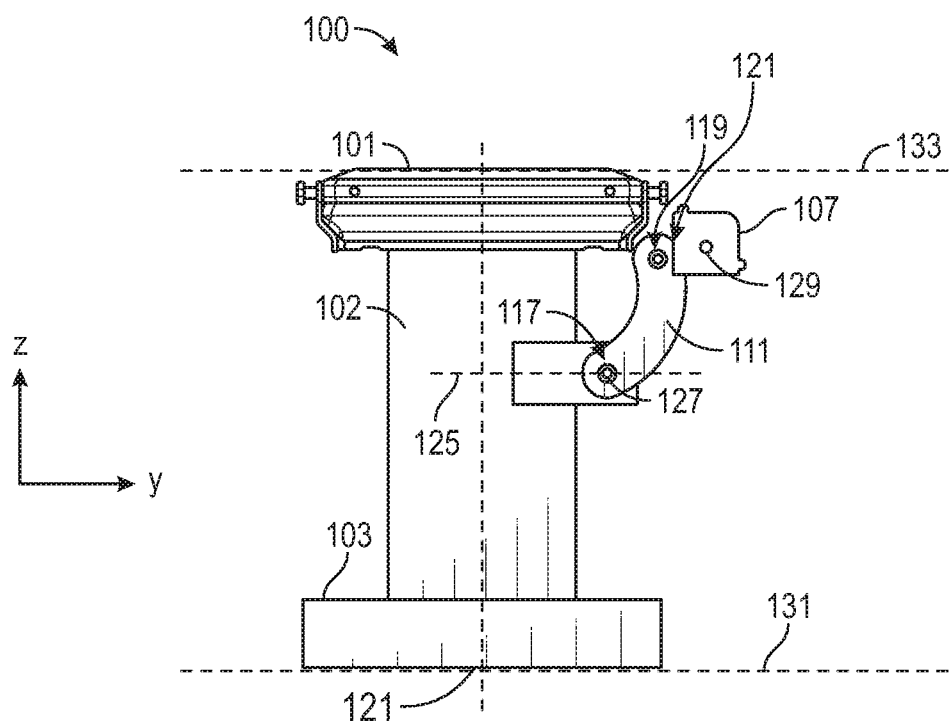
FIG. 13 illustrates an end view of the table-based robotic system of FIG. 12.

FIGS. 12 and 13 illustrate isometric and end views of an alternative embodiment of a table-based surgical robotics system 100. The surgical robotics system 100 includes one or more adjustable arm supports 105 that can be configured to support one or more robotic arms (see, for example, FIG. 14) relative to a table 101. In the illustrated embodiment, a single adjustable arm support 105 is shown, though an additional arm support can be provided on an opposite side of the table 101. The adjustable arm support 105 can be configured so that it can move relative to the table 101 to adjust and/or vary the position of the adjustable arm support 105 and/or any robotic arms mounted thereto relative to the table 101. For example, the adjustable arm support 105 may be adjusted one or more degrees of freedom relative to the table 101. The adjustable arm support 105 provides high versatility to the system 100, including the ability to easily stow the one or more adjustable arm supports 105 and any robotics arms attached thereto beneath the table 101. The adjustable arm support 105 can be elevated from the stowed position to a position below an upper surface of the table 101. In other embodiments, the adjustable arm support 105 can be elevated from the stowed position to a position above an upper surface of the table 101.

The adjustable arm support 105 can provide several degrees of freedom, including lift, lateral translation, tilt, etc. In the illustrated embodiment of FIGS. 12 and 13, the arm support 105 is configured with four degrees of freedom, which are illustrated with arrows in FIG. 12. A first degree of freedom allows for adjustment of the adjustable arm support 105 in the z-direction ("Z-lift"). For example, the adjustable arm support 105 can include a carriage 109 configured to move up or down along or relative to a column 102 supporting the table 101. A second degree of freedom can allow the adjustable arm support 105 to tilt. For example, the adjustable arm support 105 can include a rotary joint, which can allow the adjustable arm support 105 to be aligned with the bed in a Trendelenburg position. A third degree of freedom can allow the adjustable arm support 105 to "pivot up," which can be used to adjust a distance between a side of the table 101 and the adjustable arm support 105.

A fourth degree of freedom can permit translation of the adjustable arm support 105 along a longitudinal length of the table.

The surgical robotics system 100 in FIGS. 12 and 13 can comprise a table supported by a column 102 that is mounted to a base 103. The base 103 and the column 102 support the table 101 relative to a support surface. A floor axis 131 and a support axis 133 are shown in FIG. 13.

The adjustable arm support 105 can be mounted to the column 102. In other embodiments, the arm support 105 can be mounted to the table 101 or base 103. The adjustable arm support 105 can include a carriage 109, a bar or rail connector 111 and a bar or rail 107. In some embodiments, one or more robotic arms mounted to the rail 107 can translate and move relative to one another.

The carriage 109 can be attached to the column 102 by a first joint 113, which allows the carriage 109 to move relative to the column 102 (e.g., such as up and down a first or vertical axis 123). The first joint 113 can provide the first degree of freedom (Z-lift) to the adjustable arm support 105. The adjustable arm support 105 can include a second joint 115, which provides the second degree of freedom (tilt) for the adjustable arm support 105. The adjustable arm support 105 can include a third joint 117, which can provide the third degree of freedom ("pivot up") for the adjustable arm support 105. An additional joint 119 (shown in FIG. 13) can be provided that mechanically constrains the third joint 117 to maintain an orientation of the rail 107 as the rail connector 111 is rotated about a third axis 127. The adjustable arm support 105 can include a fourth joint 121, which can provide a fourth degree of freedom (translation) for the adjustable arm support 105 along a fourth axis 129.

Figure 14:
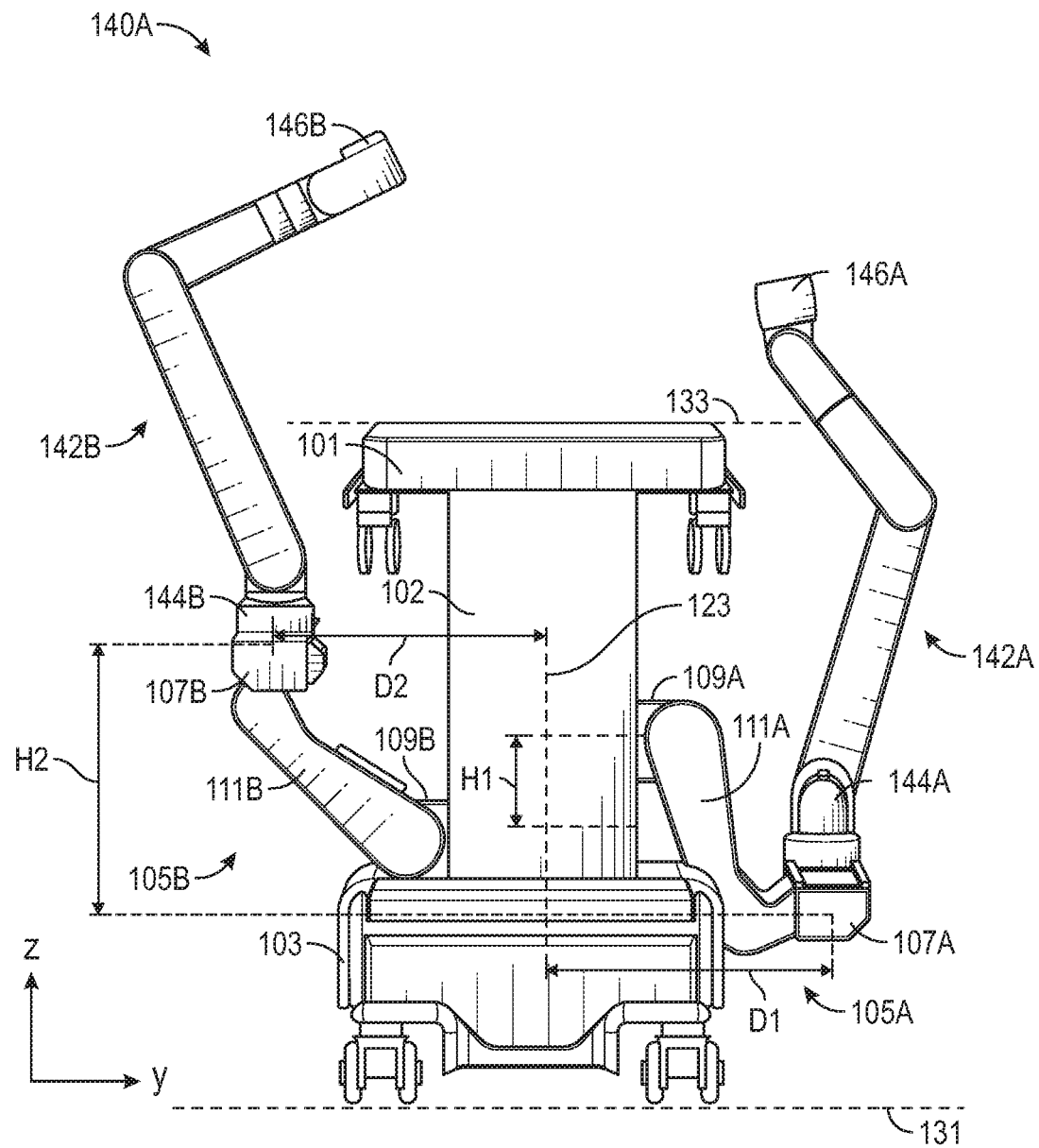
FIG. 14 illustrates an end view of a table-based robotic system with robotic arms attached thereto.

FIG. 14 illustrates an end view of the surgical robotics system 140A with two adjustable arm supports 105A, 105B mounted on opposite sides of a table 101. A first robotic arm 142A is attached to the bar or rail 107A of the first adjustable arm support 105B. The first robotic arm 142A includes a base 144A attached to the rail 107A. The distal end of the first robotic arm 142A includes an instrument drive mechanism 146A that can attach to one or more robotic medical instruments or tools. Similarly, the second robotic arm 142B includes a base 144B attached to the rail 107B. The distal end of the second robotic arm 142B includes an instrument drive mechanism 146B. The instrument drive mechanism 146B can be configured to attach to one or more robotic medical instruments or tools.

In some embodiments, one or more of the robotic arms 142A, 142B comprises an arm with seven or more degrees of freedom. In some embodiments, one or more of the robotic arms 142A, 142B can include eight degrees of freedom, including an insertion axis (1-degree of freedom including insertion), a wrist (3-degrees of freedom including wrist pitch, yaw and roll), an elbow (1-degree of freedom including elbow pitch), a shoulder (2-degrees of freedom including shoulder pitch and yaw), and base 144A, 144B (1-degree of freedom including translation). In some embodiments, the insertion degree of freedom can be provided by the robotic arm 142A, 142B, while in other embodiments, the instrument itself provides insertion via an instrument-based insertion architecture.

C. Instrument Driver & Interface

The end effectors of the system's robotic arms may comprise (i) an instrument driver (alternatively referred to as "instrument drive mechanism" or "instrument device manipulator") that incorporates electro-mechanical means for actuating the medical instrument and (ii) a removable or detachable medical instrument, which may be devoid of any electro-mechanical components, such as motors. This dichotomy may be driven by the need to sterilize medical instruments used in medical procedures, and the inability to adequately sterilize expensive capital equipment due to their intricate mechanical assemblies and sensitive electronics. Accordingly, the medical instruments may be designed to be detached, removed, and interchanged from the instrument driver (and thus the system) for individual sterilization or disposal by the physician or the physician's staff. In contrast, the instrument drivers need not be changed or sterilized, and may be draped for protection.

Figure 15:
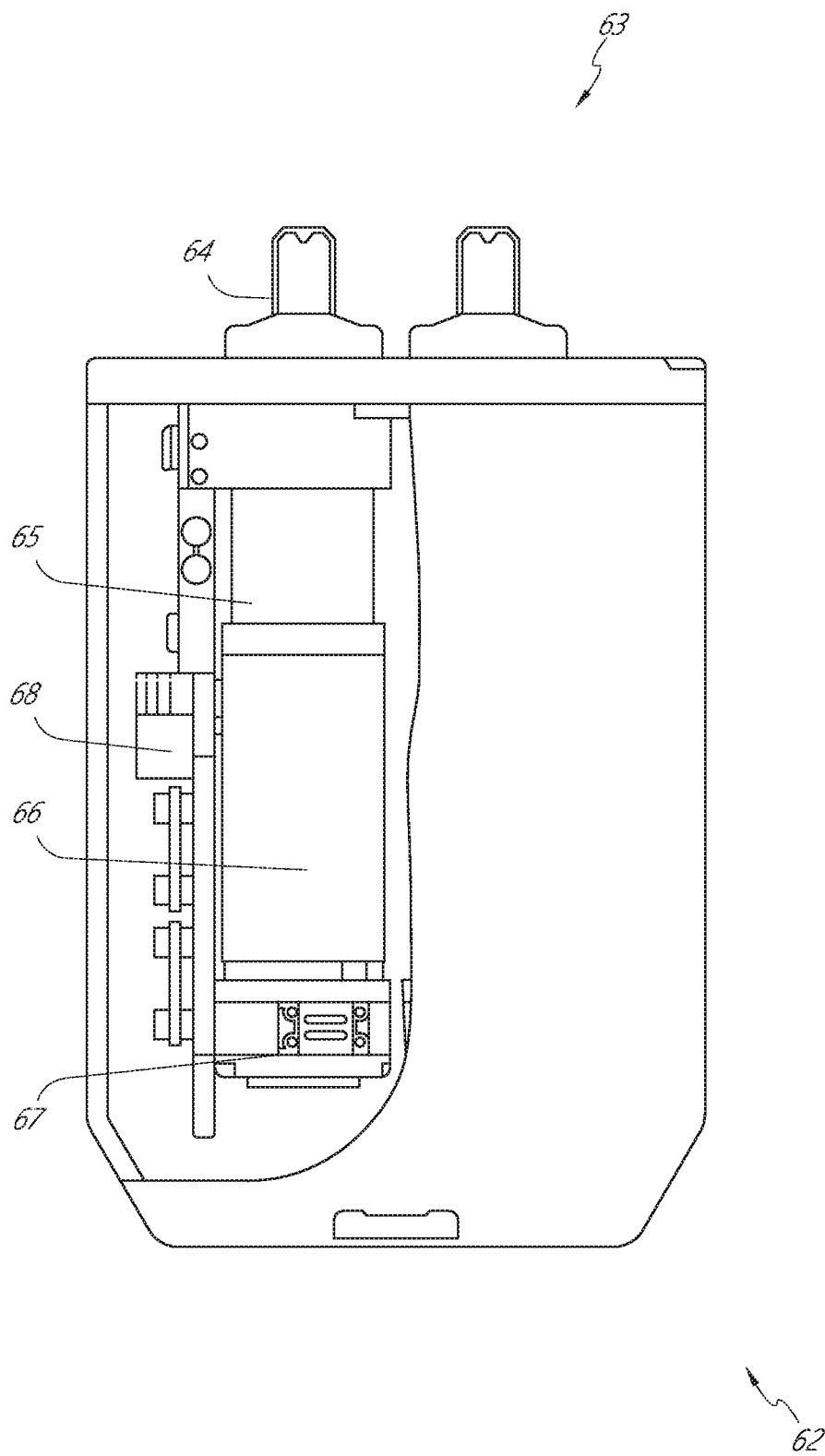
FIG. 15 illustrates an exemplary instrument driver.

FIG. 15 illustrates an example instrument driver. Positioned at the distal end of a robotic arm, instrument driver 62 comprises one or more drive units 63 arranged with parallel axes to provide controlled torque to a medical instrument via drive shafts 64. Each drive unit 63 comprises an individual drive shaft 64 for interacting with the instrument, a gear head 65 for converting the motor shaft rotation to a desired torque, a motor 66 for generating the drive torque, an encoder 67 to measure the speed of the motor shaft and provide feedback to the control circuitry, and control circuity 68 for receiving control signals and actuating the drive unit. Each drive unit 63 being independently controlled and motorized, the instrument driver 62 may provide multiple (e.g., four as shown in FIG. 15) independent drive outputs to the medical instrument. In operation, the control circuitry 68 would receive a control signal, transmit a motor signal to the motor 66, compare the resulting motor speed as measured by the encoder 67 with the desired speed, and modulate the motor signal to generate the desired torque.

For procedures that require a sterile environment, the robotic system may incorporate a drive interface, such as a sterile adapter connected to a sterile drape, that sits between the instrument driver and the medical instrument. The chief purpose of the sterile adapter is to transfer angular motion from the drive shafts of the instrument driver to the drive inputs of the instrument while maintaining physical separation, and thus sterility, between the drive shafts and drive inputs. Accordingly, an example sterile adapter may comprise a series of rotational inputs and outputs intended to be mated with the drive shafts of the instrument driver and drive inputs on the instrument. Connected to the sterile adapter, the sterile drape, comprised of a thin, flexible material such as transparent or translucent plastic, is designed to cover the capital equipment, such as the instrument driver, robotic arm, and cart (in a cart-based system) or table (in a table-based system). Use of the drape would allow the capital equipment to be positioned proximate to the patient while still being located in an area not requiring sterilization (i.e., non-sterile field). On the other side of the sterile drape, the medical instrument may interface with the patient in an area requiring sterilization (i.e., sterile field).

D. Medical Instrument

Figure 16:
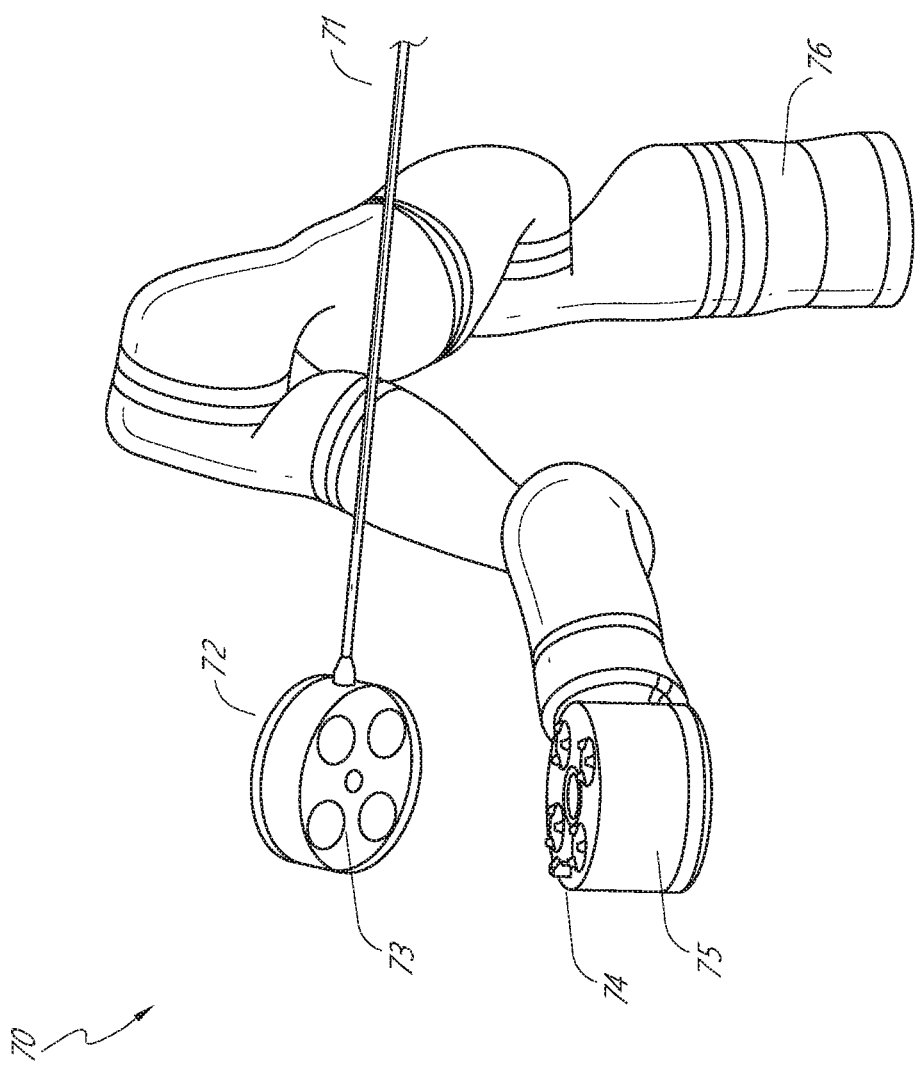
FIG. 16 illustrates an exemplary medical instrument with a paired instrument driver.

FIG. 16 illustrates an example medical instrument with a paired instrument driver. Like other instruments designed for use with a robotic system, medical instrument 70 comprises an elongated shaft 71 (or elongate body) and an instrument base 72. The instrument base 72, also referred to as an "instrument handle" due to its intended design for manual interaction by the physician, may generally comprise rotatable drive inputs 73, e.g., receptacles, pulleys or spools, that are designed to be mated with drive outputs 74 that extend through a drive interface on instrument driver 75 at the distal end of robotic arm 76. When physically connected, latched, and/or coupled, the mated drive inputs 73 of the instrument base 72 may share axes of rotation with the drive outputs 74 in the instrument driver 75 to allow the transfer of torque from the drive outputs 74 to the drive inputs 73. In some embodiments, the drive outputs 74 may comprise splines that are designed to mate with receptacles on the drive inputs 73.

The elongated shaft 71 is designed to be delivered through either an anatomical opening or lumen, e.g., as in endoscopy, or a minimally invasive incision, e.g., as in laparoscopy. The elongated shaft 71 may be either flexible (e.g., having properties similar to an endoscope) or rigid (e.g., having properties similar to a laparoscope) or contain a customized combination of both flexible and rigid portions. When designed for laparoscopy, the distal end of a rigid elongated shaft may be connected to an end effector extending from a jointed wrist formed from a clevis with at least one degree of freedom and a surgical tool or medical instrument, such as, for example, a grasper or scissors, that may be actuated based on force from the tendons as the drive inputs rotate in response to torque received from the drive outputs 74 of the instrument driver 75. When designed for endoscopy, the distal end of a flexible elongated shaft may include a steerable or controllable bending section that may be articulated and bent based on torque received from the drive outputs 74 of the instrument driver 75.

Torque from the instrument driver 75 is transmitted down the elongated shaft 71 using tendons along the elongated shaft 71. These individual tendons, such as pull wires, may be individually anchored to individual drive inputs 73 within the instrument handle 72. From the handle 72, the tendons are directed down one or more pull lumens along the elongated shaft 71 and anchored at the distal portion of the elongated shaft 71, or in the wrist at the distal portion of the elongated shaft. During a surgical procedure, such as a laparoscopic, endoscopic or hybrid procedure, these tendons may be coupled to a distally mounted end effector, such as a wrist, grasper, or scissor. Under such an arrangement, torque exerted on drive inputs 73 would transfer tension to the tendon, thereby causing the end effector to actuate in some way. In some embodiments, during a surgical procedure, the tendon may cause a joint to rotate about an axis, thereby causing the end effector to move in one direction or another. Alternatively, the tendon may be connected to one or more jaws of a grasper at the distal end of the elongated shaft 71, where tension from the tendon causes the grasper to close.

In endoscopy, the tendons may be coupled to a bending or articulating section positioned along the elongated shaft 71 (e.g., at the distal end) via adhesive, control ring, or other mechanical fixation. When fixedly attached to the distal end of a bending section, torque exerted on the drive inputs 73 would be transmitted down the tendons, causing the softer, bending section (sometimes referred to as the articulable section or region) to bend or articulate. Along the non-bending sections, it may be advantageous to spiral or helix the individual pull lumens that direct the individual tendons along (or inside) the walls of the endoscope shaft to balance the radial forces that result from tension in the pull wires. The angle of the spiraling and/or spacing therebetween may be altered or engineered for specific purposes, wherein tighter spiraling exhibits lesser shaft compression under load forces, while lower amounts of spiraling results in greater shaft compression under load forces, but limits bending. On the other end of the spectrum, the pull lumens may be directed parallel to the longitudinal axis of the elongated shaft 71 to allow for controlled articulation in the desired bending or articulable sections.

In endoscopy, the elongated shaft 71 houses a number of components to assist with the robotic procedure. The shaft 71 may comprise a working channel for deploying surgical tools (or medical instruments), irrigation, and/or aspiration to the operative region at the distal end of the shaft 71. The shaft 71 may also accommodate wires and/or optical fibers to transfer signals to/from an optical assembly at the distal tip, which may include an optical camera. The shaft 71 may also accommodate optical fibers to carry light from proximally-located light sources, such as light emitting diodes, to the distal end of the shaft 71.

At the distal end of the instrument 70, the distal tip may also comprise the opening of a working channel for delivering tools for diagnostic and/or therapy, irrigation, and aspiration to an operative site. The distal tip may also include a port for a camera, such as a fiberscope or a digital camera, to capture images of an internal anatomical space. Relatedly, the distal tip may also include ports for light sources for illuminating the anatomical space when using the camera.

In the example of FIG. 16, the drive shaft axes, and thus the drive input axes, are orthogonal to the axis of the elongated shaft 71. This arrangement, however, complicates roll capabilities for the elongated shaft 71. Rolling the elongated shaft 71 along its axis while keeping the drive inputs 73 static results in undesirable tangling of the tendons as they extend off the drive inputs 73 and enter pull lumens within the elongated shaft 71. The resulting entanglement of such tendons may disrupt any control algorithms intended to predict movement of the flexible elongated shaft 71 during an endoscopic procedure.

Figure 17:
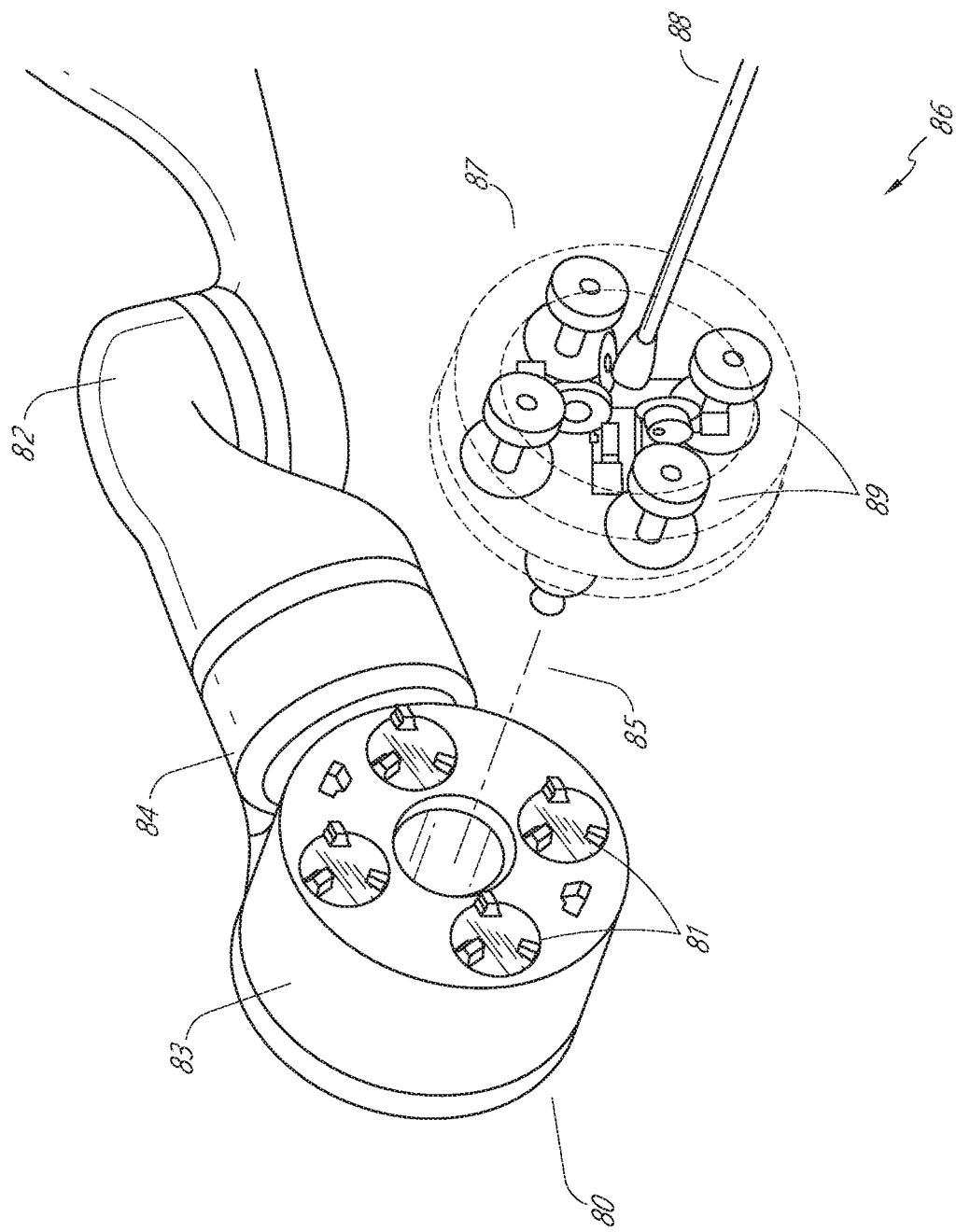
FIG. 17 illustrates an alternative design for an instrument driver and instrument where the axes of the drive units are parallel to the axis of the elongated shaft of the instrument.

FIG. 17 illustrates an alternative design for an instrument driver and instrument where the axes of the drive units are parallel to the axis of the elongated shaft of the instrument. As shown, a circular instrument driver 80 comprises four drive units with their drive outputs 81 aligned in parallel at the end of a robotic arm 82. The drive units, and their respective drive outputs 81, are housed in a rotational assembly 83 of the instrument driver 80 that is driven by one of the drive units within the assembly 83. In response to torque provided by the rotational drive unit, the rotational assembly 83 rotates along a circular bearing that connects the rotational assembly 83 to the non-rotational portion 84 of the instrument driver 80. Power and controls signals may be communicated from the non-rotational portion 84 of the instrument driver 80 to the rotational assembly 83 through electrical contacts that may be maintained through rotation by a brushed slip ring connection (not shown). In other embodiments, the rotational assembly 83 may be responsive to a separate drive unit that is integrated into the non-rotatable portion 84, and thus not in parallel to the other drive units. The rotational mechanism 83 allows the instrument driver 80 to rotate the drive units, and their respective drive outputs 81, as a single unit around an instrument driver axis 85.

Like earlier disclosed embodiments, an instrument 86 may comprise an elongated shaft portion 88 and an instrument base 87 (shown with a transparent external skin for discussion purposes) comprising a plurality of drive inputs 89 (such as receptacles, pulleys, and spools) that are configured to receive the drive outputs 81 in the instrument driver 80. Unlike prior disclosed embodiments, the instrument shaft 88 extends from the center of the instrument base 87 with an axis substantially parallel to the axes of the drive inputs 89, rather than orthogonal as in the design of FIG. 16.

When coupled to the rotational assembly 83 of the instrument driver 80, the medical instrument 86, comprising instrument base 87 and instrument shaft 88, rotates in combination with the rotational assembly 83 about the instrument driver axis 85. Since the instrument shaft 88 is positioned at the center of instrument base 87, the instrument shaft 88 is coaxial with instrument driver axis 85 when attached. Thus, rotation of the rotational assembly 83 causes the instrument shaft 88 to rotate about its own longitudinal axis. Moreover, as the instrument base 87 rotates with the instrument shaft 88, any tendons connected to the drive inputs 89 in the instrument base 87 are not tangled during rotation. Accordingly, the parallelism of the axes of the drive outputs 81, drive inputs 89, and instrument shaft 88 allows for the shaft rotation without tangling any control tendons.

Figure 18:
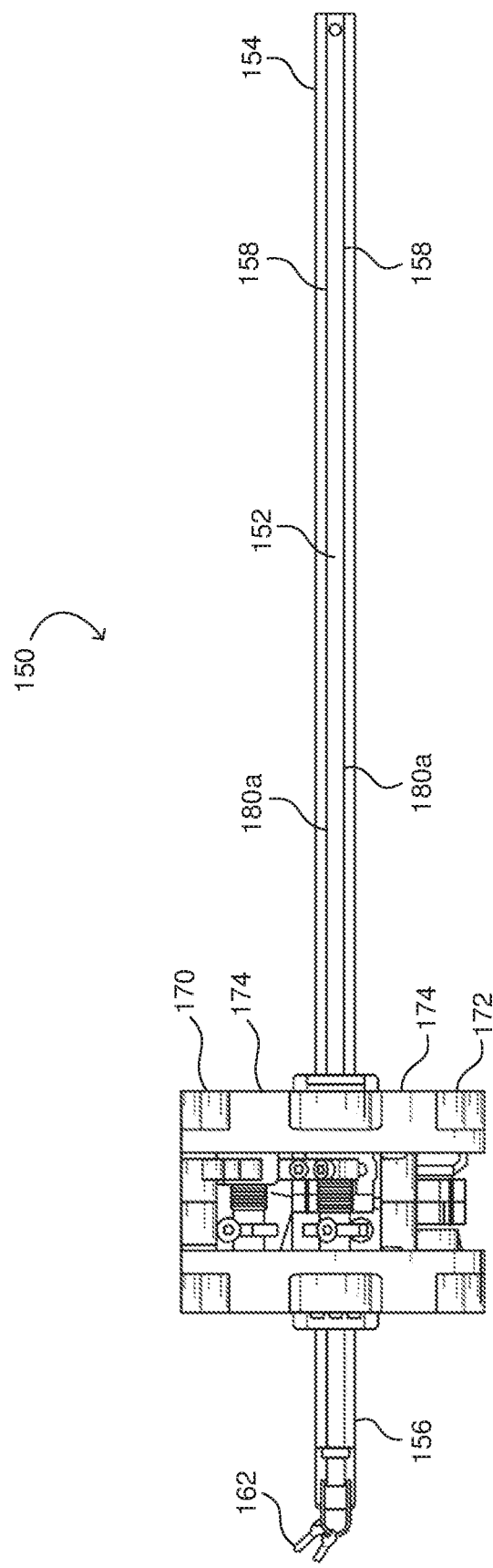
FIG. 18 illustrates an instrument having an instrument-based insertion architecture.

FIG. 18 illustrates an instrument having an instrument based insertion architecture in accordance with some embodiments. The instrument 150 can be coupled to any of the instrument drivers discussed above. The instrument 150 comprises an elongated shaft 152, an end effector 162 connected to the shaft 152, and a handle 170 coupled to the shaft 152. The elongated shaft 152 comprises a tubular member having a proximal portion 154 and a distal portion 156. The elongated shaft 152 comprises one or more channels or grooves 158 along its outer surface. The grooves 158 are configured to receive one or more wires or cables 180 therethrough. One or more cables 180 thus run along an outer surface of the elongated shaft 152. In other embodiments, cables 180 can also run through the elongated shaft 152. Manipulation of the one or more cables 180 (e.g., via an instrument driver) results in actuation of the end effector 162.

The instrument handle 170, which may also be referred to as an instrument base, may generally comprise an attachment interface 172 having one or more mechanical inputs 174, e.g., receptacles, pulleys or spools, that are designed to be reciprocally mated with one or more torque couplers on an attachment surface of an instrument driver.

In some embodiments, the instrument 150 comprises a series of pulleys or cables that enable the elongated shaft 152 to translate relative to the handle 170. In other words, the instrument 150 itself comprises an instrument-based insertion architecture that accommodates insertion of the instrument, thereby minimizing the reliance on a robot arm to provide insertion of the instrument 150. In other embodiments, a robotic arm can be largely responsible for instrument insertion.

E. Controller

Any of the robotic systems described herein can include an input device or controller for manipulating an instrument attached to a robotic arm. In some embodiments, the controller can be coupled (e.g., communicatively, electronically, electrically, wirelessly and/or mechanically) with an instrument such that manipulation of the controller causes a corresponding manipulation of the instrument e.g., via master slave control.

Figure 19:
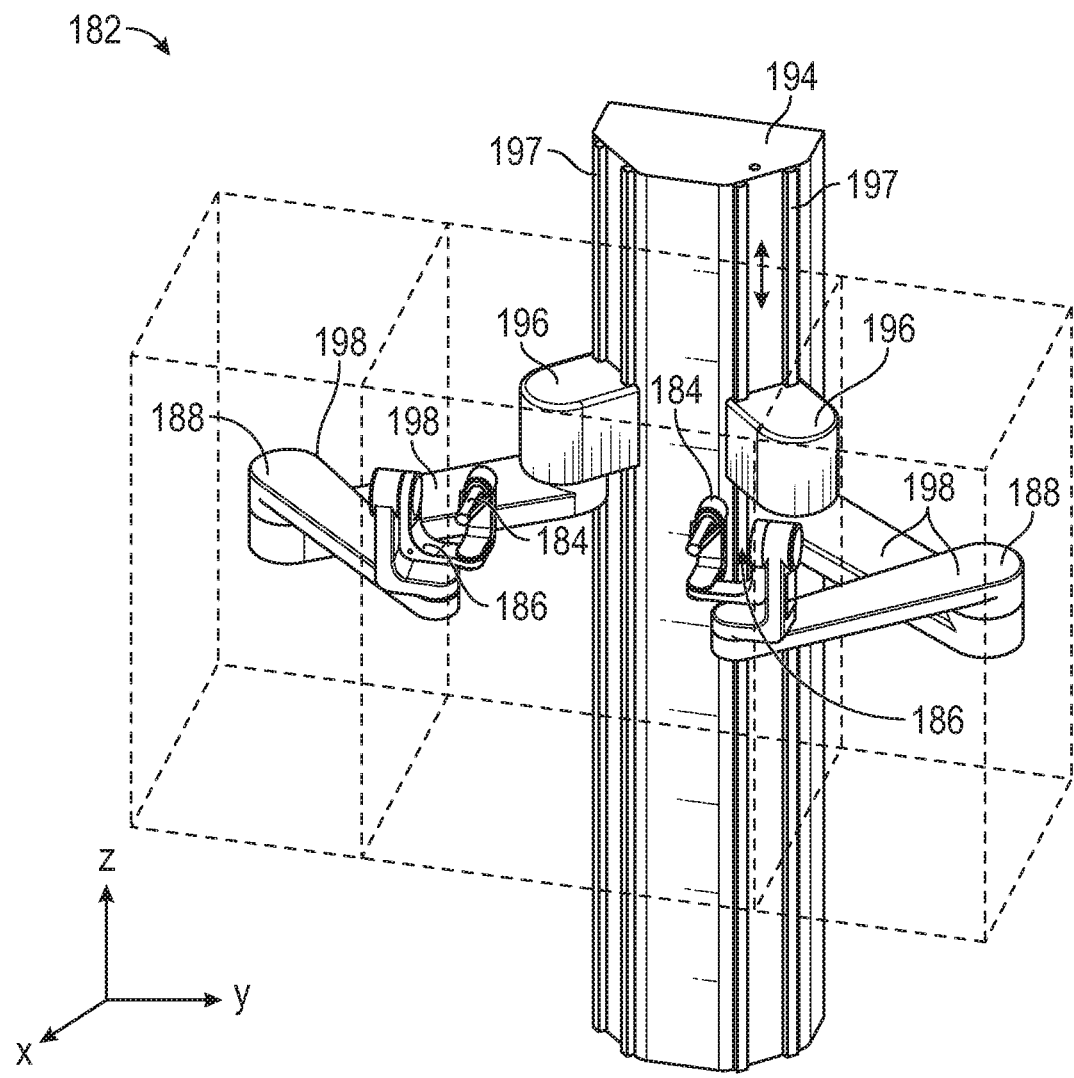
FIG. 19 illustrates an exemplary controller.

FIG. 19 is a perspective view of an embodiment of a controller 182. In the present embodiment, the controller 182 comprises a hybrid controller that can have both impedance and admittance control. In other embodiments, the controller 182 can utilize just impedance or passive control. In other embodiments, the controller 182 can utilize just admittance control. By being a hybrid controller, the controller 182 advantageously can have a lower perceived inertia while in use.

In the illustrated embodiment, the controller 182 is configured to allow manipulation of two medical instruments, and includes two handles 184. Each of the handles 184 is connected to a gimbal 186. Each gimbal 186 is connected to a positioning platform 188.

As shown in FIG. 19, each positioning platform 188 includes a SCARA arm (selective compliance assembly robot arm) 198 coupled to a column 194 by a prismatic joint 196. The prismatic joints 196 are configured to translate along the column 194 (e.g., along rails 197) to allow each of the handles 184 to be translated in the z-direction, providing a first degree of freedom. The SCARA arm 198 is configured to allow motion of the handle 184 in an x-y plane, providing two additional degrees of freedom.

In some embodiments, one or more load cells are positioned in the controller. For example, in some embodiments, a load cell (not shown) is positioned in the body of each of the gimbals 186. By providing a load cell, portions of the controller 182 are capable of operating under admittance control, thereby advantageously reducing the perceived inertia of the controller while in use. In some embodiments, the positioning platform 188 is configured for admittance control, while the gimbal 186 is configured for impedance control. In other embodiments, the gimbal 186 is configured for admittance control, while the positioning platform 188 is configured for impedance control. Accordingly, for some embodiments, the translational or positional degrees of freedom of the positioning platform 188 can rely on admittance control, while the rotational degrees of freedom of the gimbal 186 rely on impedance control.

F. Navigation and Control

Traditional endoscopy may involve the use of fluoroscopy (e.g., as may be delivered through a C-arm) and other forms of radiation-based imaging modalities to provide endoluminal guidance to an operator physician. In contrast, the robotic systems contemplated by this disclosure can provide for non-radiation-based navigational and localization means to reduce physician exposure to radiation and reduce the amount of equipment within the operating room. As used herein, the term "localization" may refer to determining and/or monitoring the position of objects in a reference coordinate system. Technologies such as preoperative mapping, computer vision, real-time EM tracking, and robot command data may be used individually or in combination to achieve a radiation-free operating environment. In other cases, where radiation-based imaging modalities are still used, the preoperative mapping, computer vision, real-time EM tracking, and robot command data may be used individually or in combination to improve upon the information obtained solely through radiation-based imaging modalities.

Figure 20:
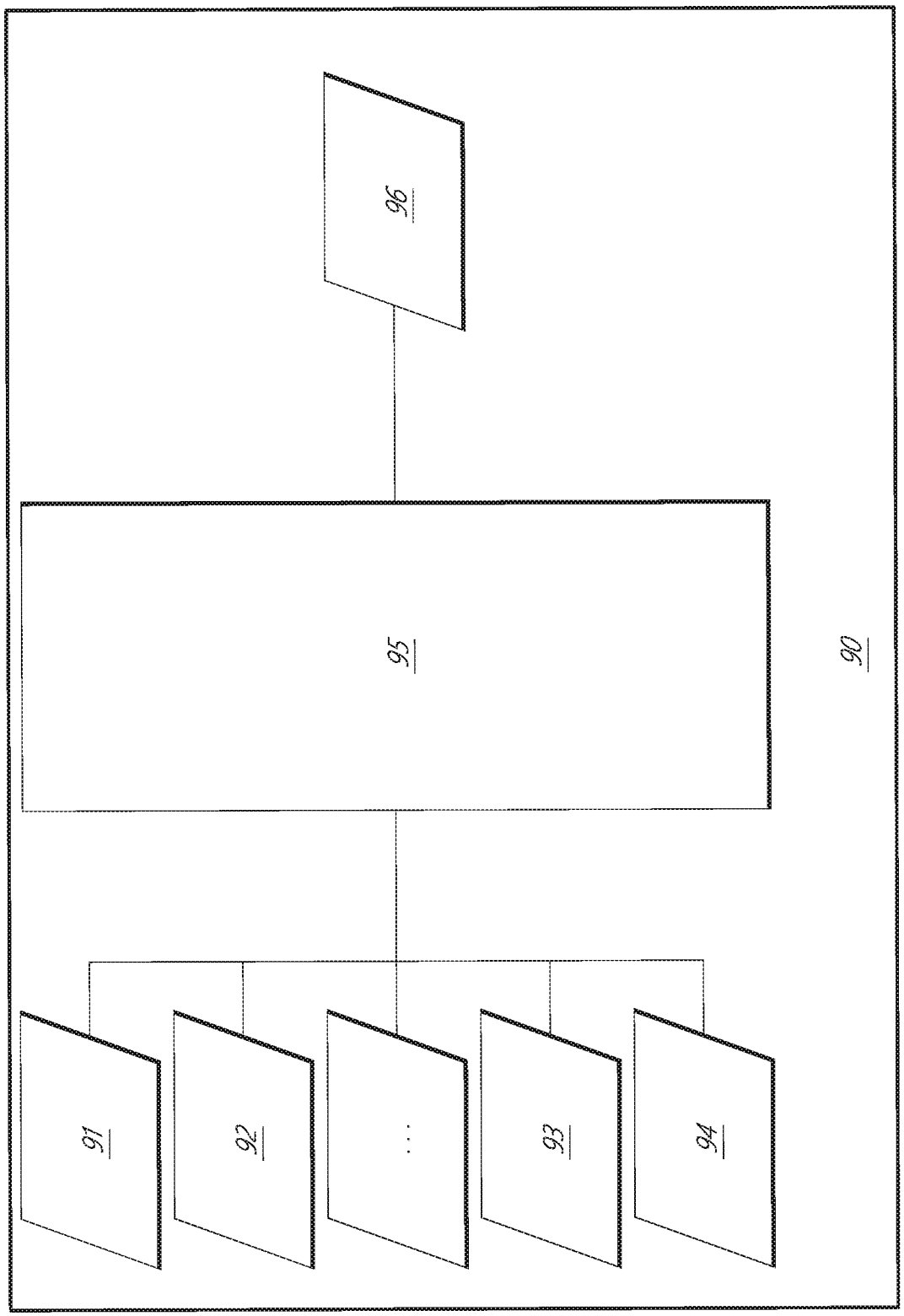
FIG. 20 depicts a block diagram illustrating a localization system that estimates a location of one or more elements of the robotic systems of FIGS. 1-10, such as the location of the instrument of FIGS. 16-18, in accordance to an example embodiment.

FIG. 20 is a block diagram illustrating a localization system 90 that estimates a location of one or more elements of the robotic system, such as the location of the instrument, in accordance to an example embodiment. The localization system 90 may be a set of one or more computer devices configured to execute one or more instructions. The computer devices may be embodied by a processor (or processors) and computer-readable memory in one or more components discussed above. By way of example and not limitation, the computer devices may be in the tower 30 shown in FIG. 1, the cart 11 shown in FIGS. 1-4, the beds shown in FIGS. 5-14, etc.

As shown in FIG. 20, the localization system 90 may include a localization module 95 that processes input data 91-94 to generate location data 96 for the distal tip of a medical instrument. The location data 96 may be data or logic that represents a location and/or orientation of the distal end of the instrument relative to a frame of reference. The frame of reference can be a frame of reference relative to the anatomy of the patient or to a known object, such as an EM field generator (see discussion below for the EM field generator).

The various input data 91-94 are now described in greater detail. Preoperative mapping may be accomplished through the use of the collection of low dose CT scans. Preoperative CT scans are reconstructed into three-dimensional images, which are visualized, e.g. as "slices" of a cutaway view of the patient's internal anatomy. When analyzed in the aggregate, image-based models for anatomical cavities, spaces and structures of the patient's anatomy, such as a patient lung network, may be generated. Techniques such as center-line geometry may be determined and approximated from the CT images to develop a three-dimensional volume of the patient's anatomy, referred to as model data 91 (also referred to as "preoperative model data" when generated using only preoperative CT scans). The use of center-line geometry is discussed in U.S. patent application Ser. No. 14/523,760, the contents of which are herein incorporated in its entirety. Network topological models may also be derived from the CT-images, and are particularly appropriate for bronchoscopy.

In some embodiments, the instrument may be equipped with a camera to provide vision data (or image data) 92. The localization module 95 may process the vision data 92 to enable one or more vision-based (or image-based) location tracking modules or features. For example, the preoperative model data 91 may be used in conjunction with the vision data 92 to enable computer vision-based tracking of the medical instrument (e.g., an endoscope or an instrument advance through a working channel of the endoscope). For example, using the preoperative model data 91, the robotic system may generate a library of expected endoscopic images from the model based on the expected path of travel of the endoscope, each image linked to a location within the model. Intraoperatively, this library may be referenced by the robotic system in order to compare real-time images captured at the camera (e.g., a camera at a distal end of the endoscope) to those in the image library to assist localization.

Other computer vision-based tracking techniques use feature tracking to determine motion of the camera, and thus the endoscope. Some features of the localization module 95 may identify circular geometries in the preoperative model data 91 that correspond to anatomical lumens and track the change of those geometries to determine which anatomical lumen was selected, as well as the relative rotational and/or translational motion of the camera. Use of a topological map may further enhance vision-based algorithms or techniques.

Optical flow, another computer vision-based technique, may analyze the displacement and translation of image pixels in a video sequence in the vision data 92 to infer camera movement. Examples of optical flow techniques may include motion detection, object segmentation calculations, luminance, motion compensated encoding, stereo disparity measurement, etc. Through the comparison of multiple frames over multiple iterations, movement and location of the camera (and thus the endoscope) may be determined.

The localization module 95 may use real-time EM tracking to generate a real-time location of the endoscope in a global coordinate system that may be registered to the patient's anatomy, represented by the preoperative model. In EM tracking, an EM sensor (or tracker) comprising one or more sensor coils embedded in one or more locations and orientations in a medical instrument (e.g., an endoscopic tool) measures the variation in the EM field created by one or more static EM field generators positioned at a known location. The location information detected by the EM sensors is stored as EM data 93. The EM field generator (or transmitter), may be placed close to the patient to create a low intensity magnetic field that the embedded sensor may detect. The magnetic field induces small currents in the sensor coils of the EM sensor, which may be analyzed to determine the distance and angle between the EM sensor and the EM field generator. These distances and orientations may be intraoperatively "registered" to the patient anatomy (e.g., the preoperative model) in order to determine the geometric transformation that aligns a single location in the coordinate system with a position in the preoperative model of the patient's anatomy. Once registered, an embedded EM tracker in one or more positions of the medical instrument (e.g., the distal tip of an endoscope) may provide real-time indications of the progression of the medical instrument through the patient's anatomy.

Robotic command and kinematics data 94 may also be used by the localization module 95 to provide localization data 96 for the robotic system. Device pitch and yaw resulting from articulation commands may be determined during preoperative calibration. Intraoperatively, these calibration measurements may be used in combination with known insertion depth information to estimate the position of the instrument. Alternatively, these calculations may be analyzed in combination with EM, vision, and/or topological modeling to estimate the position of the medical instrument within the network.

As FIG. 20 shows, a number of other input data can be used by the localization module 95. For example, although not shown in FIG. 20, an instrument utilizing shape-sensing fiber can provide shape data that the localization module 95 can use to determine the location and shape of the instrument.

The localization module 95 may use the input data 91-94 in combination(s). In some cases, such a combination may use a probabilistic approach where the localization module 95 assigns a confidence weight to the location determined from each of the input data 91-94. Thus, where the EM data may not be reliable (as may be the case where there is EM interference) the confidence of the location determined by the EM data 93 can be decrease and the localization module 95 may rely more heavily on the vision data 92 and/or the robotic command and kinematics data 94.

As discussed above, the robotic systems discussed herein may be designed to incorporate a combination of one or more of the technologies above. The robotic system's computer-based control system, based in the tower, bed and/or cart, may store computer program instructions, for example, within a non-transitory computer-readable storage medium such as a persistent magnetic storage drive, solid state drive, or the like, that, upon execution, cause the system to receive and analyze sensor data and user commands, generate control signals throughout the system, and display the navigational and localization data, such as the position of the instrument within the global coordinate system, anatomical map, etc.

2. Machine Learning to Facilitate Localizing and Navigating Medical Instruments Embodiments of the disclosure relate to systems and techniques that use modeling systems and machine learning for localizing and navigating medical instruments through luminal networks, such as, for example, lung airways or other anatomical structures having interior open space. Such localization and navigations can be achieved in part by identifying branching and positional information from endoscope images using a machine learning model. Other navigation-related data sources can be used to increase accuracy in estimation of location and orientation of a medical instrument within the luminal network, and by generating and using additional depth information to re-initialize the navigation system after an adverse event. While the examples described herein are in the context of localizing and/or navigating a medical instrument through the bronchial network, it will be understood the described systems and techniques are applicable to localization and/or navigation of a medical instrument in any luminal network of a patient's anatomy.

For example, physicians may plan lung cancer biopsy procedures using preoperative scans (e.g., CT scans) of a patient's lungs, and use flexible bronchoscopes to navigate the lung's branching airways. However, localizing the medical/surgical tool in the small airways in the lung's periphery can be a challenge for even trained physicians given the tortuosity of the anatomy. If the physician is unable to reach the correct airway and precisely aim the biopsy tool toward the target, the lung cancer may be missed, and additional procedures may be needed to repeat the biopsy. By improving the localization of these tools in the lung, safer and less invasive procedures can replace expensive and riskier procedures, such as transthoracic needle aspiration. Precise localization may also be beneficial for the application of surgical robotic applications. These procedures are applicable to both diagnostic and treatment options.

The present disclosure describes methods and systems for deep learning techniques-assisted, image-based localization and/or navigation of an anatomical region that does not require position sensor data. Deep learning techniques in the form of one or more algorithms can be used to localize a bronchoscope in the context of a lung computed tomography (CT) scan using camera images and device insertion information. A first algorithm (e.g., ClassifyNet) can take a camera image as input data and output a prediction of which airways are visible and their localization in the camera's view (e.g., angle left-right and angle up-down). The angles can point toward the centerline of the visible airways. The first algorithm can classify the visible airways by their anatomical index (e.g., trachea, right bronchus, etc.) based on the segmentation of the lung CT. The first algorithm may utilize a neural network modeled after ResNet, a convolutional neural network (CNN) used for computer vision, or some other machine learning model. The output of the first algorithm may be task specific and can provide the user with information to facilitate navigating through the bronchial passageways of the lung.

A second algorithm (e.g., BifurcationNet) can take the camera image as input data and output the location and direction of the visible airways and bifurcations (e.g., branch points). The second algorithm may utilize a CNN configured to provide an output to a particle filter. The particle filter may be configured to probabilistically assign which bifurcation (e.g., based on a model of the bronchial/luminal network) most likely matches or fits with the airways/bifurcations visible in the camera image, based on using robot insertion data and the previous estimate as prior information. As a result, the second algorithm may provide six (e.g., three position, three angle) degrees of freedom (DoF), which can be referred to as the pose or state of the camera in the lung. The first and/or second algorithms can be operated in real-time.

Figure 21:
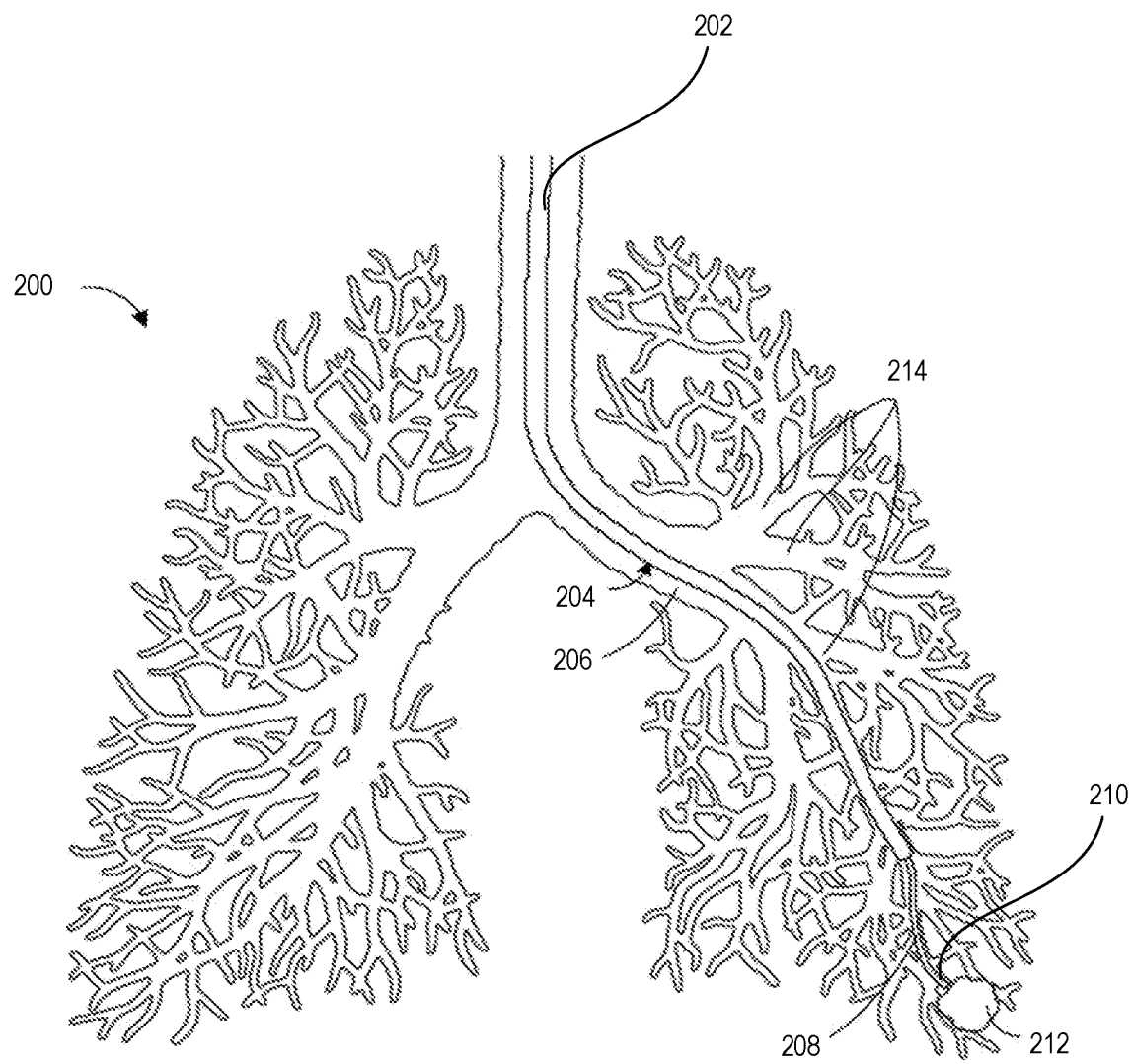
FIG. 21 illustrates an example luminal network navigated using a medical instrument.

FIG. 21 illustrates an example luminal network 200 that can be navigated using the systems and techniques described herein. The luminal network 200 includes the branched structure of the passageways 214 of the patient, such as a primary passageway 206. As shown, a target 212 (e.g., a nodule, a lesion, etc.) that can be accessed as described herein for diagnosis and/or treatment. As illustrated, the target 212 is located at the periphery of one or more of the passageways 214. A medical instrument 202 may be navigated through the primary passageway 206 toward the target 212. The medical instrument 202 may comprise a working channel 204 having a first diameter that may be larger than certain of the passageways 214, and thus a distal end of the working channel 204 may not able to be positioned through the smaller-diameter airways around the target 212. Accordingly, an elongate body 208 of the medical instrument 202 extends from the working channel 204 of the medical instrument 202 and to the remaining distance to the target 212. The elongate body 208 may have a lumen through which instruments, such as, for example, biopsy needles, cytology brushes, and/or tissue sampling forceps, can be passed to the target tissue site of target 212.

In such implementations, one or both of the distal end of the working channel 204 and/or the distal end of the elongate body 208 can be provided with EM sensors for tracking their position within the passageways 214. Additionally or alternatively, an imaging device 210 can be disposed at a distal end of the elongate body 208 of the medical instrument 202.

In certain embodiments, the overall diameter of the working channel 204 may be small enough to reach the periphery without the elongate body 208, or may be small enough to get close to the periphery (e.g., within 2.5-3 cm) to deploy the elongate body 208 to better image and/or capture the target 212. The elongate body 208 deployed through the working channel 204 may be equipped with EM sensors, and the position estimation techniques described below can be applied to such medical instruments when they are deployed beyond the distal tip of the working channel 204.

In some embodiments, a two-dimensional (2D) display of a three-dimensional (3D) luminal network model as described herein, or a cross-section of a 3D model, can resemble FIG. 21. Estimated position information regarding the medical instrument 202 or component(s) thereof can be overlaid onto such a representation.

Figure 22:
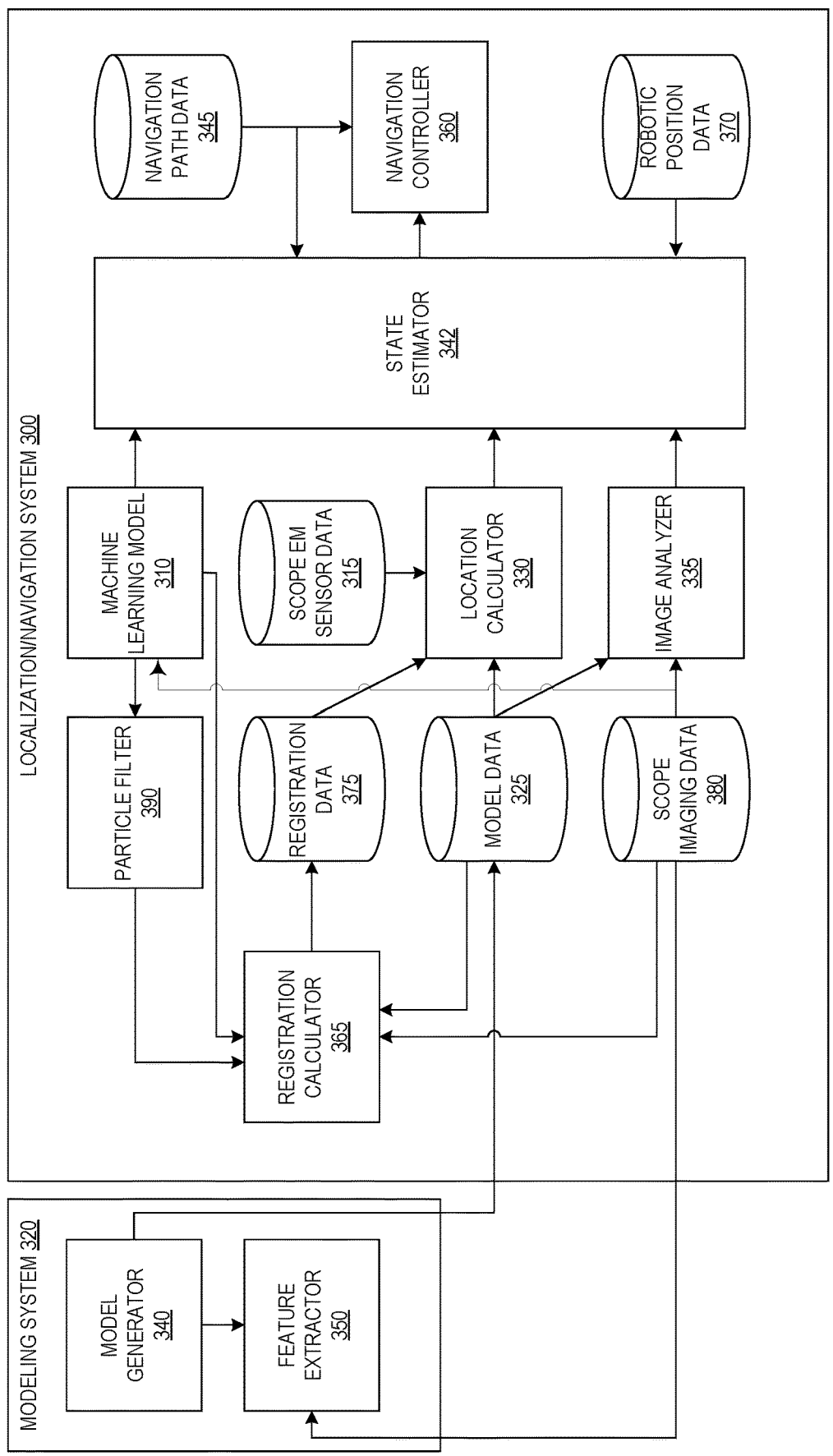
FIG. 22 illustrates a schematic block diagram of an example localization/navigation system in conjunction with a modeling system.

FIG. 22 illustrates a schematic block diagram of an example localization/navigation system 300 in conjunction with a modeling system 320 as described herein. Using the system 300, data from a number of different sources is combined and repeatedly analyzed during a surgical procedure to provide an estimation of the real-time movement information and location/orientation information of a medical instrument (e.g., the endoscope) within the luminal network of the patient or to make navigation decisions.

The location/navigation system 300 includes a number of data repositories including endoscope EM sensor data repository 315, registration data repository 375, model data repository 325, endoscope imaging data repository 380, navigation path data repository 345, and robotic position data repository 370. Though shown separately in FIG. 22 for purposes of clarity in the discussion below, it will be appreciated that some or all of the data repositories can be stored together in a single memory or set of memories. The system 300 also includes a number of processing modules including a registration calculator 365, machine learning model 310, location calculator 330, image analyzer 335, state estimator 342, and navigation controller 360. Each module can represent a set of computer-readable instructions, stored in a memory, and one or more processors configured by the instructions for performing the features described below together. The localization/navigation system 300 can be implemented as one or more data storage devices and one or more hardware processors, for example, in the tower 30 and/or controller 182 described above. The localization/navigation system 300 can be an embodiment of the localization system 90 in some implementations, although this need not always be the case.

FIG. 22 also illustrates modeling system 320 in communication with the localization/navigation system 300. As described in more detail below, using the modeling system 320, data representing a number of images of a patient's anatomical luminal network can be analyzed to build a 3D model of a virtual representation of the anatomical luminal network. Though illustrated separately, in some embodiments the modeling system 320 and localization/navigation system 300 can be combined into a single system. The modeling system 320 includes a number of processing modules including model generator 340 and feature extractor 350. Although the model data repository 325 is illustrated within the localization/navigation system 300, this data repository can in some implementations be located alternatively or additionally within the modeling system 320.

The model generator 340 is a module configured to receive data from a medical imaging system (not illustrated), for example, a CT imaging system or magnetic resonance imaging system. The received data can include, for example, a series of 2D images representing the anatomical luminal network of the patient. The model generator 340 can generate a 3D volume of data from the series of 2D images, and can form the virtual 3D model of the internal surfaces of the anatomical luminal network from the 3D volume of data. For example, the model generator can apply segmentation to identify portions of the data corresponding to the tissue of the anatomical luminal network. As such, the resulting model can represent the luminal network, including interior surfaces of the tissue of the anatomical luminal network.

The model data repository 325 is a data storage device that stores data representing a model of the luminal network of the patient, for example, the model generated by the model generator 340. Such a model can provide 3D information about the structure and connectivity of the luminal network, including the topography and/or diameters of patient airways in some examples.

The endoscope imaging data repository 380 is a data storage device that stores image data received from a camera at a distal end of an endoscope, for example, the imaging device 210. The image data can be discrete images or series of image frames in a video sequence in various embodiments.

The feature extractor 350 is a module configured to receive the model from the model generator 340 and build a database of depth features corresponding to a number of different locations within the model. For example, the feature extractor 350 can identify a number of different locations within the model, computationally position a virtual imaging device at each of the locations, generate a virtual image at each location, and then derive specified features from the virtual image. A "virtual imaging device" as described herein is not a physical imaging device, but rather a computational simulation of an image capture device. The simulation can generate virtual images based on virtual imaging device parameters including field of view, lens distortion, focal length, and brightness shading, which can in turn be based on parameters of an actual imaging device.

Each generated virtual image can correspond to a virtual depth map representing the distance between the location of the virtual imaging device and tissue of the virtual luminal network within the virtual field of view of the virtual imaging device. The feature extractor 350 can match the virtual imaging device parameters to the parameters of an actual imaging device that has been identified for use in a medical procedure involving the patient's luminal network. An example process for building the database is described in more detail below with respect to FIG. 20.

The feature extractor 350 can also receive data from the endoscope imaging data repository 380, generate a depth map representing the distance between the endoscope imaging device and the imaged tissue represented by pixels of the image, and derive features from the generated depth map. In some embodiments, the feature extractor 350 can use photoclinometry (e.g., shape by shading) processing to generate a depth map based on a single image. In some embodiments, the feature extractor 350 can use a stereoscopic image set depicting the imaged region to generate a depth map.

The machine learning model 310 is a module configured to identify features, such as, for example, branchings, in real-time from images of the anatomical luminal network and compare them to the pre-computed feature(s) extracted from virtual images. The machine learning model 310 can scan the scope imaging data repository 380 for a match of a virtual feature to the feature extracted from an actual image, and can use the location corresponding to the match as the position of the instrument (e.g., an endoscope) within the anatomical luminal network. The match can be an exact match, the best match among the available features in the scope imaging data repository 380, and/or a match within a threshold/defined difference from the extracted feature. The machine learning model 310 can output the position to the state estimator 342, for example, for use as an initial position (a "prior") in a probabilistic evaluation of the position of the instrument, or for use as a prior after occurrence of an adverse event (e.g., coughing) in which the precise location of the instrument becomes unknown. The machine learning model 310 can output the position to the registration calculator 365 for use in generating an initial registration between the model and an EM field disposed around the patient and/or an updated registration. The machine learning model 310 can detect objects present in the field of view of the image data, such as branch openings, lesions, or particles. Using object recognition, the image analyzer 335 can output object data indicating information about what objects were identified, as well as positions, orientations, and/or sizes of objects represented as probabilities.

The machine learning model 310 can include one or more types of machine learning models. For example, the machine learning model 310 can include a deep learning architecture like an artificial neural network, such as, for example, a CNN. Other architectures may be used, such as, for example, deep neural networks, deep belief networks, recurrent neural networks. The machine learning model 310 can receive data input (e.g., from the scope imaging data 380) and identify features therein, such as branchings, as an output. Additionally or alternatively, the machine learning model 310 can output a location (e.g., a coordinate or relative location within the 3D model described above), a relative or absolute orientation relative to the 3D model described above, a distance or angular relationship to a branching or other identified feature in the 3D model.

For example, a neural network trained on simulated data can track a bronchoscope's movement through a human cadaver lung. As a further example, the neural network can be used to estimate the position and orientation of objects has been shown in various contexts. The output can include a matrix representing the characterization of the luminal network passageways (e.g., airways). The output can include a camera frame position (x, y, z) and/or a distance to the furthest visible point of the airway (e.g., in mm). The output can represent the XYZ Euler angles for a camera frame angle about X and Y, respectively. The neural network can include an algorithm, such as, for example, BifurcationNet, ResNet, ClassifyNet, OffsetNet, AirwayNet, and/or another deep learning model. In some examples, the neural network includes a generative adversarial network (GAN). Certain models, such as BifurcationNet, may provide lower average localization errors on correctly labeled frames, and may facilitate reaching later/deeper branchings in the luminal network. BifurcationNet can work together with a particle filter, such as one described herein, which can be sensitive to output estimates from previous frames. Classification of airways in later frames can be improved using a particle filter. For example, confidence in features in later frames may be increased based on probabilistic determinations of features in earlier frames. BifurcationNet may use a fewer number (e.g., seven) airway characteristics, insertion data, and/or state history in determining output of the images.

Other algorithms may alternatively or additionally be used. For example, AirwayNet can be effective without the use of a particle filter. AirwayNet may outperform other models in identifying branchings in an image without being influenced by misclassifications from previous frames. AirwayNet can leverage all of the information in image space and may do so without prior context. Other benefits described herein may apply to one or more machine learning models.

The machine learning model 310 can localize a bronchoscope in real-time by predicting an offset between the imaging device and a rendering of the expected position of the imaging device. The machine learning model 310 can achieve an offset of less than about 0.5 mm, about 0.75 mm, about 1 mm, about 1.25 mm, about 1.5 mm, about 1.75 mm, about 2 mm, about 2.25 mm, about 2.5 mm, about 3 mm, about 4 mm, about 5 mm, about 6 mm, about 7 mm, about 8 mm, about 9 mm, and/or about 10 mm. The achieved offset can fall within a range having any endpoints therein. For example, in some embodiments, the machine learning model 310 can achieve a 1.4 mm accuracy. An accuracy of the offset can be improved by comparing EM sensor data (e.g., EM sensor data repository 315 described below) or other sensor data. The machine learning model 310 can demonstrate continuous, real-time tracking on sequences in a lung phantom, human cadaver lung, and/or in vivo lung.

The localization/navigation system 300 can include a particle filter 390. The particle filter 390 can receive the output from the machine learning model 310 and/or may pass the output from the particle filter 390 to the registration calculator 365. The particle filter 390 can be used to probabilistically match a bifurcation identified/detected by the machine learning model 310 with the preoperative model. The particle filter 390 can use robot insertion data, such as the robotic position data, and/or the previous estimate as prior information. The particle filter 390, in conjunction with the machine learning model 310, can help identify a six DoF pose of the camera in the lung. The particle filter 390 may predict one or more features within the image data received from the scope imaging data database 380. The particle filter 390 may improve its accuracy if the same passageway is viewed from multiple perspectives. The particle filter 390 can pair visible passageways with the passageways in the underlying CT (e.g., the passageways identified and modeled by the model generator 340). The particle filter 390 may determine the probability the measurement fits a given CT bifurcation, such as when a bifurcation is visible and/or at least two children airways are visible. The particle filter 390 additionally or alternatively calculates the prior probability of seeing that CT bifurcation. With the measurement probability and/or the prior probability, the particle filter 390 can calculate the posterior probability of the endoscope (e.g., bronchoscope) seeing that bifurcation. The particle filter 390 can assign the bifurcation with the maximum posterior probability to the visible airways and use that assignment to calculate the estimated bronchoscope position. In some examples, one or more of the tasks described above with respect to the particle filter 390 may be additionally or alternatively performed by the machine learning model 310.

The endoscope EM sensor data repository 315 is a data storage device that stores data derived from an EM sensor at the distal end of an endoscope. As described above, such a sensor could include, for example, the EM sensor 125 or the EM sensor coils 305, and the resulting data can be used to identify position and orientation of the sensor within the EM field. Similar to the data from the machine learning model 310 and/or the particle filter 390, data for an endoscope EM sensor can be stored as a tuple in the form of $\{x, y, z, t_n\}$ where x, y, and z represent the coordinates of the sensor in the EM field at time $t_n$. Some embodiments may further include roll, pitch, and yaw of the instrument in the EM sensor tuple. The endoscope EM sensor data repository 315 can store a number of such tuples for each endoscope-based sensor corresponding to a number of different times.

The registration calculator 365 is a module, for example, an algorithm, configured to identify a registration or mapping between the coordinate frame of the 3D model (e.g., a coordinate frame of the CT scanner used to generate the model) and the coordinate frame developed from the imaging and/or EM sensors. In order to track a sensor through the patient's anatomy, the localization/navigation system 300 may use a process known as "registration," by which the registration calculator 365 finds the geometric transformation that aligns a single object between different coordinate systems. For instance, a specific anatomical site on a patient may have a representation in the 3D model coordinates and also in the EM sensor coordinates. In order to calculate an initial registration, one implementation of the registration calculator 365 can perform registration as described in U.S. application Ser. No. 15/268,238, filed Sep. 17,2016, titled "Navigation of Tubular Networks," the disclosure of which is hereby incorporated by reference. As an example of one possible registration technique, the registration calculator 365 can receive data from the endoscope imaging data repository 380, the EM sensor data repository 315, and/or output from the machine learning model 310 and/or particle filter 390 at a number of different points as the endoscope is inserted into the airways of the patient, for example, as the endoscope reaches various bifurcations. The image data can be used to identify when the distal end of the endoscope has reached a bifurcation, for example, via automated feature analysis. Some examples can use not only bifurcations but other points in the patient's airway, and may map such points to corresponding points in a "skeleton" model of the airway. The registration calculator 365 can use data linking at least three of EM positions to points in the model in order to identify the geometric transformation between the EM field and the model. Another embodiment can involve manual registration, for example, by taking at least some data from a first bifurcation in the patient's airway and from two more bifurcations in the left and right lungs, and can use the corresponding points to calculate the registration. This data to perform the geometric transformation (also referred to as registration data) can be stored in the registration data repository 375 as registration data.

After the initial registration is determined, the registration calculator 365 may update its estimate of the registration transform based on received data so as to increase transform accuracy as well as to compensate for changes to the navigation system, e.g., changes due to movement of the patient. In some aspects, the registration calculator 365 may update the estimate of the registration transform continually, at defined intervals, based on the position of the endoscope (or component(s) thereof) in the luminal network, and/or based on user input.

Registration data repository 375 is a data storage device that stores the registration data that, as just discussed, is usable to perform a geometric transformation from the coordinate frame of the imaging/EM sensors to the coordinate frame of the model. Also discussed above, the registration data may be generated by the registration calculator 365 and may be updated continually or periodically in some implementations.

The location calculator 330 is a module, for example, an algorithm, configured to receive data from the model data repository 325, registration data repository 375, and the EM sensor data repository 315, and translate EM sensor coordinates and/or the output from the machine learning model 310 and/or particle filter 390 into 3D model coordinates. In order to translate the initial position of the sensors (e.g., imaging device, EM sensor) into the model coordinate frame, the location calculator 330 can access the mapping between the EM/imaging device coordinate frame and the model coordinate frame (e.g., registration data) as stored in the registration data repository 375. In order to translate the scope position into the 3D model coordinate frame, the location calculator 330 receives, as input, data representing the topography of the 3D model from the model data repository 325, and data representing the registration between the EM field and the coordinate frame of the 3D model from the registration data repository 375. Some embodiments can also receive prior estimated state data from the state estimator 342. Based on the received data, the location calculator 330 may perform, e.g., on-the-fly transformation between the imaging/EM sensor position data to a position in the 3D model. This can represent a preliminary estimate of the position of the distal end of the scope within the topography of the 3D model and can be provided as one input to the state estimator 342 for generating a final estimate of the scope position.

The image analyzer 335 is a module, for example, an algorithm configured to receive data from the endoscope imaging data repository 380 and model data repository 325, and compare this data to determine endoscope positioning. For example, the image analyzer 335 can access volume-rendered or surface-rendered endoluminal images of the airway tree from the model scans and can compare the rendered images with the real-time image or video frames from the imaging device (e.g., imaging device 210) to determine a position and/or orientation of the endoscope.

In some embodiments, the machine learning model 310 may be configured to receive images from the scope imaging data repository 380 and determine a position and/or orientation of an endoscope. Additionally or alternatively, the position and/or orientation determined by the machine learning model 310 can be compared with a position and/or orientation determined by the image analyzer 335. The images may be compared (e.g., using Powell's optimization, simplex or gradient methods, gradient descent algorithms with normalized cross correlation or mutual information as costs), and then weighted normalized sum of square difference errors and normalized mutual information can be used for comparing the images obtained from the machine learning model 310 and the image analyzer 335. Based on the comparison, the localization/navigation system 300 can determine a confidence level of the position and/or orientation of the endoscope.

In some examples, the image analyzer 335 can work in conjunction with the machine learning model 310 and/or the particle filter 390 to implement object recognition techniques. As one example, object recognition can be used to detect objects that may indicate branch points in a luminal network and then determine their position, size, and/or orientation. In one embodiment, in a given image within a luminal network, each branch will typically appear as a dark, approximately elliptical region, and these regions may be detected automatically by a processor, using region-detection algorithms such as maximally stable extremal regions (MSER) as objects. The image analyzer 335 can use light reflective intensity combined with other techniques to identify airways. Further, image analyzer 335 can further track detected objects across a set of sequential image frames to detect which branch has been entered from among a set of possible branches in the luminal network.

The robotic position data repository 370 is a data storage device that stores robotic position data received from a medical robotic system, such as, for example, the robotic system 10 described above with reference to FIGS. 1 and 3 or robotic systems 400, 500 described below with reference to FIGS. 23A and 23B. The robotic position data may include, for example, data related to physical movement of the medical instrument or part of the medical instrument (e.g., the instrument tip or distal end) by the medical robotic system within the luminal network. Example robotic position data may include, e.g., command data instructing the instrument tip to reach a specific anatomical site and/or change its orientation (e.g., with a specific pitch, roll, yaw, insertion, and retraction for one or both of a leader and a sheath of an endoscopic instrument) within the luminal network, insertion data representing insertion movement of the part of the medical instrument (e.g., the working channel, the elongate body), instrument driver data, and mechanical data representing mechanical movement of an elongate member of the medical instrument, such as, for example, motion of one or more pull wires, tendons or shafts of the endoscope that drive the actual movement of the endoscope within the luminal network.

The navigation path data repository 345 is a data storage device that stores data representing a pre-planned navigation path through the luminal network to a target tissue site. Navigating to a particular point in a luminal network of a patient's body may require certain steps to be taken preoperatively in order to generate the information needed to create the 3D model of the tubular network and to determine a navigation path within it. As described above, a 3D model may be generated of the topography and structure of the specific patient's airways. A target (e.g., target 212 of FIG. 21) can be selected, for example, a lesion to biopsy or a portion of organ tissue to repair surgically. In one embodiment, the user is capable of selecting the location of the target by interfacing with a computer display that can show the 3D model, such as by clicking with a mouse or touching a touchscreen. In some embodiments, the navigation path may be identified programmatically by analysis of the model and an identified lesion site to derive a shortest navigation path to the lesion. In some embodiments the path may be identified by a physician, or an automatically-identified path may be modified by a physician. The navigation path can identify a sequence of branches within the luminal network to travel through so as to reach the identified target.

The state estimator 342 is a module, for example, an algorithm configured to receive inputs and perform analysis of the inputs to determine a state of the medical instrument. For example, the state estimator 342 can receive, as inputs, data from the machine learning model 310, location calculator 330, image analyzer 335, navigation path data repository 345, and robotic position data repository 370. The state estimator 342 can implement a probabilistic analysis to determine a state and corresponding probability of the medical instrument within the luminal network given the provided inputs. Estimated state can refer to one or more of (1) a coordinate (e.g., x,y,z) position of the instrument relative to a coordinate frame of a model of the luminal network, (2) whether the instrument is located in a certain region of the model, for example, a particular airway branch, (3) pitch, roll, yaw, insertion, and/or retraction of the instrument, and (4) distance to target. The state estimator 342 can provide the estimated state of the instrument (or the distal tip of the instrument) as a function of time.

In some embodiments, the state estimator 342 can implement a Bayesian framework to determine the state and corresponding probability. Bayesian statistical analysis starts with a belief, called a prior, and then update that belief with observed data. The prior represents an estimate of what the Bayesian model parameters might be and can be represented as a parameterized distribution. The observed data can be gathered to obtain evidence about actual values of the parameters. The outcome of Bayesian analysis is called a posterior, and represents a probabilistic distribution expressing events in terms of confidence. If further data is obtained the posterior can be treated as the prior and updated with the new data. This process employs the Bayes rule, which indicates a conditional probability, for example, how likely is event A if event B happens.

The "probability", as used herein, refers to a likelihood of an estimation of a possible location and/or orientation of the medical instrument being correct. For example, different probabilities may be calculated by one of the algorithm modules indicating the relative likelihood that the medical instrument is in one of several different possible branches within the luminal network. In one embodiment, a probability distribution (e.g., discrete distribution or continuous distribution) is chosen to match features of an estimated state (e.g., type of the estimated state, for example, continuous position information vs. discrete branch choice). As one example, estimated states for identifying which segment the medical instrument is in for a trifurcation may be represented by a discrete probability distribution, and may include three discrete values of 20%, 30% and 50% representing chance as being in the location inside each of the three branches as determined by one of the algorithm modules. As another example, the estimated state may include a roll angle of the medical instrument of 40±5 degrees and a segment depth of the instrument tip within a branch may be is 4±1 mm, each represented by a Gaussian distribution which is a type of continuous probability distribution.

The navigation controller 360 is a module that receives data from the state estimator 342 and the navigation path data repository 345 and uses this data to guide further operation of the medical robotic system. For example, the navigation controller 360 can plot the estimated state along a predetermined navigation path and can determine a next movement (e.g., extension/retraction distance, roll, actuation of pull wires or other actuating mechanisms) for the instrument to advance along the navigation path. The navigation controller 360 can automatically control the instrument according to the determined next movement in some embodiments. In some embodiments the navigation controller 360 can output specific instrument movement instructions and/or instrument driver operation instructions for display to the user, such as by the controller 182. The navigation controller 360 can cause display of side-by-side views of a slice of the 3D model at the estimated position and of the real-time images received from the scope imaging data repository 380 in some embodiments in order to facilitate user-guided navigation. In some examples, the navigation controller 360 is separate from the localization/navigation system 300.

Figure 23A:
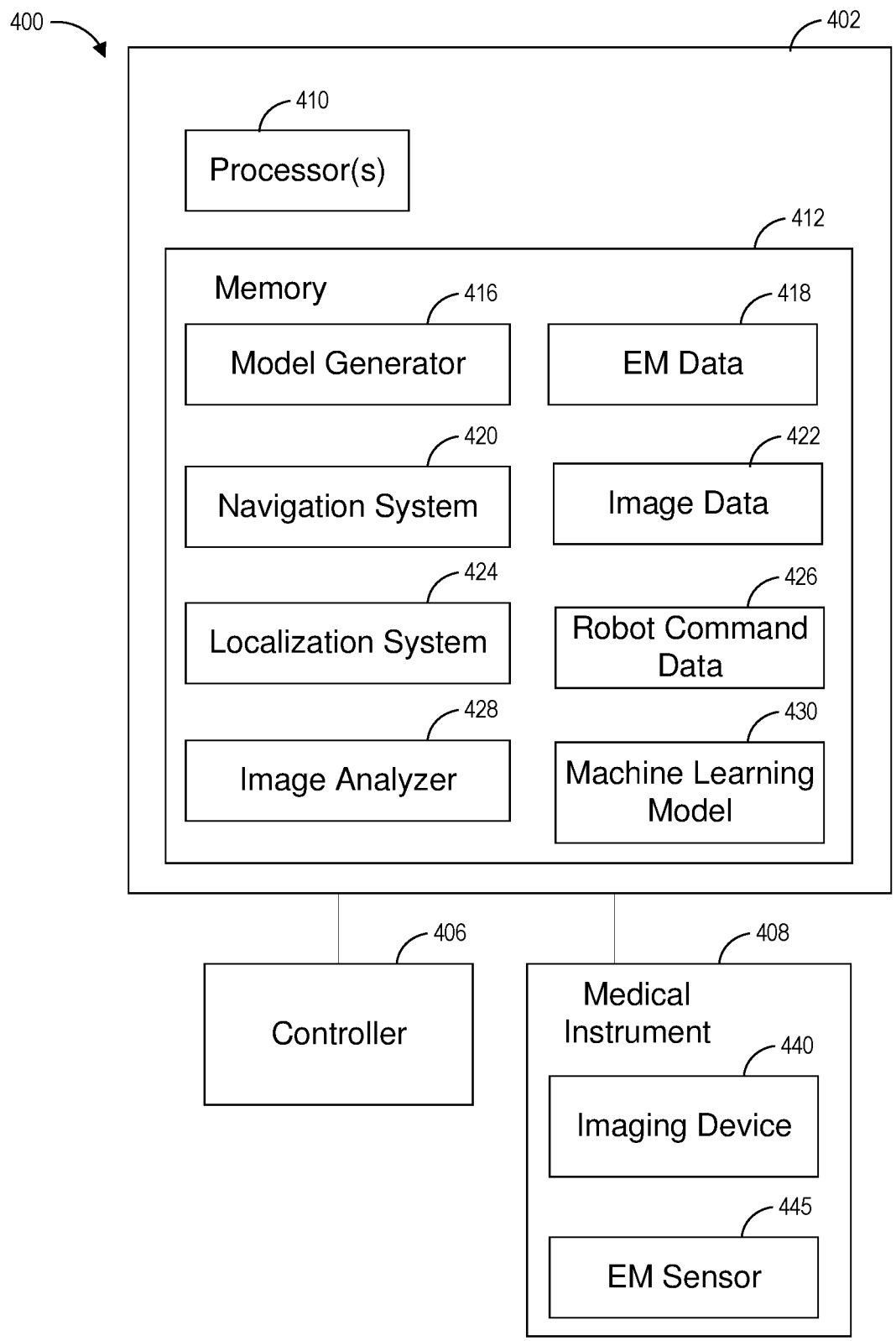
FIG. 23A illustrates an example robotic system for localization and/or navigation within a luminal network.
Figure 23B:
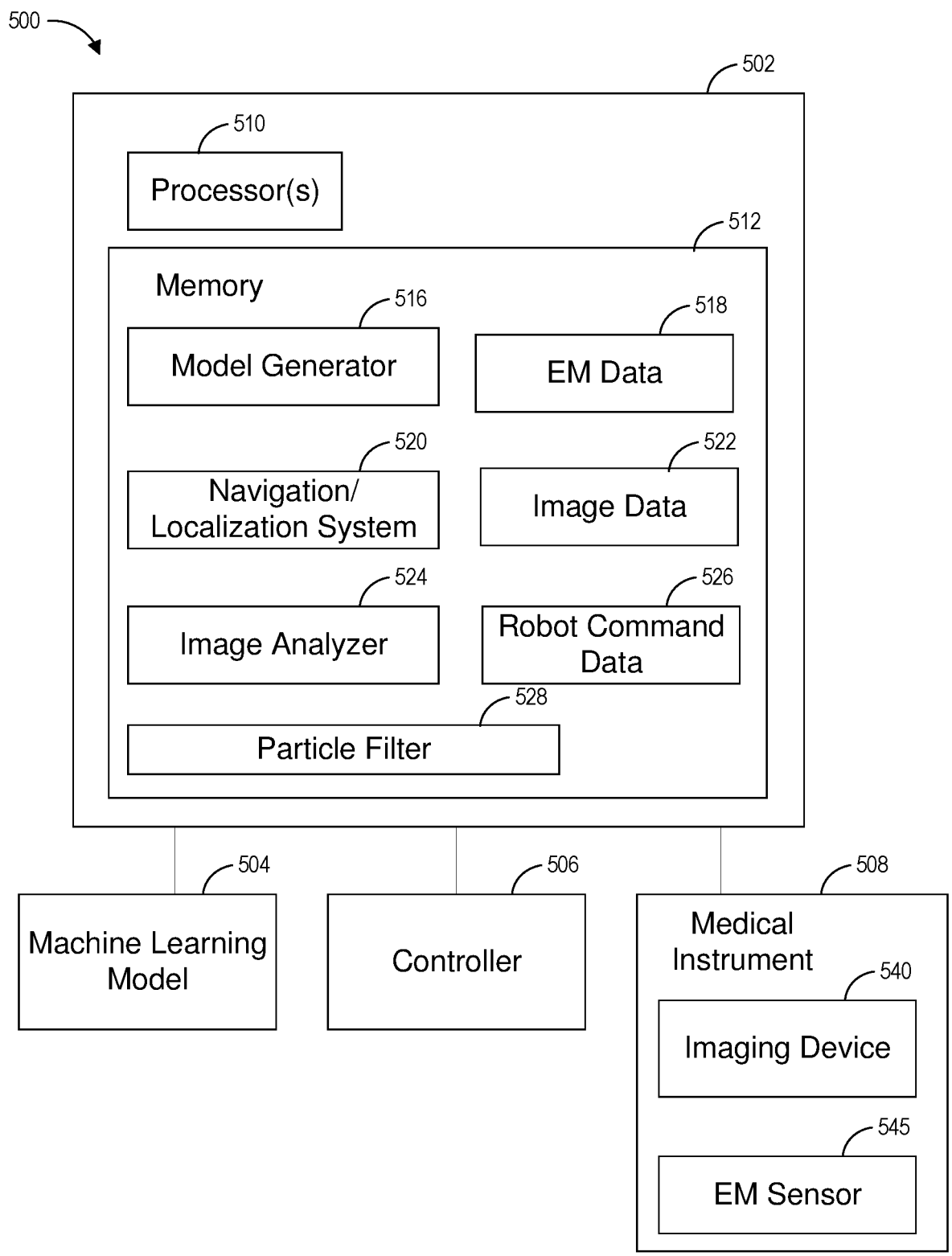
FIG. 23B illustrates an example robotic system for localization and/or navigation within a luminal network.

FIG. 23A illustrates features of an example robotic system 400 configured to use machine learning for localization and/or navigation within a luminal network. The robotic system 400 can include a control system 402, a controller 406, and a medical instrument 408. The control system 402 can include one or more processors 410 and a non-transitory memory 412. The memory 412 can include a model generator 416, EM data 418, a navigation system 420, image data 422, a localization system 424, robot command data 426, an image analyzer 428, and a machine learning model 430. The medical instrument 408 can include an imaging device 440 and a EM sensor 445.

The controller 406 can be coupled to the control system 402 and/or the medical instrument 408 to support guidance and control of the medical instrument 408. The controller 406 may correspond to the cart 11, the tower 30, the console 31, the controller 182 described above, or component(s) thereof. The medical instrument 408 can include the imaging device 440 and the EM sensor 445, and may be configured to be inserted into the luminal network of a patient, such as, for example, a lung or kidney.

The memory 412 may include one or more features discussed above with respect to FIG. 22. For example, the memory 412 can include a model generator 416 that may correspond to the model generator 340. For example, the model generator 340 can be configured to receive data from a medical imaging system, such as, for example, a CT imaging system or a magnetic resonance imaging system. The received data can include a series of 2D images representing the anatomical luminal network of the patient. The model generator 416 can generate, from the series of 2D images, a virtual 3D model of the internal surfaces of the anatomical luminal network from the 3D volume of data.

The navigation system 420 may include or utilize one or more features of the localization/navigation system 300 described above. For example, the navigation system 420 can use the EM data 418, the image data 422, and robot command data 426 to guide further operation of the medical instrument 408. For example, the navigation system 420 can communicate with the controller 406 (e.g., receive instructions from a user via the controller 406) to drive the medical instrument 408, such as a movements thereof. The navigation system 420 can facilitate, automatically or otherwise, controlling the medical instrument 408 according to the determined next movement in certain embodiments. In some embodiments the navigation system 420 can output movement related information for display to the user, such as via a display screen of the controller 406 (e.g., a display screen or touchscreen of the console 31 described above). The navigation system 420 can display a model (e.g., the 3D model) of the luminal network in relation to an estimated position, and/or of the real-time position of the medical instrument 408 determined by the machine learning model 430 and/or the image analyzer 428 in order to facilitate user-guided navigation.

The localization system 424 can include features described above with respect to the localization/navigation system 300. For example, the localization system 424 may receive various inputs and perform analysis of the inputs to determine a location and/or a state of the medical instrument 408 or a portion thereof (e.g., the imaging device 440 which may be on the distal end/portion of the medical instrument 408). For example, the localization system 424 can receive and utilize data from the machine learning model 430, image analyzer 428, and/or the robot command data 426 to determine one or more of (1) a coordinate (e.g., x,y,z) position of the instrument 408 relative to a coordinate frame of a model of the luminal network, (2) whether the instrument 408 is located in a certain region of a model developed by the model generator 416, (3) pitch, roll, yaw, insertion, and/or retraction of the instrument 408, and (4) distance to a target. The localization system 424 can provide the estimated state (e.g., position, orientation, deployed state) of the instrument (e.g., the distal tip of the instrument) as a function of time. The navigation system 420 and/or the localization system 424 can include features described above with respect to the state estimator 342 and/or the navigation controller 340 described above with reference to FIG. 22. Alternatively or additionally, the localization system 424 can include features of the localization system 90 discussed above with reference to FIG. 20.

The image analyzer 428 can aid in determining a position and/or orientation of the medical instrument 408, or a portion thereof (e.g., the imaging device 440). The image analyzer 428 can output a prediction of which passageways (e.g., airways) are visible and/or their localization in the camera's view (angle left-right and angle up-down). The angles may be based on a centerline of the visible passageways. The algorithm may classify the visible passageways by their anatomical index (e.g., trachea, right bronchus, etc.) based on the segmentation of the lung CT images from the image data 422. The image analyzer 428 can include a machine learning model, such as a CNN (e.g., ResNet). The image analyzer 428 can access volume-rendered or surface-rendered images of the luminal network from the model scans and can compare the rendered images with the real-time image and/or video frames from the imaging device 440. The image analyzer 428 can include one or more features as those described with reference to the image analyzer 335 above. For example, the image analyzer 428 can work in conjunction with the machine learning model 430 to implement object recognition techniques.

The machine learning model 430 can identify features, such as, for example, branchings, in real-time from images of the anatomical luminal network and may map or connect these features with pre-computed feature(s) extracted from the preoperative features described above. The machine learning model 430 can include one or more features of the machine learning model 310 described above. For example, the machine learning model 430 can detect objects present in the field of view of the image data, such as, for example, branch openings, lesions, or particles. Using object recognition, the image analyzer can output object data indicating information about what objects were identified, as well as positions, orientations, and/or sizes of objects, which may be represented as probabilities. The machine learning model 430 can include one or more types of machine learning models, and can output information regarding a location and/or orientation of the imaging device. The location and/or orientation may be absolute, or may be relative to a preoperative model described. For example, when the information regarding location may be a positional relationship to a branching or other identified feature in the preoperative model. In addition or in the alternative, the information regarding orientation may be an angular relationship to a branching or other identified feature in the preoperative model. Thus, the machine learning model 430 can localize the medical instrument 408 (or the imaging device 440) in real-time by predicting an offset between the imaging device 440 and a rendering of the expected position of the imaging device 440. The machine learning model 310, described above with reference to FIG. 22, can achieve an offset described above during real-time positioning within, for example, a human lung.

In some implementations, a machine learning model may work in conjunction with a particle filter, such as the particle filter 390 described above with reference to FIG. 22. With reference now to FIG. 23B, provided is another example robotic system 500 for localization and/or navigation within a luminal network. The robotic system 500 differs from the robotic system 400 of FIG. 23A in that the robotic system 500 includes a particle filter 528, combines the navigation/localization system 520 into a common module, and couples the machine learning model 504 to the control system 502.

The robotic system 500 can include a control system 502, a machine learning model 504, a controller 506, and a medical instrument 508. The control system 502 can include one or more processors 510 and a non-transitory memory 512. The memory 512 can include a model generator 516, EM data 518, a navigation/localization system 520, image data 522, an image analyzer 524, robot command data 526, and a particle filter 528. The control system 502 may be in communication with a machine learning model 504, the controller 506, and/or the medical instrument 508. Although illustrated separately, the machine learning model 504 and the controller 506 can be included as part of the control system 502.

The robotic system 500 can correspond to the robotic system 400 with various shared features. As shown, the navigation/localization system 520 can include some or all of the features described above with respect to the navigation system 420 and/or the localization system 424. As shown, however, the navigation/localization system 520 is included in a common module, such as shown in FIG. 20.

The machine learning model 504 is shown as separate from the control system 502. For example, the machine learning model 504 may be connected to the control system 502 via a network interface or some other data connection. However, in some examples the machine learning model 504, or portion(s) thereof, may be included as part of the control system 502. The machine learning model 504 can be configured to receive information from the control system 502, such as the image data 522, the EM data 518, and/or the robot command data 526, and identify a position and/or location of the imaging device 540 based on the received data. The machine learning model 504 may pass the received data to the particle filter 528 for further processing. The machine learning model 504 can include one or more features described above with respect to the machine learning model 430 and/or the machine learning model 310.

The particle filter 528 can receive the output from the machine learning model 504 and/or may pass the output from the particle filter 528 to the navigation/localization system 520. The particle filter 528 may receive a prior state (e.g., location, orientation) from the machine learning model 504 and may then further refine that state information based on probabilistic comparison(s) with available features from, for example, the preoperative model described above. For example, the particle filter 528 can predict one or more features within the image data 522 received from the imaging device 540. The particle filter 528 can pair or associate visible passageways with the passageways modeled by the model generator 516, wherein modeled passageways are generated based on preoperative CT scans or the like. The particle filter 528 determines the probability the measurement fits a given CT bifurcation, such as when a bifurcation is visible and/or at least two children airways are visible. In some examples, one or more of the tasks described above with respect to the particle filter 528 may be additionally or alternatively performed by the machine learning model 504 and/or the image analyzer 524.

Figure 24:
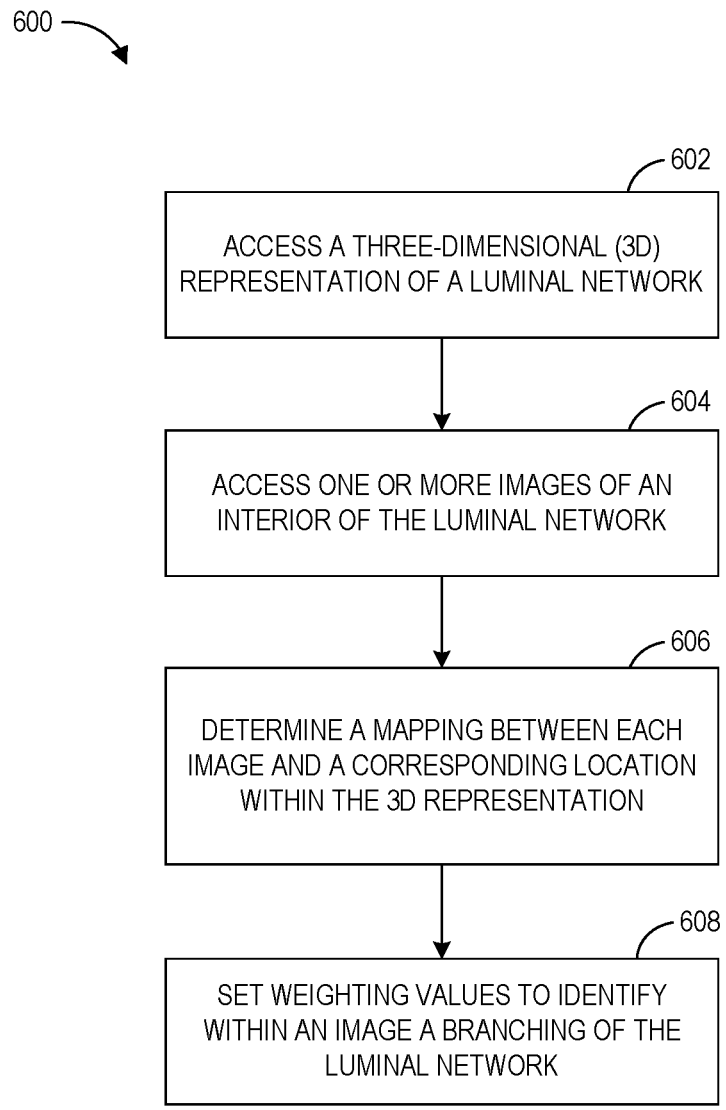
FIG. 24 depicts a flowchart of an example process training a machine learning model using images of an interior of a luminal network.

FIG. 24 depicts a flowchart of an example process 600 training a machine learning model using images of an interior of a luminal network. The model generator (e.g., the model generator 340, the model generator 416, the model generator 516) can generate a 3D representation of a luminal network, such as from one or more CT scan images. At block 602, these images (virtual and/or real) may be accessed by a processor (e.g., 410, 510) of a robotic system executing a machine learning model (e.g., the machine learning model 310, the machine learning model 430, the machine learning model 504) to develop and/or train the convolutional layers that will be used for identifying features, such as branchings, within an image. The data may be accessed by OpenGL or other algorithm. Additionally or alternatively, the images may include real images of an interior of a luminal network, such as those captured by an imaging device described herein. With reference to the processes described herein, reference to one or more processors may indicate an execution of software, instructions, code or data to access, receive, or otherwise use data or commands associated with one or more systems, modules, or data repositories described herein.

At block 604, the processor accesses one or more images of an interior of the luminal network. The processor uses these images to develop the algorithms and/or weightings at each of the convolutional layers. The processor may include any machine learning model described herein, such as a generative adversarial network (GAN).

At block 606, the processor determines a mapping between each image and a corresponding location with the 3D representation. In some examples, the processor receives additional inputs, such as tagged coordinate positions of certain features within an image. For example, a branching may be provided with an x,y,z coordinate during the training process 600. Additionally or alternatively, relative position information (e.g., a distance from another feature, an angle from a center of axis, etc. may be provided.

At block 608, the processor sets or determines weighting values to identify within an image a branching of the luminal network. The weighting may be performed by the processor, automatically, and/or with user input (e.g., user adjustments to the weighting values) received via a user interface or console (e.g., the console 16). Setting the weighting values can include setting matrix indices and/or weighting values to be applied to the matrix indices.

Figure 25:
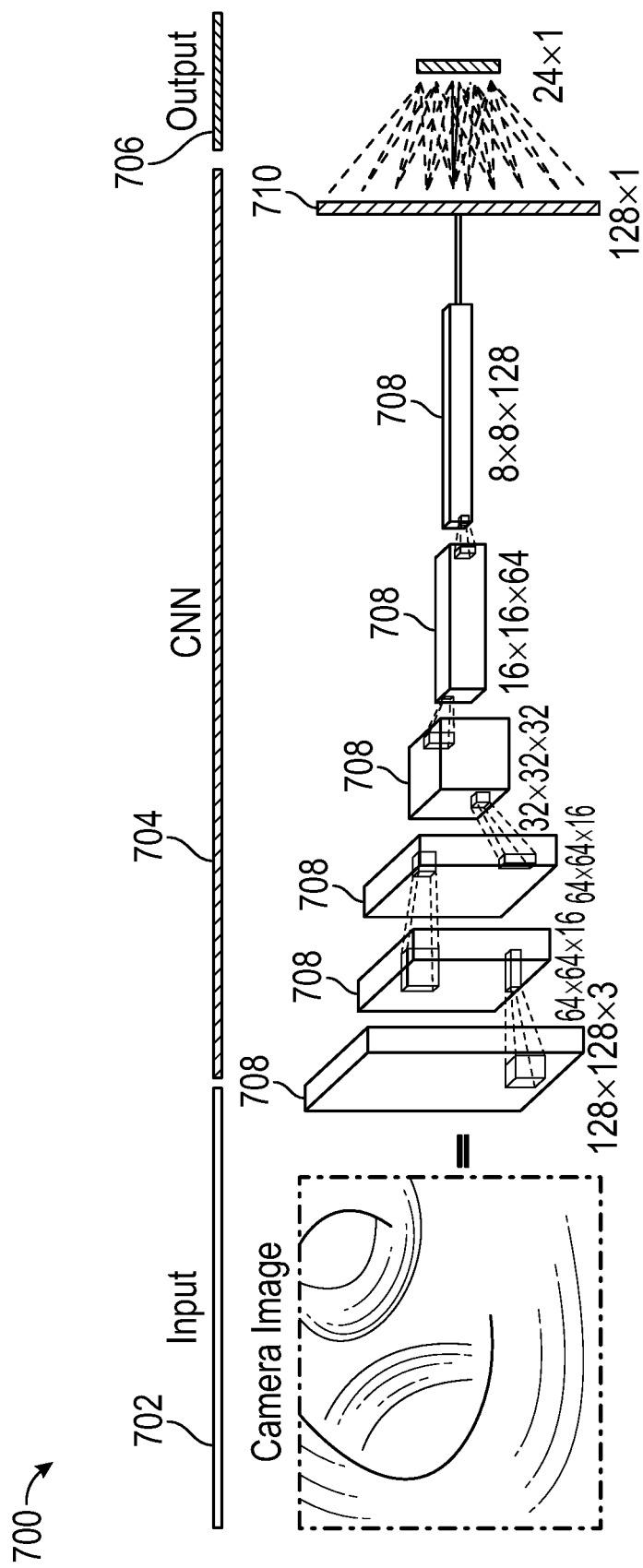
FIG. 25 illustrates schematically the process for accessing a trained convolutional neural network.

FIG. 25 illustrates schematically the process 700 for accessing a trained machine learning model 704. The process 700 can include receiving input 702, passing the input 702 through a machine learning model 704, such as, for example, a CNN, and receiving an output 706. The input 702 can include one or more images or other tensor, such as those captured by an imaging device (e.g., the imaging device 540). The machine learning model 704 receives the input 702 and passes it to one or more model layers 708. In some examples, the model layers 708 include hidden layers and may include a plurality of convolutional layers that "convolve" with a multiplication or other dot product. Additional convolutions may be included, such as pooling layers, fully connected layers, and normalization layers. One or more of these layers may be "hidden" layers because their inputs and outputs are masked by an activation function and a final convolution.

Pooling layers may reduce the dimensions of the data by combining the outputs of neuron clusters at one layer into a single neuron in the next layer. Pooling may be a form of non-linear downsampling. Pooling may compute a max or an average. Thus, pooling may provide a first approximation of a desired feature, such as a branching or lumen. For example, max pooling may use the maximum value from each of a cluster of neurons at a prior layer. By contrast, average pooling may use an average value from one or more clusters of neurons at the prior layer, as represented schematically in FIG. 25. Maximum and average pooling are only examples, as other pooling types may be used. In some examples, the pooling layers transmit pooled data to fully connected layers.

Fully connected layers, such as the fully connected layer 710, can connect every neuron in one layer to every neuron in another layer. Thus, fully connected layers may operate like a multi-layer perceptron neural network (MLP). A resulting flattened matrix can pass through a fully connected layer to classify input 702.

At one or more convolutions, the process 700 can include a sliding dot product and/or a cross-correlation. Indices of a matrix at one or more convolutions or model layers 708 can be affected by weights in determining a specific index point. For example, each neuron in a neural network can compute an output value by applying a particular function to the input values coming from the receptive field in the previous layer. A vector of weights and/or a bias can determine a function that is applied to the input values. Thus, as the machine learning model 704 proceeds through the model layers 708, iterative adjustments to these biases and weights results in a defined output 706, such as a location, orientation, or the like.

Figure 26:
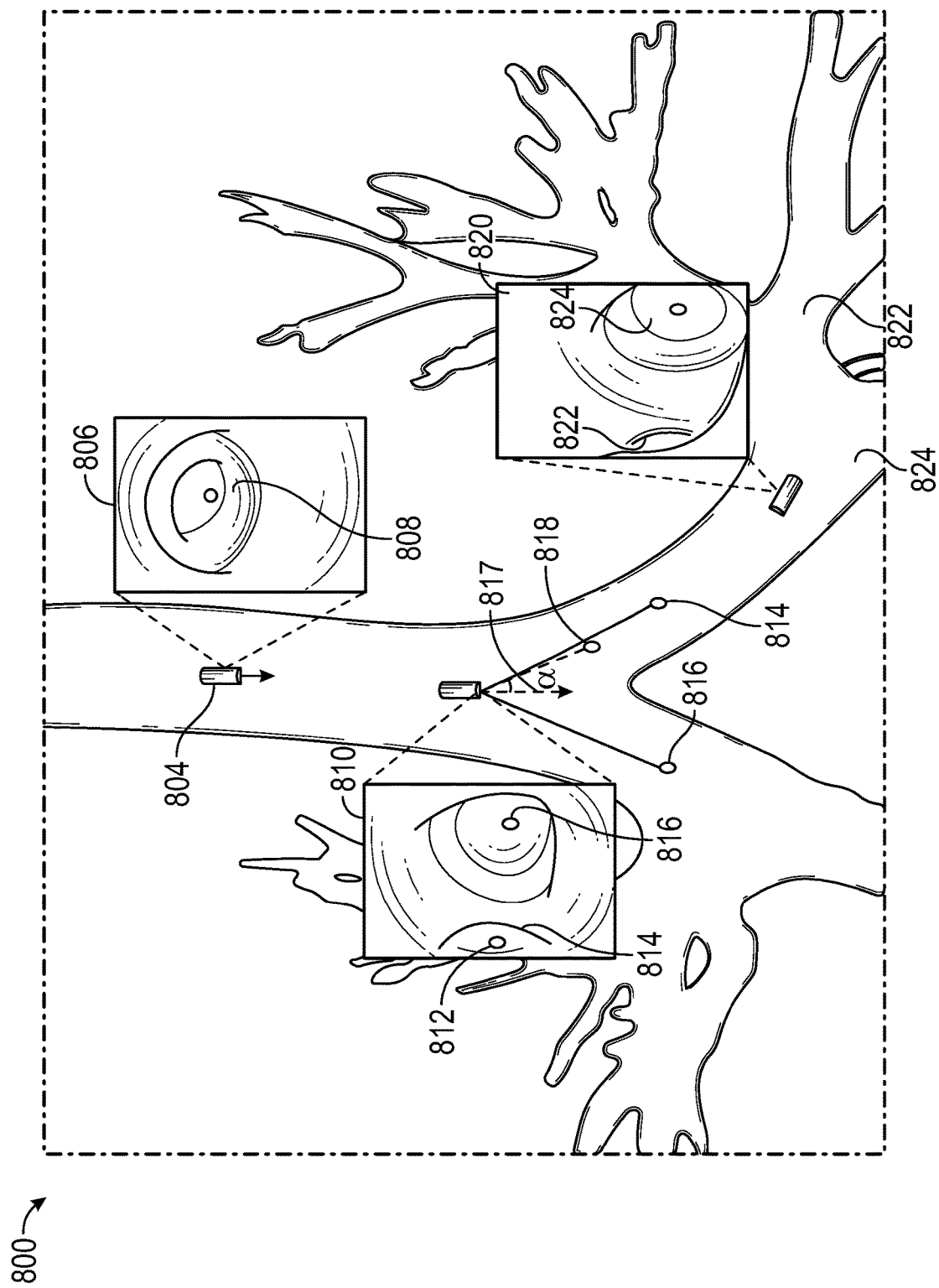
FIG. 26 illustrates a perspective view and related images of a first-person view of an imaging device of a medical instrument as it traverses a luminal network.

FIG. 26 illustrates a perspective view and related images of a first-person view of an imaging device 804 of a medical instrument as it traverses a luminal network 800. In a first state (e.g., position and orientation), the imaging device 804 captures a first image 806. The first image 806 shows a trachea 808, which represents the lumen in which the imaging device 804 is positioned at the first state. A machine learning model, such as those disclosed herein, can receive the first image 806 and identify that the imaging device 804 of the medical instrument is disposed within the trachea 808.

At a second state, the imaging device 804 captures a second image 810. The second image 810 includes a desired branching 812, corresponding to a first branching 814. A second branching 816 is also shown in the second image 810. These branchings 814, 816 may be identified using the machine learning models described herein. The localization/navigation systems described herein (e.g., the localization system 90, the localization/navigation system 300, the robotic system 400, the localization system 424, the navigation/localization system 520) may compare the identified branchings 814, 816 and compare them to a preoperative model of the luminal network 800, which can lead the localization/navigation system to determine that it is the first branching 814 (and not the second branching 816) that will ultimately lead to the target.

FIG. 26 further shows a desired direction 818 relative to a center axis 817 of the imaging device 804 in the second state. An angle a between the center axis 817 and a line toward the desired direction 818 is shown. In some examples, the localization/navigation system (e.g., with the help of the machine learning model) can determine the angle a based on the second image 810. The localization/navigation system can additionally or alternatively rely on previously determined state information to compare a relative state of the imaging device 804 in the second state to the desired direction 818.

In a third state, the imaging device 804 can obtain a third image 820, which includes an image of a third branching 822 and a fourth branching 824. The localization/navigation system can further determine a desired direction relative to the third state of the imaging device 804.

Figure 27A:
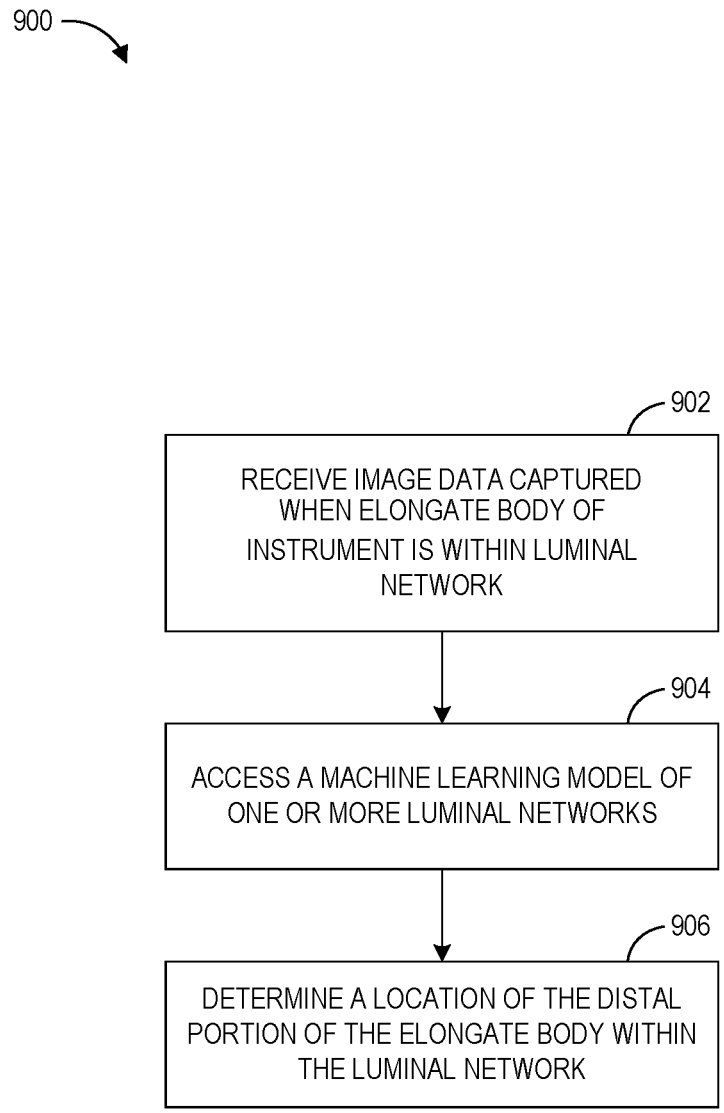
FIG. 27A depicts a flowchart of an example intra-operative process for localizing a portion of a medical instrument within a luminal network based on captured endoscopic images and associated machine learning model.

FIG. 27A depicts a flowchart of an example intra-operative process 900 for localizing a portion of a medical instrument within a luminal network based on captured endoscopic images and associated machine learning model. For example, the process 900 can be implemented by one or more processors of a robotic system utilizing a machine learning model, the modeling system 420 and/or localization/navigation system 300 of FIG. 22, the control system 402 of FIG. 23A, the control system 502 of FIG. 23B, or component(s) thereof. In another example, the process 900 may be implemented by one or more processors of a robotic system utilizing a machine learning model configured to work with the image analyzer 335, the location calculator 339, and/or other component(s) of the localization/navigation system 300.

At block 902, a processor of the robotic system receives image data captured (e.g., by an imaging device at the distal end of an instrument positioned within a patient's anatomical luminal network) while/when an elongate body of the instrument is within the luminal network. For example, the imaging device can be imaging device 210, the imaging device 440, or the imaging device 540 described above. The image can depict the anatomical features corresponding to in vivo images obtained by the imaging device. Some embodiments of the process 900 may operate on imaging data (e.g., values of pixels received from an image sensor of the imaging device) without generating a corresponding visible representation of the image data (e.g., image 915).

At block 904, the processor accesses a machine learning model of the one or more luminal networks. The localization/navigation system 300 or a portion thereof, such as the machine learning model 310, can access the image data and identify a feature such as a branching. Accessing the machine learning model can include predicting, based on a particle filter (e.g., particle filter 390, particle filter 528), one or more features within the image data.

At block 906, the processor determines a location of the distal portion of the elongate body of the instrument within the luminal network. For example, the machine learning model 310 can identify a match between a position within a model and an apparent position based on an image obtained by the instrument (e.g., an endoscope) within the anatomical luminal network. The match can be an exact match, the best match among the available features in the obtained image, and/or a match within a threshold difference from the feature. The machine learning model 310 can use a probabilistic evaluation of the position of the instrument based in part on a prior position of the instrument when, for example, the precise location of the instrument becomes unknown. Determining the location of the distal portion of the elongate body can include determining a position relative to a center line of a portion of the luminal network and/or of the imaging device. Determining the location of the distal portion of the elongate body can include determining, relative to a fixed reference point, one or more of a position along a first axis, a position along a second axis orthogonal to the first axis, a position along a third axis orthogonal to both the first and second axis, a rotational orientation about the first axis, a rotational orientation about the second axis, and/or a rotational orientation about the third axis.

The machine learning model may be based at least in part on simulated imagery of the luminal network. The simulated imagery can include at least one computer-generated image of the luminal network over at least three dimensions and/or may depict a simulated perspective from within the luminal network. The image data can include video imagery from a bronchial network of a patient. As noted above, the machine learning model may be in communication with a robotic arm and/or medical instrument that is configured to navigate the elongate body of the medical instrument and the imaging device through the luminal network.

Based on the output of the localization/navigation system, a processor that is part of a control system (e.g., the control system 402, the control system 502) or separate from but in communication with the control system, can provide information for use by a user of the robotic system. For example, the control system may include a first display interface that shows a first set of one or more images from a perspective of the imaging device. The first set of images may be from the perspective of the imaging device, for example, while the imaging device is in the luminal network. The control system can additionally or alternatively include a second display interface that shows a second set of one or more images from a global-based perspective. For example, the second set of images can be based on a 3D scan of the luminal network. The control system may provide an indication on one of the display interfaces (e.g., the second display interface) of the location of the distal portion of the elongate body of the medical instrument (e.g., where the imaging device is).

Figure 27B:
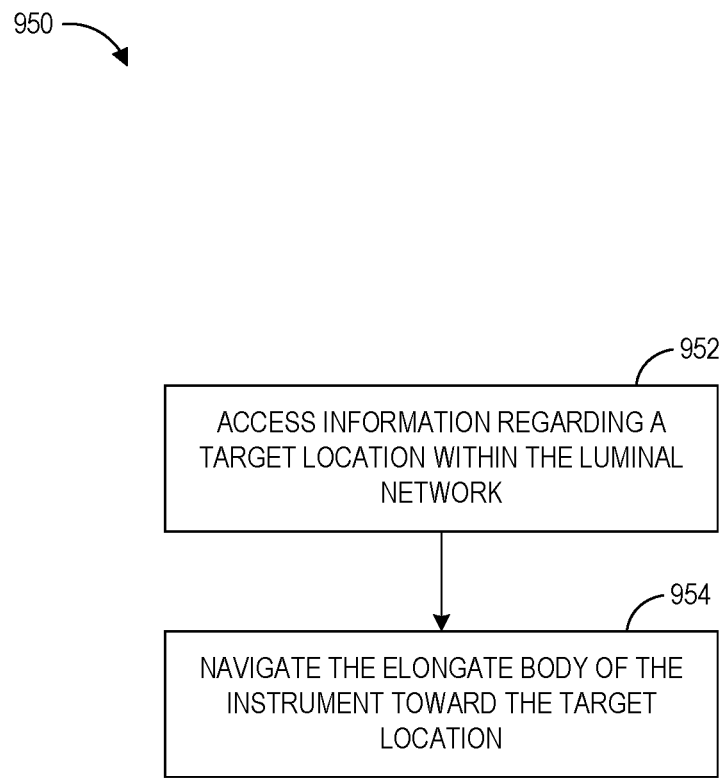
FIG. 27B depicts a flowchart of an example process for navigating the portion of the medical instrument from FIG. 27A within the luminal network using the machine learning model.

FIG. 27B depicts a flowchart of an example process 950 for navigating the medical instrument from FIG. 27A within the luminal network using the machine learning model. At block 952, the processor of the robotic system accesses information regarding a target location within the luminal network. A pre-planned navigation path through the luminal network to a target tissue site can be accessed by the localization/navigation system 300. The navigation path can be compared with the location determined by the machine learning model 310. The localization/navigation system 300 can use the navigation controller 360 to determine a navigation path toward the target. In some embodiments, the navigation path may be identified programmatically by analysis of the model and an identified target site to derive a shortest navigation path to the lesion. In some embodiments the path may be identified by a physician, or an automatically-identified path may be modified by a physician. The navigation path can identify a sequence of branches within the luminal network to travel through so as to reach the identified target. At block 954, the processor can cause the localization/navigation system 300 to navigate the elongate body of the instrument toward the target location.

Figure 27C:
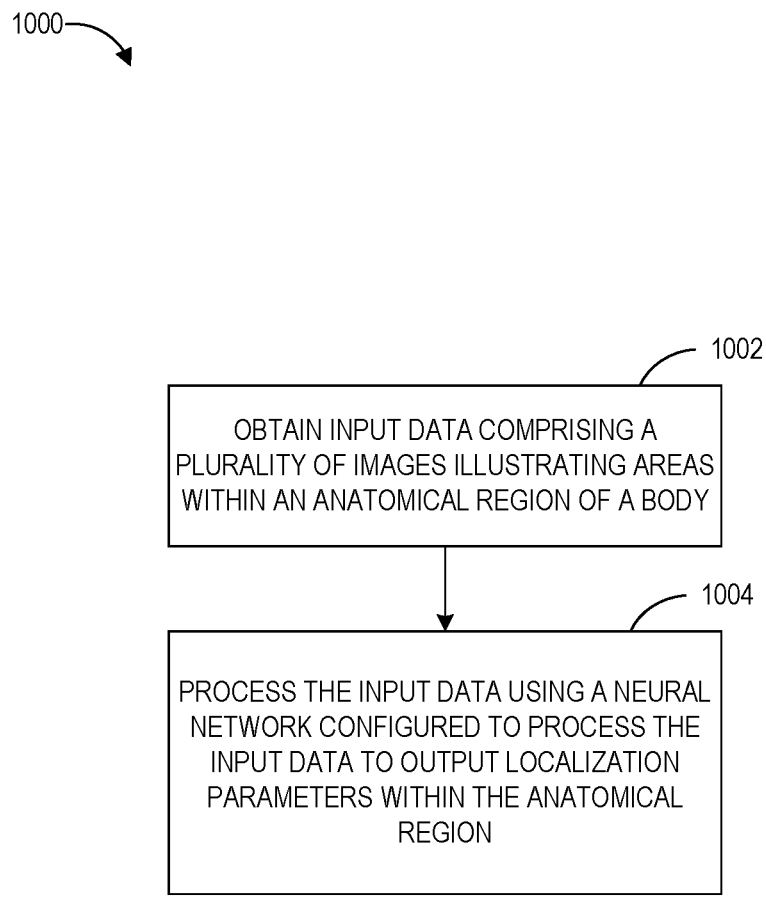
FIG. 27C depicts a flowchart of an example process for determining localization parameters associated with an instrument within a luminal network.

FIG. 27C depicts a flowchart of an example process 1000 for determining localization parameters associated with an instrument within a luminal network. At block 1002, the processor can obtain input data, such as image data from an imaging device, that includes, for example, one or more images illustrating areas within an anatomical region of a human body. At block 1004, the localization/navigation system process the input data using a neural network (e.g., machine learning model 310, machine learning model 430, machine learning model 504). The neural network may be configured through training to receive the input data and to process the input data. The neural network can output localization parameters for said areas within the anatomical region. The anatomical region may include a region of airways within a luminal network. The neural network can output a prediction of which airways are visible. The neural network's output may be a prediction of the position and/or orientation of visible airways and bifurcations, for example, relative to the imaging device. The process 1000 can include particle filtering the neural network's output.

3. Implementing Systems and Terminology

Implementations disclosed herein provide systems, methods and apparatus for localizing and navigating medical instruments using image data captured by an imaging device in conjunction with a machine learning model.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The localization and navigation functions described herein may be stored as one or more instructions on a processor-readable or computer-readable medium. The term "computer-readable medium" refers to any available medium that can be accessed by a computer or processor. By way of example, and not limitation, such a medium may comprise random access memory (RAM), read-only memory (ROM), electrically erasable programmable read-only memory (EEPROM), flash memory, compact disc read-only memory (CD-ROM) or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

What is claimed is:

1. A system for localization within a luminal network, the system comprising:
    an instrument comprising:
        an elongate body configured to be inserted into the luminal network, and
        an imaging device positioned on a distal portion of the elongate body;
    at least one computer-readable memory having stored thereon executable instructions; and
    one or more processors in communication with the at least one computer-readable memory and configured to execute the instructions to cause the system to at least:
        receive, from the imaging device, image data comprising an image captured when the elongate body is within the luminal network, the image depicting one or more branchings of the luminal network;
        access a machine learning model configured to:
            identify the one or more branchings from the image data;
            compare the one or more branchings from the image data with one or more virtual branchings in a repository to determine a match;
            determine a location within the luminal network corresponding to the match; and
            output a position of the distal portion of the instrument; and
        determine, based on the position of the distal portion of the instrument output from the machine learning model, a location of the distal portion of the elongate body within the luminal network.

2. The system of claim 1, wherein the machine learning model comprises a convolutional neural network trained to identify branchings within the one or more luminal networks.

3. The system of claim 1, wherein the machine learning model is based at least in part on simulated imagery of the luminal network, the simulated imagery comprising at least one computer-generated image of the luminal network over at least three dimensions, the simulated imagery depicting a simulated perspective from within the luminal network.

4. The system of claim 1, wherein the image data comprises video imagery from a bronchial network of a patient.

5. The system of claim 1, further comprising a robotic arm configured to, in use, navigate the elongate body and imaging device through the luminal network, wherein the one or more processors are further configured to:
   access information regarding a target location within the luminal network; and
   navigate, based on the determined location of the distal portion of the elongate body, the elongate body and the imaging device toward the target location.

6. The system of claim 1, wherein determining the location of the distal portion of the elongate body comprises determining a position relative to a center line of a portion of the luminal network.

7. The system of claim 1, wherein determining the location of the distal portion of the elongate body comprises determining, relative to a fixed reference point, three or more of:
   a position along a first axis;
   a position along a second axis orthogonal to the first axis;
   a position along a third axis orthogonal to both the first and second axis;
   a rotational orientation about the first axis;
   a rotational orientation about the second axis; and
   a rotational orientation about the third axis.

8. The system of claim 1, wherein the one or more processors are further configured to automatically transmit instructions to display:
   a first display interface comprising a first set of one or more images from a perspective of the imaging device, the first set of images from the perspective of the imaging device comprising one or more images captured by the imaging device;
   a second display interface comprising a second set of one or more images from a global-based perspective, the second set of images based on a three-dimensional (3D) scan of the luminal network; and
   an indication on the second display interface of the location of the distal portion of the elongate body.

9. The system of claim 1, wherein:
   the machine learning model is configured to identify the one or more branchings of the luminal network from the image data,
   accessing the machine learning model comprises predicting, based on a particle filter, one or more features within the image data,
   the one or more processors are further configured to determine probabilities, based on the particle filter and the one or more features, that the one or more branchings identified by the machine learning model matches with one or more corresponding branchings in a preoperative model of the luminal network, and
   determining the location of the distal portion of the elongate body within the luminal network comprises determining the location based on the probabilities.

10. The system of claim 1, wherein the image data is camera image and the position of the distal portion of the instrument output from the machine learning model includes a location and a direction of the one or more branchings.

11. The system of claim 1, wherein the image data is received in real-time and the machine learning model outputs the position of the distal portion of the instrument in real-time.

12. A system for localization within a luminal network, the system comprising:
   an instrument comprising:
      an elongate body configured to be inserted into the luminal network, and
      an imaging device positioned on a distal portion of the elongate body;
   at least one computer-readable memory having stored thereon executable instructions; and
   one or more processors in communication with the at least one computer-readable memory and configured to execute the instructions to cause the system to at least:
      receive, from the imaging device, image data comprising an image captured when the elongate body is within the luminal network, the image depicting one or more branchings of the luminal network;
      access a machine learning model, wherein the machine learning model is configured to identify the one or more branchings of the luminal network from the image data;
      predicting, based on a particle filter, one or more features within the image data,
      determining probabilities, based on the particle filter and the one or more features, that the one or more branchings identified by the machine learning model matches with one or more corresponding branchings in a preoperative model of the luminal network; and
      determine, based on the machine learning model and information regarding the one or more branchings probabilities, a location of the distal portion of the elongate body within the luminal network.

13. A system for localization within a luminal network, the system comprising:
   an instrument comprising:
      an elongate body configured to be inserted into the luminal network, and
      an imaging device positioned on a distal portion of the elongate body;
   at least one computer-readable memory having stored thereon executable instructions; and
   one or more processors in communication with the at least one computer-readable memory and configured to execute the instructions to cause the system to at least:
      receive, from the imaging device, image data comprising an image captured when the elongate body is within the luminal network;
      access a machine learning model configured to:
         extract one or more features from the image data;
         compare the one or more features from the image data with one or more virtual features in a repository to determine a match;
         determine a location within the luminal network corresponding to the match; and
         output a position of the distal portion of the instrument; and
      determine, based on the position of the distal portion of the instrument output from the machine learning model, a location of the distal portion of the elongate body within the luminal network.

* * * * *